US012492504B2

(12) United States Patent
Kim et al.

(10) Patent No.: US 12,492,504 B2
(45) Date of Patent: Dec. 9, 2025

(54) HANGER DEVICE

(71) Applicant: LG ELECTRONICS INC., Seoul (KR)

(72) Inventors: Joogyeom Kim, Seoul (KR); Hyunsun Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 18/085,991

(22) Filed: Dec. 21, 2022

(65) Prior Publication Data

US 2023/0210289 A1 Jul. 6, 2023

(30) Foreign Application Priority Data

Jan. 4, 2022 (KR) .................. 10-2022-0000952
Jan. 4, 2022 (KR) .................. 10-2022-0000954
Jan. 4, 2022 (KR) .................. 10-2022-0000961
Jan. 4, 2022 (KR) .................. 10-2022-0000965
Jan. 4, 2022 (KR) .................. 10-2022-0000976
(Continued)

(51) Int. Cl.
*D06F 58/00* (2020.01)
*D06F 57/00* (2006.01)
(Continued)

(52) U.S. Cl.
CPC .............. *D06F 58/00* (2013.01); *D06F 57/00* (2013.01); *D06F 58/203* (2013.01); *D06F 58/22* (2013.01);
(Continued)

(58) Field of Classification Search
CPC ........ D06F 58/00; D06F 58/203; D06F 58/20; D06F 58/22; D06F 58/26; D06F 57/00; D06F 59/02; D06F 73/00
See application file for complete search history.

(56) References Cited

U.S. PATENT DOCUMENTS 4,625,432 A 12/1986 Baltes
4,989,624 A 2/1991 Darling
(Continued)

FOREIGN PATENT DOCUMENTS

BE 1019306 A5 * 5/2012 ........... D06F 37/266
CN 1966805 5/2007
(Continued)

OTHER PUBLICATIONS

Machine translation of BE-1019306 A5 to Debal. (Year: 2012).*
(Continued)

*Primary Examiner* — Joseph L. Perrin
(74) *Attorney, Agent, or Firm* — KED & ASSOCIATES, LLP

(57) ABSTRACT

A hanger device according to the present disclosure may comprise a body having at least one opening to allow air to be suctioned into the body and at least one discharge port to allow suctioned air to be forced out of the body. A fan module may be provided inside the body. A filter may be configured to remove foreign substances contained in the suctioned air. A hanging unit extends from the bottom surface of the main body. At least one wind guard may be provided in front of the hanging unit, and configured to move in a vertical direction, and a driving unit may slide the wind guard in a vertical direction.

17 Claims, 58 Drawing Sheets

(30) Foreign Application Priority Data

| Jan. 4, 2022 | (KR) | 10-2022-0000981 |
| Jan. 4, 2022 | (KR) | 10-2022-0000985 |
| Jan. 4, 2022 | (KR) | 10-2022-0000988 |
| Jan. 4, 2022 | (KR) | 10-2022-0000993 |
| Jan. 4, 2022 | (KR) | 10-2022-0001153 |
| Jan. 4, 2022 | (KR) | 10-2022-0001155 |

(51) Int. Cl.
*D06F 58/20* (2006.01)
*D06F 58/22* (2006.01)
*D06F 73/00* (2006.01)
*A47G 25/14* (2006.01)
*D06F 58/26* (2006.01)
*D06F 59/02* (2006.01)

(52) U.S. Cl.
CPC .............. *D06F 73/00* (2013.01); *A47G 25/14* (2013.01); *A47G 2200/16* (2013.01); *D06F 58/20* (2013.01); *D06F 58/26* (2013.01); *D06F 59/02* (2013.01)

(56) References Cited

U.S. PATENT DOCUMENTS

| 5,361,516 | A | 11/1994 | Dahman |
| 5,815,961 | A | 10/1998 | Estes |
| 2005/0120757 | A1 | 6/2005 | Jackson |
| 2006/0226177 | A1 | 10/2006 | McJunkin |
| 2011/0203130 | A1* | 8/2011 | Date .................... D06F 58/203 34/621 |
| 2017/0233942 | A1 | 8/2017 | Eun et al. |
| 2018/0064296 | A1 | 3/2018 | Jun et al. |
| 2019/0169789 | A1 | 6/2019 | Cho et al. |
| 2020/0071875 | A1* | 3/2020 | Woo .................... D06F 58/48 |
| 2021/0156071 | A1 | 5/2021 | Cho |
| 2021/0198836 | A1 | 7/2021 | Kitayama |
| 2021/0324566 | A1 | 10/2021 | Oak et al. |
| 2023/0210286 | A1 | 7/2023 | Kim |
| 2023/0210287 | A1 | 7/2023 | Kim |
| 2023/0210290 | A1 | 7/2023 | Kim |
| 2023/0212811 | A1 | 7/2023 | Kim |

FOREIGN PATENT DOCUMENTS

| CN | 202440683 | 9/2012 |
| CN | 203252394 | 10/2013 |
| CN | 203440684 | 2/2014 |
| CN | 203823888 | 9/2014 |
| CN | 106337268 | 1/2017 |
| CN | 106676851 | 5/2017 |
| CN | 107299503 | 10/2017 |
| CN | 206646306 | 11/2017 |
| CN | 206873146 | 1/2018 |
| CN | 107724006 | 2/2018 |
| CN | 107796217 | 3/2018 |
| CN | 108851535 | 11/2018 |
| CN | 109355879 | 2/2019 |
| CN | 208949597 | 6/2019 |
| CN | 110219148 | 9/2019 |
| CN | 110373874 | 10/2019 |
| CN | 110438769 | 11/2019 |
| CN | 110998016 | 4/2020 |
| CN | 210529314 | 5/2020 |
| CN | 212117511 | 12/2020 |
| CN | 112176665 | 1/2021 |
| CN | 112176669 | 1/2021 |
| CN | 109853202 | 4/2021 |
| CN | 113047017 | 6/2021 |
| CN | 213328332 | 6/2021 |
| CN | 113123092 | 7/2021 |
| CN | 113718498 | 11/2021 |
| CN | 214855276 | 11/2021 |
| CN | 113737486 | 12/2021 |
| CN | 113774637 | 12/2021 |
| CN | 113832691 | 12/2021 |
| DE | 10-2018-211668 | 1/2020 |
| DE | 10-2018-008404 | 4/2020 |
| EP | 2267213 | 12/2010 |
| EP | 3705618 | 9/2020 |
| JP | H07-290944 | 11/1995 |
| JP | H11-89700 | 4/1999 |
| JP | 2003-176930 | 6/2003 |
| JP | 2003-230476 | 8/2003 |
| JP | 2004202392 | 7/2004 |
| JP | 2010069286 | 4/2010 |
| JP | 2010078231 | 4/2010 |
| JP | 3163538 | 10/2010 |
| JP | 2011-112251 | 6/2011 |
| JP | 2011147686 | 8/2011 |
| JP | 2012-065864 | 4/2012 |
| JP | 2013053773 | 3/2013 |
| JP | 2018-057413 | 4/2018 |
| JP | 2020103434 | 7/2020 |
| JP | 2021-101786 | 7/2021 |
| JP | 2021106788 | 7/2021 |
| KR | 20-0316690 | 6/2003 |
| KR | 10-0497325 | 6/2005 |
| KR | 100674271 | 1/2007 |
| KR | 20070075596 | 7/2007 |
| KR | 2008-0073088 | 8/2008 |
| KR | 2011-0035030 | 4/2011 |
| KR | 10-1312024 | 9/2013 |
| KR | 20180024348 | 3/2018 |
| KR | 10-2018-0128746 | 12/2018 |
| KR | 10-2039829 | 11/2019 |
| KR | 20190128460 A * | 11/2019 |
| KR | 10-2046259 | 12/2019 |
| KR | 102105508 B1 * | 5/2020 |
| KR | 2020-0080962 | 7/2020 |
| KR | 20210011699 | 2/2021 |
| KR | 2021-0037496 | 4/2021 |
| KR | 10-2261579 | 6/2021 |
| WO | WO 2006/059225 | 6/2006 |
| WO | WO 2018/159313 | 9/2018 |
| WO | WO 2020/138931 | 8/2020 |
| WO | WO 2020/175959 | 9/2020 |

OTHER PUBLICATIONS

Machine translation of KR 10-2011-0035030 to Hong et al. (Year: 2011).*
Machine translation of KR 10-2105508 B1 to Lee (Year: 2020).*
KR 10-2019-0128460 A to Lee et al. (Year: 2019).*
Machine translation of KR 10-2261579 to Myung et al. (Year: 2021).*
Machine translation of JP 2012-065864 A to Kano. (Year: 2012).*
U.S. Office Action dated Mar. 22, 2024 issued in U.S. Appl. No. 18/090,036.
European Search Report dated Mar. 28, 2023 issued in Application No. 22214987.4.
European Search Report dated Apr. 5, 2023 issued in Application No. 22215824.8.
European Search Report dated Apr. 6, 2023 issued in Application No. 22216846.0.
European Search Report dated Mar. 30, 2023 issued in Application No. 22216847.8.
European Search Report dated Mar. 30, 2023 issued in Application No. 22216845.2.
U.S. Office Action dated Jan. 16, 2025 issued in U.S. Appl. No. 18/090,003.
European Search Report dated May 9, 2023 issued in Application No. 22215757.0.
European Search Report dated May 16, 2023 issued in Application No. 22215784.4.
European Search Report dated May 9, 2023 issued in Application No. 22214995.7.
Extended European Search Report dated May 22, 2023 issued in U.S. Appl. No. 22/215,823.

(56) References Cited

OTHER PUBLICATIONS

Extended European Search Report dated Jun. 1, 2023 issued in U.S. Appl. No. 22/215,783.
Chinese Office Action dated Jul. 22, 2025, issued in Application No. 202210442754.7.
Chinese Office Action dated Jul. 22, 2025, issued in Application No. 202210441181.6.
Chinese Office Action dated Jul. 30, 2025, issued in Application No. 202210441063.5.
Chinese Office Action dated Aug. 1, 2025, issued in Application No. 202210441104.0.
Chinese Office Action dated Aug. 4, 2025, issued in Application No. 202210440189.0.
Chinese Office Action dated Aug. 11, 2025, issued in Application No. 202210442769.3.
Chinese Office Action dated Aug. 14, 2025, issued in Application No. 202210441271.5.
Chinese Office Action dated Oct. 23, 2025, issued in Application No. 202210441104.0.
Chinese Office Action dated Oct. 27, 2025, issued in Application No. 202210441181.6.

* cited by examiner

HANGER DEVICE

CROSS-REFERENCE TO RELATED APPLICATION(S)

This application claims priority under 35 U.S.C. § 119 to Korean Application Nos. 10-2022-0000952; 10-2022-0000954; 10-2022-0000961; 10-2022-0000965; 10-2022-0000976; 10-2022-0000981; 10-2022-0000985; 10-2022-0000988; 10-2022-0000993; 10-2022-0001153; and 10-2022-0001155; all filed on Jan. 4, 2022, whose entire disclosure(s) is/are hereby incorporated by reference.

BACKGROUND

1. Field

The present disclosure relates to a hanger apparatus.

2. Background

In general, a hanger is used for hanging various items, e.g., clothes, requiring hanging. In addition, a hanger device disclosed in the prior art, Korea Patent Publication No. 2018-0128746 (Dec. 4, 2018), is configured to blow air to dry hung clothes. Recently, there is an increasing consumer demand for a hanger device capable of performing additional functions.

SUMMARY OF THE DISCLOSURE

The present disclosure is directed to a hanger device, which may comprise: a main body having a suction unit configured to suction air and a discharge unit through which the suctioned air is discharged; a fan module provided inside the main body; a filtering module for removing foreign substances contained in the air suctioned in by the fan module; a discharge duct forming a guide passage for guiding the air passing through the filtering module to the discharge unit; and a hanging unit provided at a lower portion of the main body.

The hanging unit may include: a pair of supports extending from the bottom of the main body, the length of the supports being adjusted in the vertical direction; a hanging bar connecting the ends of the pair of supports; and a lifting unit configured to change the length of the pair of supports. The pair of supports communicates with the guide passage, and the hanging bar communicates with the pair of supports. Each of the pair of supports may include a fixed arm fixed to the body, at least one intermediate arm configured to move up and down while connected to the fixed arm, and a movable arm capable of moving up and down while connected to the intermediate arm.

The hanging unit may further include a first elevating unit for moving the movable arm up and down along the intermediate arm, and a second elevating unit for elevating the intermediate arm along the fixed arm. At least one of the first elevating unit or the second elevating unit may include a drive means which may be achieved by a rack engaged with a pinion, and a motor for rotating the pinion. The drive means may be also a linear motor actuators having a lead screw to achieve movement of the intermediate arm.

The clothes hanger device according to the present disclosure may further includes a steam supply device for supplying steam into the guide passage. The steam supply device may include a steam generator, a main supply pipe extending from the steam generator, at least a portion of which extends along the guide passage, a sub-supply pipe extending into the steam generator and extending into the pair of supports; and an extension pipe movable in the vertical direction while connected to the sub-supply pipe. A coupler is mounted at the lower end of the extension tube and is accommodated in the moving arm such that the coupler moves as one body with the moving arm.

The filtering module may include a dust filter configured to remove dust contained in the air sucked in through the suction unit, a dehumidifying filter for absorbing moisture contained in the air that has passed through the dust filter, a deodorizing filter for purifying or deodorizing the air that has passed through the dust filter, and at least one of a heater for heating the air that has passed through the dust filter.

The hanger device according to at least one of the embodiments disclosed herein may provide at least one of the following effects.

The clothes or items hung or provided on the hanging unit may be dried by circulating the indoor air, and further, the air circulation may decrease the drying time of the clothes. The drying time may be further shorted by a heater provided in the filtering module to generate warm air.

By allowing the air sucked into the hanger device by the fan module to pass through the filtering module, ambient indoor air of a room where the hanger device is situated may be purified.

By allowing the air sucked through the hanger device by the fan module to pass through the dehumidifying filter, indoor humidity may be controlled. For example, the humidity of a room where the hanger device is situated may be reduced based on the operation of the fan module during a humid environment or a season having a relatively higher humidity, e.g., summer.

By allowing the steam generated from the steam supply device provided inside the hanger device to be sprayed or propagated toward the clothes hung on the hanging unit, items with wrinkles may be straightened. Further, the generated steam may be used to increase the humidity of indoor air where there may be a lack of humidity indoors, e.g., when heaters are operated indoors during winter months, the indoor air is dry.

When the sterilization module installed around the outlet of the hanger device is turned on, harmful viruses contained in the air passing through the filtering module are sterilized, and indoor air quality is increased.

Because the height of the hanging bar may be adjusted according to the length of the item to be hung on the hanger device and/or the height of the person who hangs the item, user convenience may be increased.

When a shielding plate is provided to cover at least one of a dehumidifying filter or a deodorizing filter, dehumidification and deodorizing functions may be selectively performed or simultaneously performed.

When the width of the clothes hanging on the hanger is wide, the hanger device may be configured to move forward from the installation wall to prevent the clothes or items from touching the wall.

When a gyro sensor indicates which side of the hanging bar has more clothes or items, more air, warm dry air or steam may be supplied to the side where more clothes or items are hung.

Based on the image captured by a camera indicating which side of the hanging bar has more clothes or items, more air, warm dry air or steam can be supplied to the side where more clothes or items are hung.

It is possible to automatically control the operation of the hanger device may automatically control the operation by identifying an object and distance of approaching object based on an image from at least one camera of the surrounding area.

BRIEF DESCRIPTION OF THE DRAWINGS

The embodiments will be described in detail with reference to the following drawings in which like reference numerals refer to like elements wherein.

DETAILED DESCRIPTION OF THE DISCLOSURE

Figure 1:
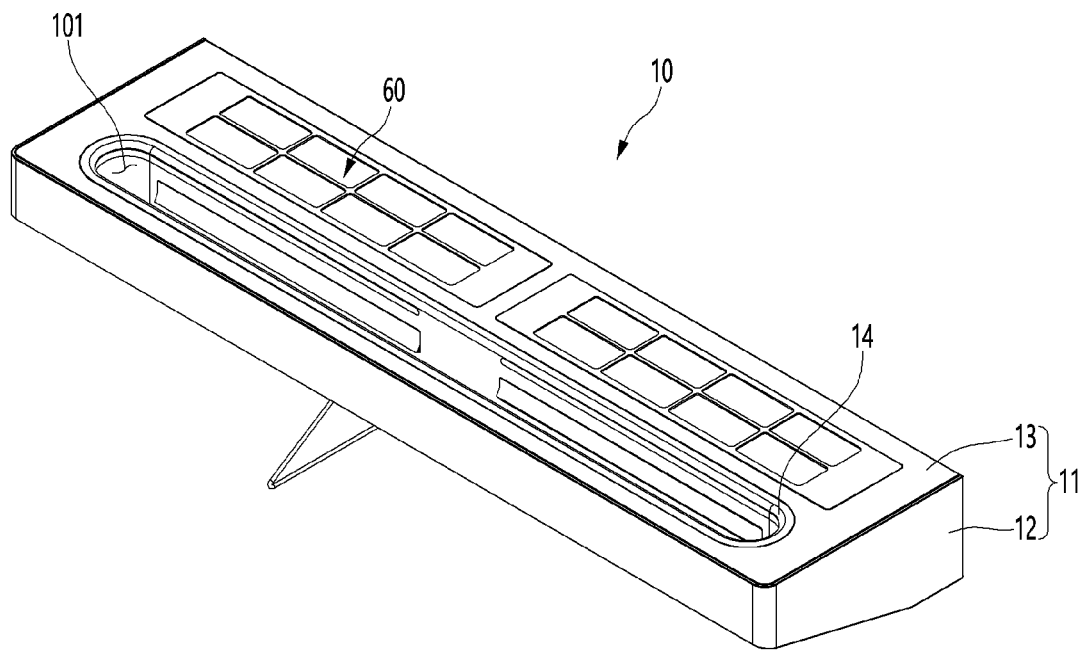
FIG. 1 is a perspective view showing front, right side and top of a hanger device according to an embodiment of the present disclosure.
Figure 2:
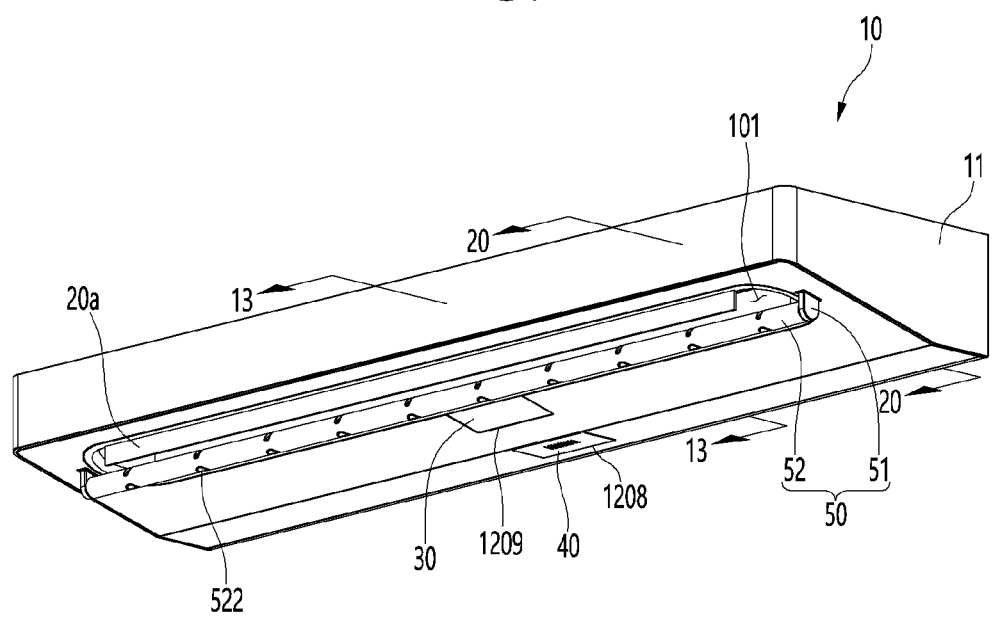
FIG. 2 is a perspective view showing front, right side and bottom of the hanger device according to an embodiment of the present disclosure.
Figure 3:
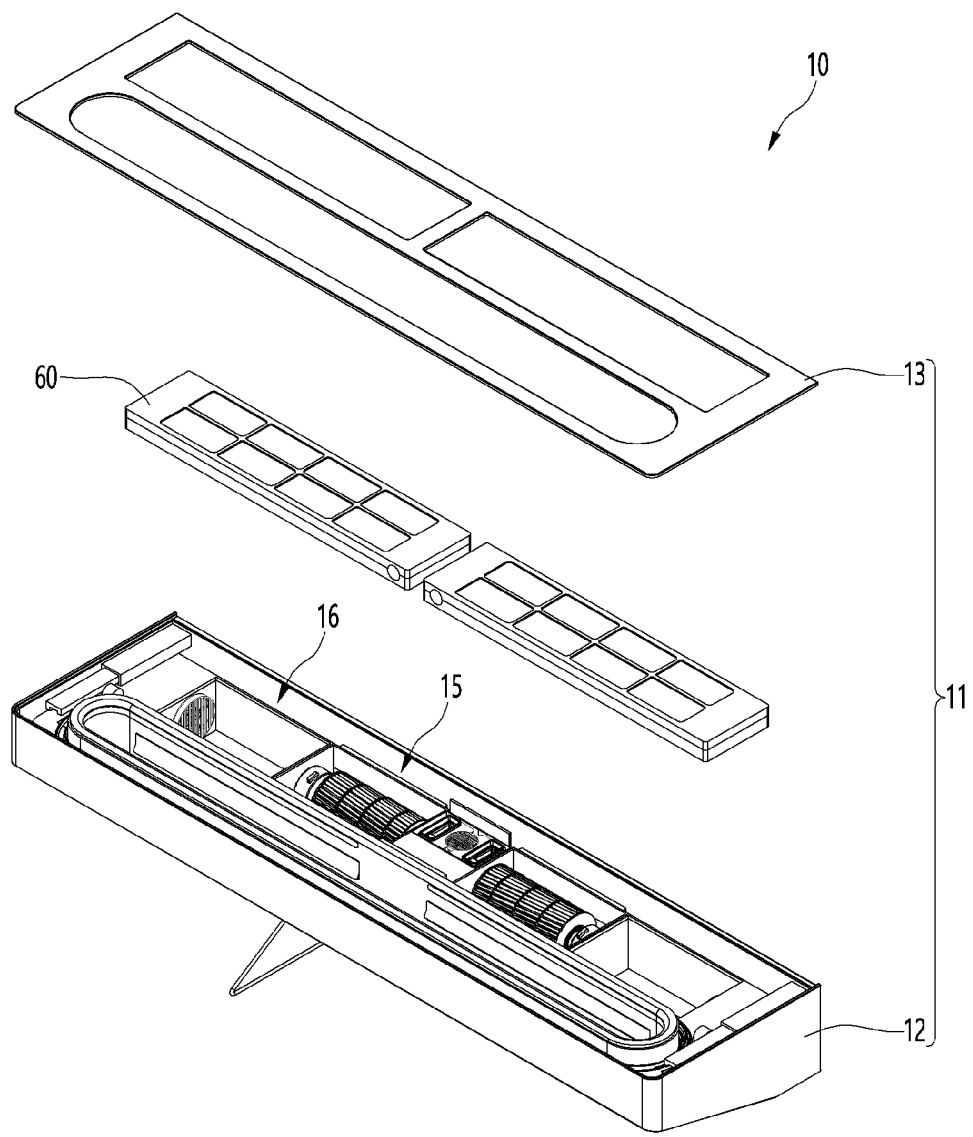
FIG. 3 is an exploded view of the hanger device illustrated in FIG. 1.

A hanger device 10 according to an embodiment of the present disclosure, as illustrated in FIGS. 1-3, includes a main body 11 forming an external shape or appearance and a hanging unit 50 connected to the main body. The main body 11 includes a cabinet 12 and a cover 13 covering an interior of the cabinet 12, and a discharge tube 14 mounted vertically across the body 11 to form a through hole 101, which penetrates from an upper surface to a lower surface of the main body 11. The cross-sectional shape of the through hole 10, for example, may be an extended opening in a shape of a track or a rectangular shape such that one end of the through hole 101 is adjacent to the left edge of the main body 11, and the other end thereof is adjacent to the right edge of the main body 11. Both ends of the through hole 101 may be rounded in an arc shape, but is not limited thereto.

The hanging unit 50 includes a pair of supports 51 extending downward from the main body, and a hanging bar or tube 52 connected between the pair of supports 51. The hanging bar 52 is placed horizontally at a position spaced a predetermined distance downward from the bottom surface of the main body 11 by the support 51, and located in the center of the through hole 101. A plurality of outlets 522 are formed on the bottom surface of the hanging bar 52 to be spaced apart from each other by a predetermined interval.

A wind guard 20a (e.g., an air deflector or an air louver) may be accommodated in the inside of the main body 11 corresponding to the front of the through hole 101. The wind guard 20a may be movable in the vertical direction such that the wind guard 20a may descend to be exposed below the lower side of the main body 11. When the wind guard 20a is slidably drawn out to the lower side of the main body 11, a display screen may be activated on the front surface of the wind guard 20a, and various information may be displayed on the display screen. For example, a text or a video indicating the current driving or operation mode, the current indoor temperature, humidity, pollution level, etc. may be provided on the display screen.

Figure 15:
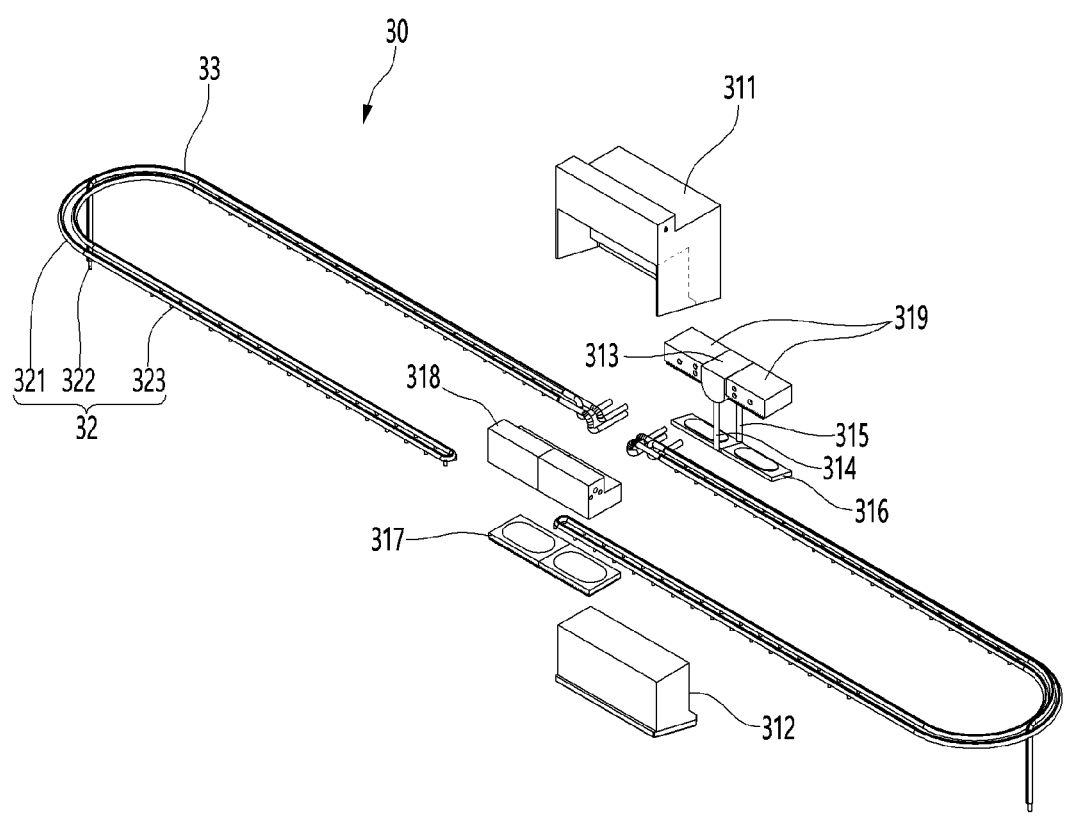
FIGS. 15 and 16 are exploded views of the steam supply device illustrated in FIG. 14.
Figure 16:
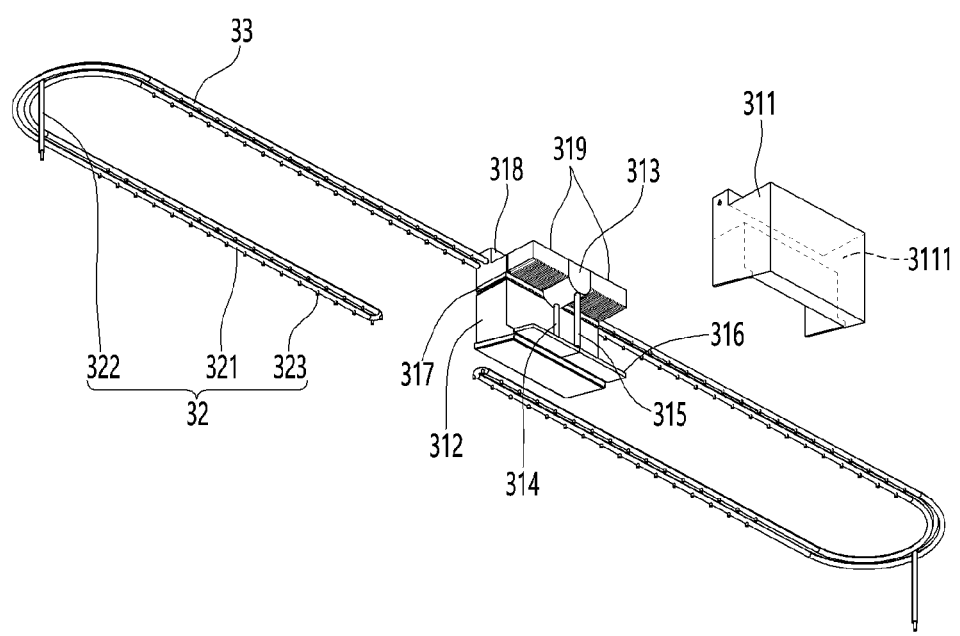

A steam supply device 30 and an filter cleaner 40 may be mounted inside the main body 11. A liquid tank 312 (see, e.g., FIG. 15) for storing liquid, e.g., water, for the steam supply device 30 may be access through a liquid tank access opening 1209, and a dust container 41 (see, e.g., FIG. 23) for the filter cleaner 40 may accessed through a dust container access opening 1208. Accordingly, a user may remove the liquid tank for re-fill of liquid, remove the dust container to empty the dust, and mount them back into the body 11.

The hanger device 10 may also include a filtering module 60, a fan module including a main fan module 15 and a sub-fan module 16 installed inside the main body 11. When the modules 15 and 16 are activated, the air outside the main body 11 passes through the filtering module 60, and the filtered air is discharged to the outside of the main body 11 via the through hole 101.

Figure 4:
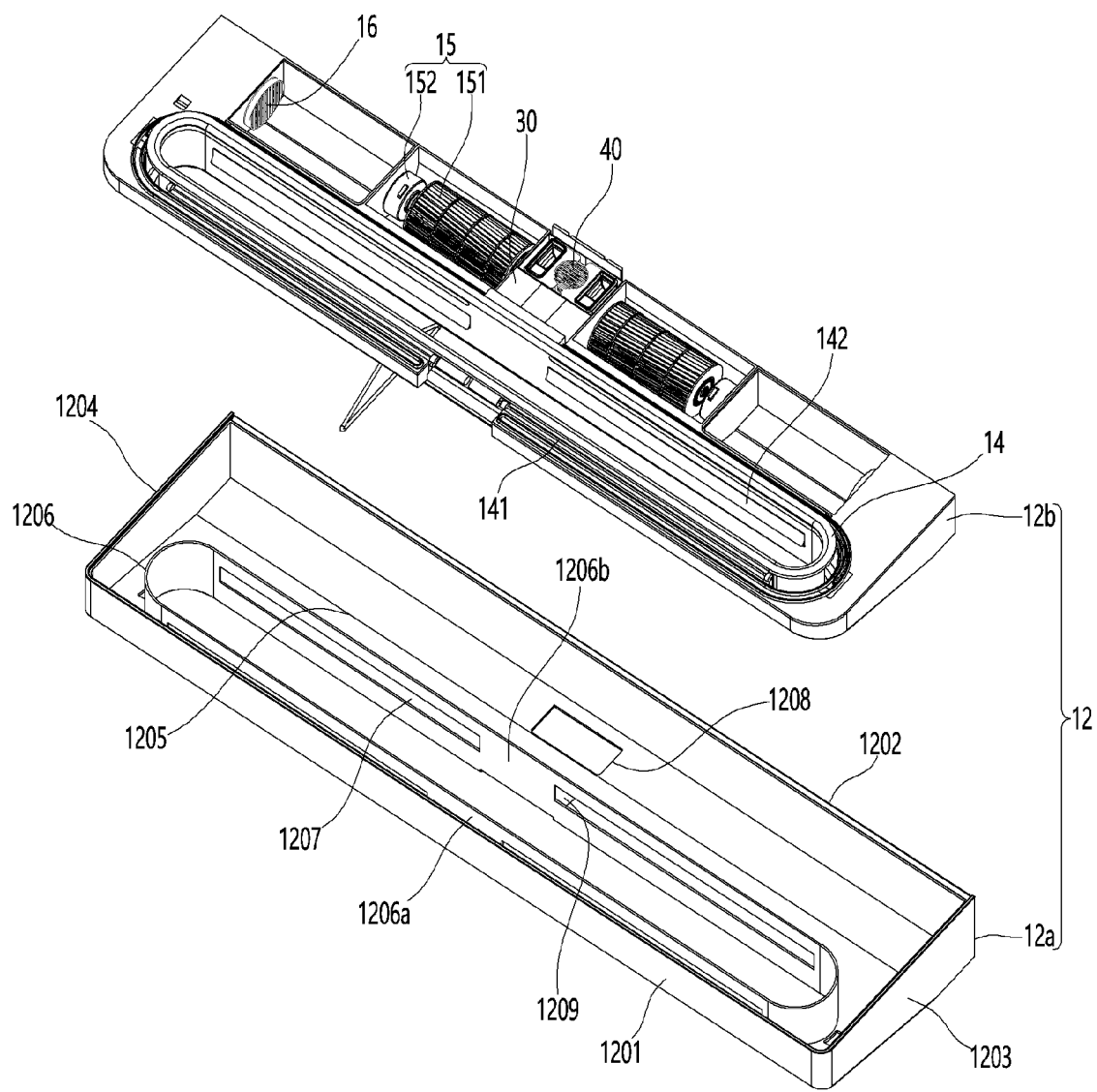
FIGS. 4 to 6 are exploded views of the hanger device illustrated in FIG. 2.
Figure 5:
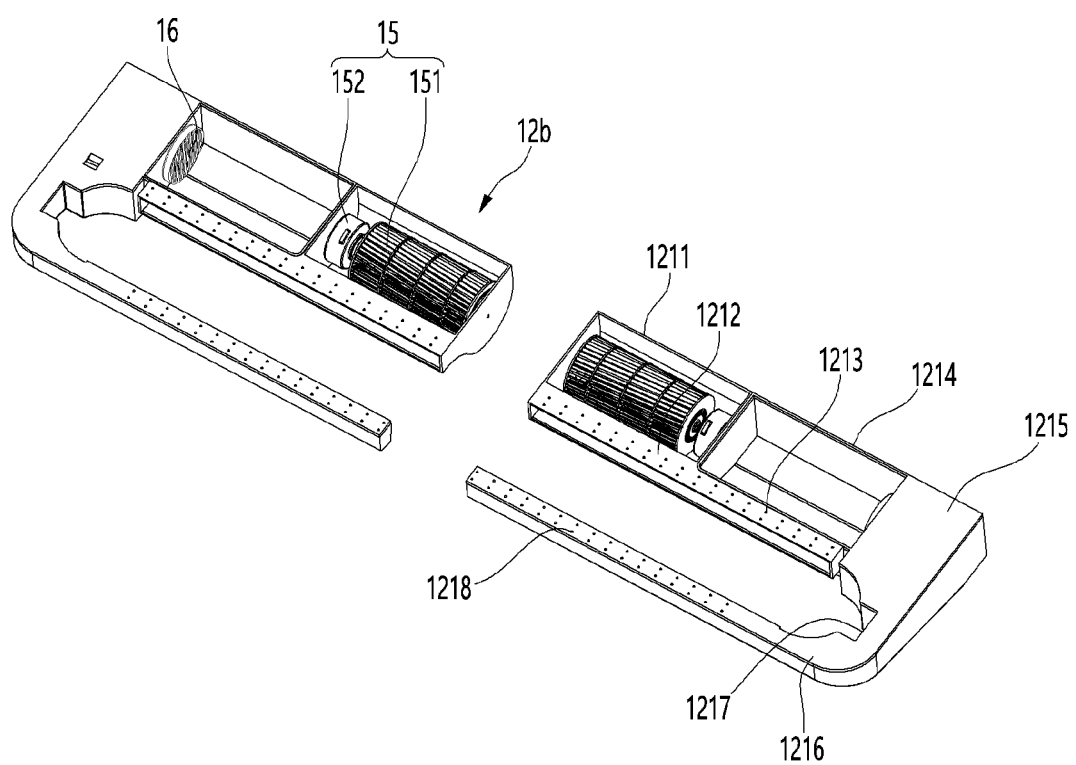
Figure 6:
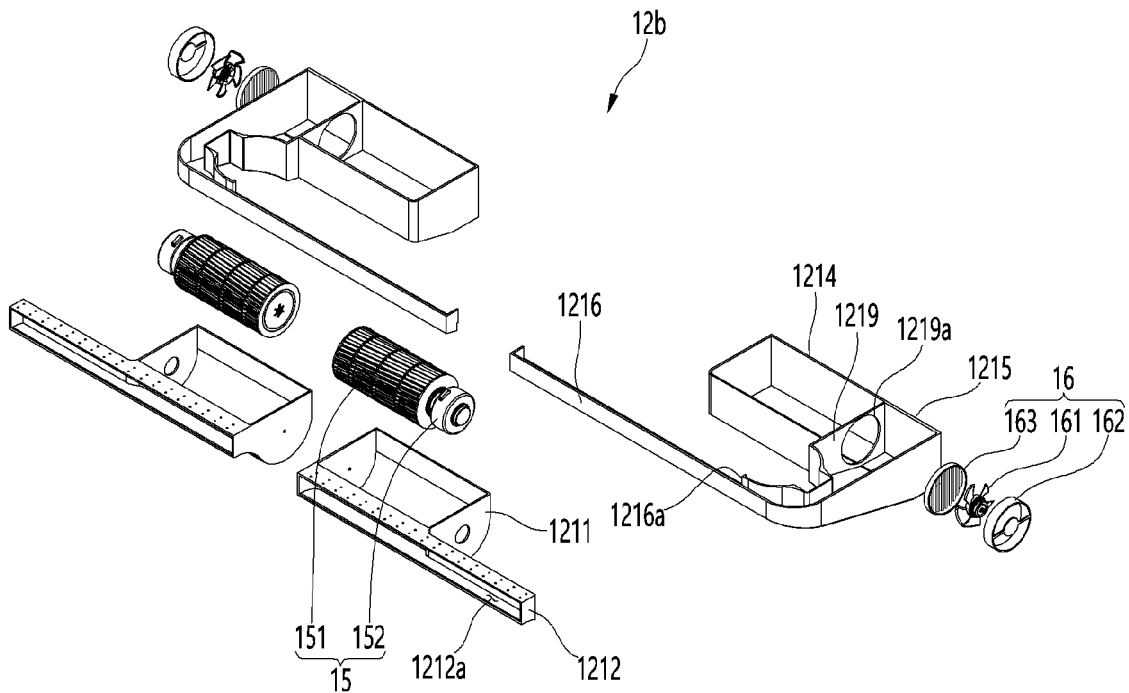

FIGS. 4 to 6 are exploded views of some of the components inside the cabinet 12 of the hanger device 10. The cabinet 12 may include a lower cabinet 12a and an upper cabinet 12b. The fan modules 15 and 16, the steam supply device 30, and the filter cleaner 40 are mounted on the upper cabinet 12.

The lower cabinet 12a may have a hexahedral shape with an open top, and the upper cabinet 12b may have a structure configured to fit into and/or to cover the top of the lower cabinet 12a. The lower cabinet 12a may include a front part 1201 (e.g, front wall), a rear part 1202 (e.g., a rear wall), a right side part 1203 (e.g., a right sidewall), a left side part 1204 (e.g., left sidewall), and a bottom part 1205 (e.g., bottom panel). The surface of the bottom part 1205 is formed to be inclined upward toward the front, resulting in a height of the rear portion 1202 to be larger than the height of the front portion 1201, but the present disclosure is not limited thereto.

The interior of the lower cabinet 12a may be divided includes a first region and a second region disposed in front of the first region. The filter cleaner 40 and the steam supply device 30 may be located in the first region, and a tube guide 1206 for coupling with the discharge tube 14 may be located in the second region. The dust container access opening 1208 and the liquid tank access opening 1209 may be formed in the bottom part 1205 of the lower cabinet 12a corresponding to the first region.

The tube guide 1206 may extend upward a predetermined length from the surface of the bottom part 1205 and may have substantially the same cross-sectional shape of the discharge tube 14. A plurality of discharge ports 1207 may be formed on the front section 1206a and rear section 1206b of the tube guide 1206. For example, two or more discharge ports may be formed on each of the front and rear sections 1206a, 1206b of the tube guide 1206. Alternatively, a single discharge port may be formed on the front section 1206a and the rear section 1206b of the tube guide 1206.

Figure 10:
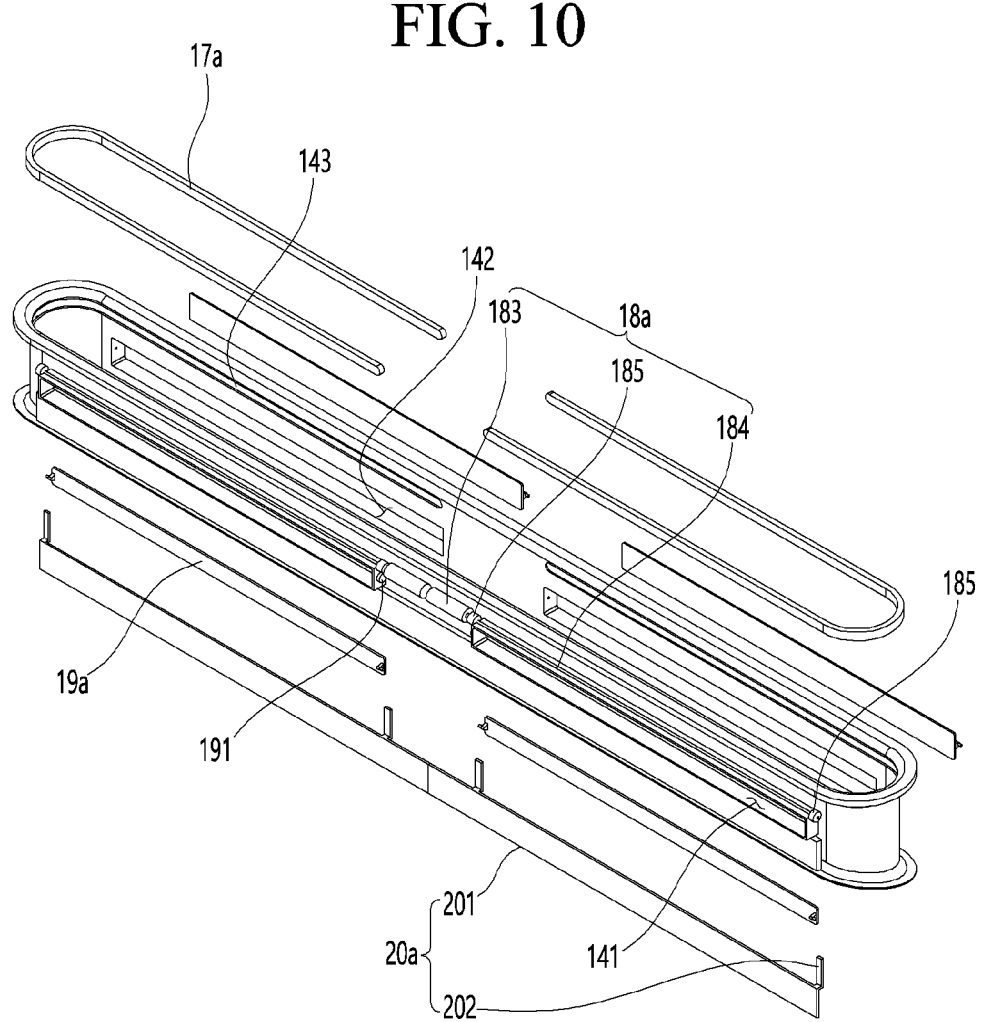
FIG. 10 is an exploded view of the discharge tube illustrated in FIG. 9.
Figure 11:
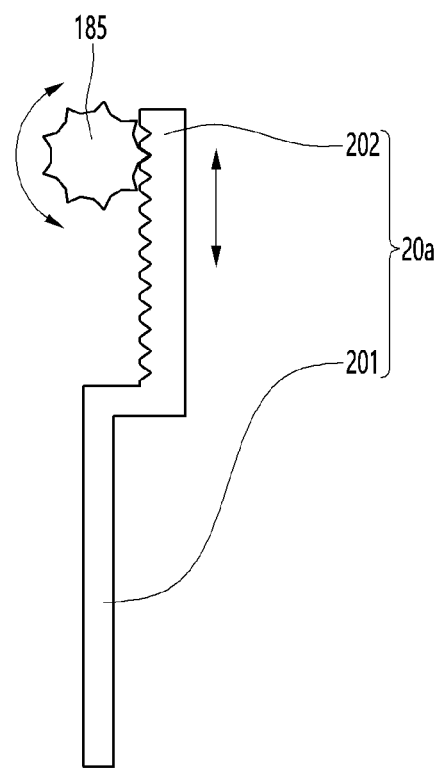
FIG. 11 is an cross-sectional view illustrating an operation of a wind guard shown in FIG. 10.

The upper cabinet 12b includes the discharge tube 14, which define the shape of the through hole 101. The discharge tube 14 is fitted inside the tube guide 1206 of the lower cabinet 12a. As shown in FIG. 4, the discharge tube 14 includes front discharge duct 141 and rear discharge duct 142 opening corresponding to the discharge ports 1207 formed on the front and rear sections 1206a, 1206b of the tube guide 1206. See also FIG. 10.

As illustrated in FIGS. 5 and 6, the upper cabinet 12b may include a left upper cabinet and a right upper cabinet, and may be configured to have a shape symmetrical to each other based on a vertical plane dividing the cabinet 12 into left and right halves. The steam supply device 30 and the filter cleaner 40 may be disposed between the left upper cabinet and the right upper cabinet, as shown in FIG. 4.

Each of the upper left cabinet and the upper right cabinet includes a main flow path assembly and a sub flow path assembly coupled to a side of the main flow path assembly. The main flow path assembly includes a main fan housing 1211 on which the main fan module 15 is placed, and a main discharge duct 1212 extending from the front end of the main fan housing 1211 in the width direction of the cabinet 12. The sub flow path assembly includes a suction guide 1214, a discharge guide 1215 provided on a side surface of the suction guide 1214, and a sub discharge duct 1216, which is bent to extend in an L shape from the front end of the discharge guide 1215. The suction guide 1214 is in close contact with the side surface of the main fan housing 1211.

A sub-fan mounting hole 1219*a* is formed in the partition wall 1219 that divides the suction guide 1214 and the discharge guide 1215, and a sub-fan module 16 is installed in the sub-fan mounting hole 1219*a*. The suction guide 1214 functions as a suction guide for guiding the air passing through the filtering module 60 to the sub fan module 16. The sub fan module 16 forces the air into the discharge guide 1215, and the forced air is guided to the sub-discharge duct 1216.

The upper cabinet 12*b* includes the discharge tube 14, and the discharge tube 14 is fitted inside the tube guide 1206 of the lower cabinet 12*a*. The sub discharge duct 1216 provided in each of the upper left cabinet and the upper right cabinet is inserted into the space between the side surfaces 1203 and 1204 and the front part 1201 of the lower cabinet 12*a*. The sub discharge duct 1216 includes a side sub discharge duct that extends from the front surface of the discharge guide 1215, extends along the side surface of the tube guide 1206, and is bent at the front end. As a result, the sub discharge duct 1216 extends alongside and between the front part 1201 and the front section 1206*a* of the tube guide 1206.

The discharge port 1216*a* of the sub discharge duct 1216 is configured to communicate with the discharge port 1207 formed on the front section 1206*a* of the tube guide 1206. The main discharge duct 1212 is in close contact with the back surface of the rear section 1206*b* such that the discharge port 1212*a* of the main discharge duct 1212 communicates with the discharge port 1207 provided on the rear section 1206*b* of the tube guide 1206. The discharge port 1216*a* of the sub discharge duct 1216 communicating with the discharge port 1207 formed on the front section 1206*a* may be referred to as a front discharge port. The discharge port 1212*a* formed in the main discharge duct 1212 and communicating with the discharge port 1207 formed in the rear section 1206*b* may be referred to as a rear discharge port.

A recess inside a side of the sub discharge duct 1216 forms a support mounting groove 1217. The pair of supports 51 of hanging unit 50 is accommodated in the support mounting groove 1217 provided on left and right sides of the cabinet 12. A plurality of steam holes 1213 are formed on the upper surface of the main discharge duct 1212 and a plurality of steam holes 1218 are formed on an upper surface of the sub discharge duct 1216.

The main discharge duct 1212 may extend to the discharge guide 1215 and extend past the front surface of the suction guide 1214. As shown in FIG. 5, the width of the main discharge duct 1212 may extend from one end of the main fan housing 1211 to the discharge guide 1215. One side end of the main fan housing 1211 is close to the center of the lower cabinet 12*a*, and the other end of the main fan housing 1211 is in close contact with the suction guide 1214.

The main fan module 15 includes a main fan 151 and a main fan motor 152 for driving the main fan 151, and the sub-fan module 16 includes a sub-fan 161, a sub-fan motor 162 for driving the sub-fan 161, and a suction grill 163 disposed the suction side of the sub-fan 161. The main fan 151 may be a cross-flow fan, and the sub-fan 161 may be an axial fan or a centrifugal fan.

Figure 7:
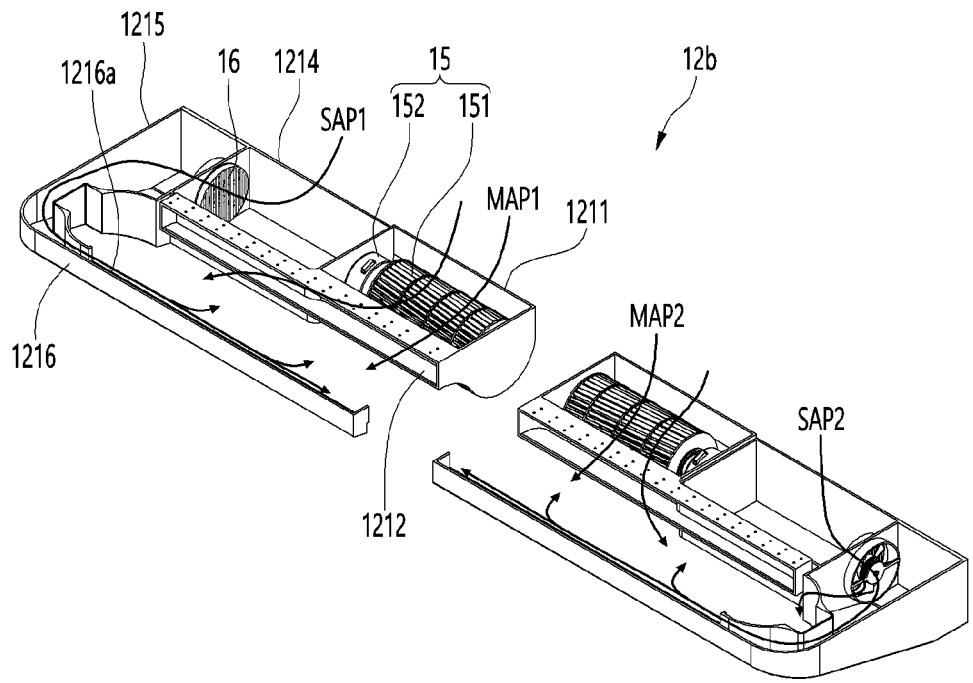
FIGS. 7 and 8 illustrates various air flow occurring inside the hanger device.
Figure 8:
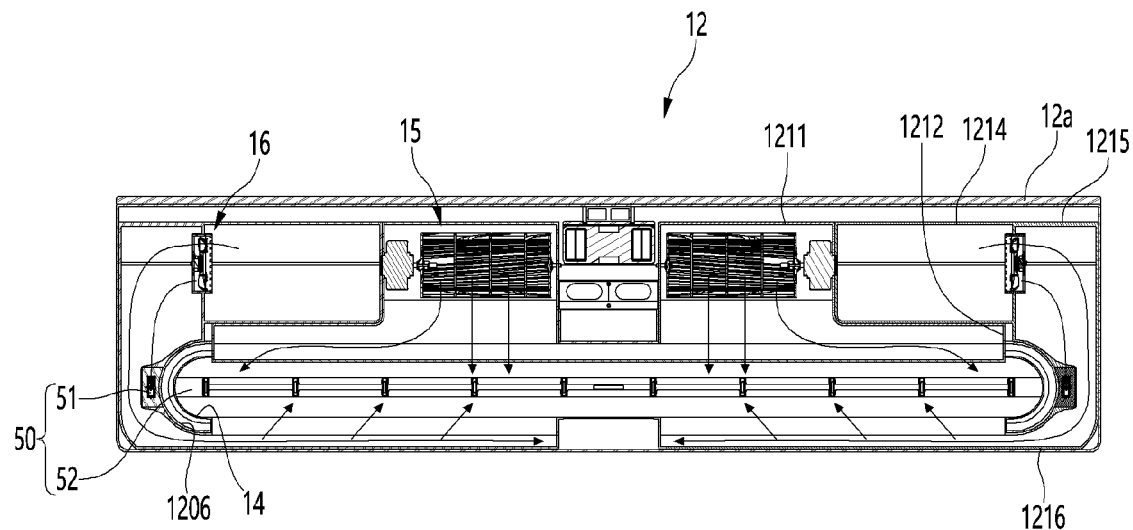
Figure 9:
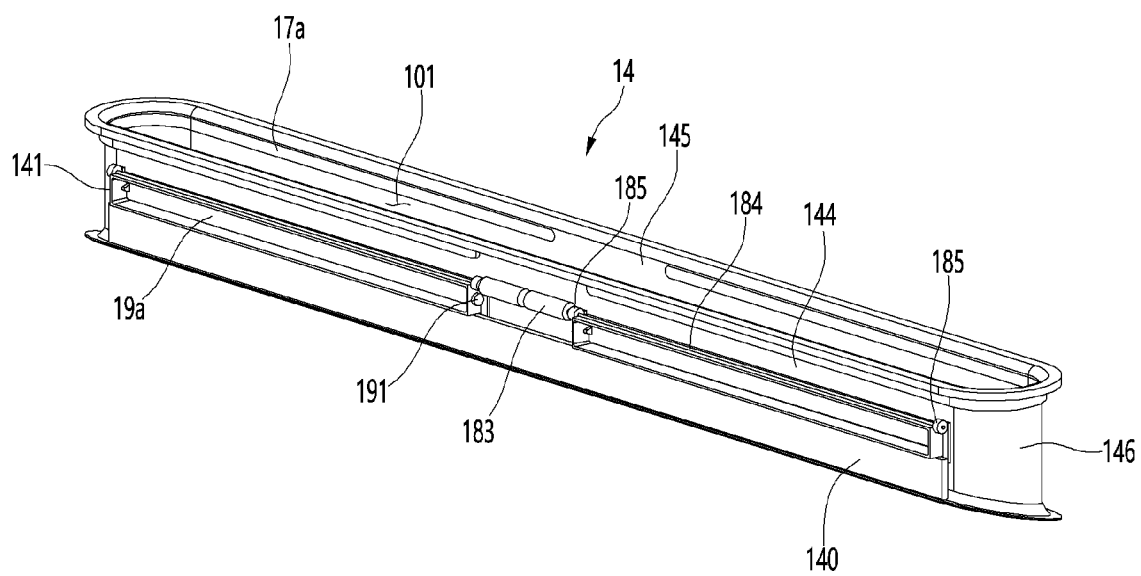
FIG. 9 is a perspective view of a discharge tube provided in the hanger device.

With reference to FIGS. 7 and 8, when the main fan module 15 and the sub-fan module 16 operate, indoor or ambient air is suctioned through the filtering module 60, and the filtered air flows into the cabinet 12 of the hanger device 10. A portion of the filtered air is introduced into the main fan housing 1211, discharged through the discharge port 1212*a* of the main discharge duct 1212, and exhausted at the rear discharge duct 142 of the discharge tube 14 (corresponding to a rear side surface of the through hole 10). This main air passage is indicated as MAP1 and MAP2 for the left and right sides in FIG. 7. The remaining air suctioned by the sub-fan 161 flows into the suction guide 1214, the discharge guide 1215 and the sub-discharge duct 1216 and is discharged through the discharge port 1216*a* and the front discharge duct 141 of the discharge tube 14 (corresponding to the front side surface of the through hole 101). The secondary air passage is indicated as SAP1 and SAP2 for the left and right sides.

A portion of the air forced toward the sub-discharging duct 1216 is supplied to the inside of the pair of supports 51 of the hanging unit 50. The supplied air flows along an inside of the hanging bar 52 and is discharged toward the clothes or items hung on the hanger through the plurality of outlets 522 formed in the hanging bar 52.

For example, the upper surface of the support 51 may be opened and designed to communicate with the flow path inside the sub-discharge duct 1216 such that a portion of the air flowing along the inside of the sub-discharge duct 1216 may flow into the supports 51. As another example, an air outlet may be formed on the side of the sub discharge duct 1216 defining the support mounting groove 1217, and an air inlet, communicating with the air outlet, is formed on the side of the support 51. Other configurations are possible to allow a portion of the air flowing along the sub discharge duct 1216 to be introduced into the support 51.

With reference to FIGS. 9 to 12, the discharge tube 14 according to an embodiment of the present disclosure includes a front section 144 extending a predetermined length along the width direction of the hanger device 10, a rear section 145 extending a predetermined length along the width direction of the hanger device 10 and a pair of side sections 146 connecting both ends of the front section 144 and the rear section 145. The pair of side sections 146 may be rounded with a predetermined curvature. The upper surface of the side sections 146 may be flat, but the lower surface of the side sections 146 may be inclined toward the rear of the discharge tube 14. As a result, a height of the rear section 145 may be greater than a height of the front section 144.

One or more discharge ducts may be formed on each of the front section 144 and the rear section 145. For example, a pair of front discharge ducts 141 may protrude from the front surface of the front section 144, and a pair of rear discharge ducts 142 may protrude from the rear surface of the rear section 145. The protruding ends of the front discharge duct 141 and the rear discharge duct 142 are respectively coupled to the discharge ports 1207 formed on the front and rear sections 1206*a*, 1206*b* of the tube guide 1206 to form an air discharge passage at front and rear of the through hole 101. A vane or a damper 19*a* may be rotatably coupled to each of the front discharge duct 141 and the rear discharge duct 142 by a vane motor 191, which allows selective control of air discharged to the through hole 101.

A wind guard cover 140 is formed to protrude from a front surface of the front section 144 so that a space is formed to accommodate the wind guard 20*a* between the wind guard cover 140 and the front section 144. The wind guard cover 140 is provided between the lower end of the front discharge duct 141 and the lower end of the front section 144. An opening is formed between the lower surfaces of the wind guard cover 140 and the front section 144 such that the wind guard 20a may descend past the opening to be exposed to the outside, as shown in FIG. 2.

A pair of wind guard driving units 18a for lowering or raising the wind guard 20a are provided above the front discharge duct 141. Each of the pair of wind guard driving units 18a includes a wind guard shaft 184, a pair of pinions 185 connected to both ends of the wind guard shaft 184, and a wind guard motor 183 configured to rotate the wind guard shaft 184 and the pair of pinions 185.

The wind guard 20a includes a guard body 201 and a guard rack 202 extending from the upper end of the guard body 201. Based on the number of pinions of the wind guard driving unit 18a, the same number of guard racks 202 extend from the guard body 201. In this embodiment, a pair of guard racks 202 extend from the upper left and right sides of the guard body 201 to engage with the pair of pinions 185 provided at both ends of one wind guard shaft 184. Gear teeth formed on the front surface of the guard rack 202 engage with the pinion 185. See FIG. 11.

Figure 12:
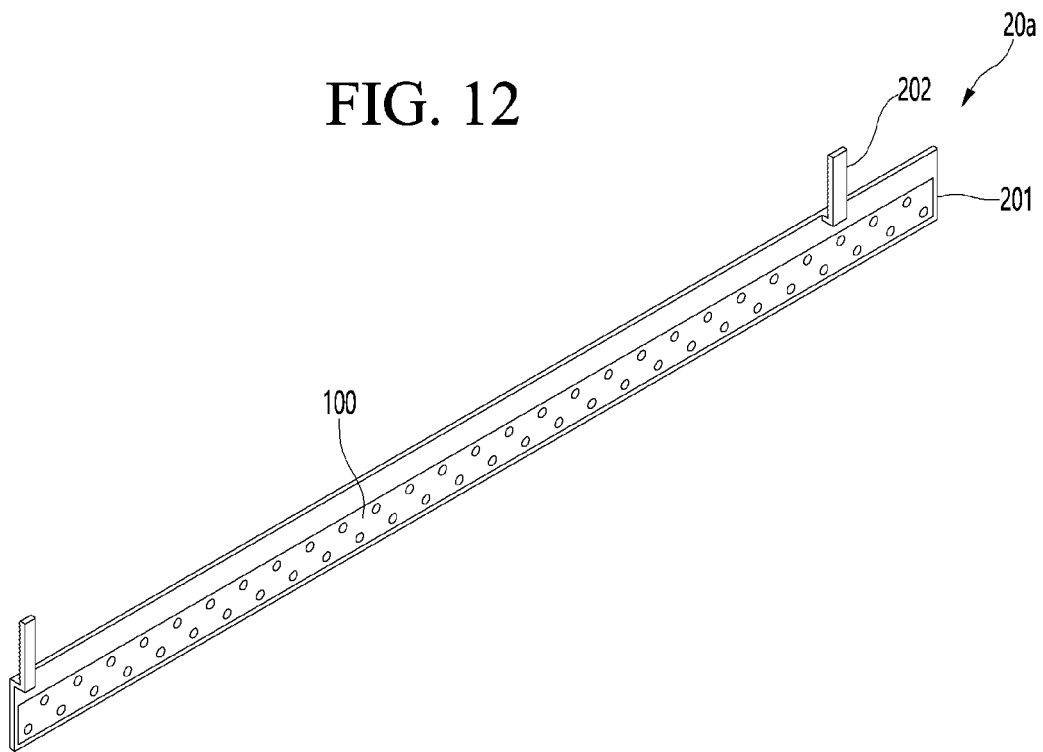
FIG. 12 is a rear perspective view of the wind guard.

As previously discussed, a display screen may be provided on the front surface of the guard body 201, and various information may be output through the display screen. As shown in FIG. 12, a sterilization module 100 may be mounted on the rear surface of the guard body 201. The sterilization module 100 may be composed of a PCB substrate and a sterilization LED mounted on the PCB substrate to emit ultraviolet rays to sterilize air and/or steam discharged through the through hole 101. For example, when the hot air supply mode or the steam supply mode is turned on, the wind guard 20a descends to be exposed outside of the hanger device 10, and in this state, air and/or steam descending through the through hole 101 may be sterilized when the sterilization module 100 is turned on. In an alternative embodiment, the irradiation direction of the ultraviolet rays emitted from the sterilization module 100 may be angled to be directed toward the hanger such that the clothes or items hung on the hanger are sterilized. In an alternative embodiment, the sterilization module 100a may be also mounted on the lower inner peripheral surface of the discharge tube 14.

A mood light 17a may be mounted on the discharge tube 14. For example, a mood light hole or groove 143 may be formed at an upper end of the discharge tube 14, and the mood light 17a may be mounted in the mood light hole 143. The mood light 17a may be mounted at any point between the upper end and the lower end of the discharge tube 14, and may be formed in a closed loop shape along the discharge tube 14. Alternatively, as shown, a pair of mood lights 17a having a U-shape may be disposed at positions symmetrical to each other.

When power is applied to the hanger device 10 or a hot air supply mode (or drying mode) or steam supply mode (humidification mode or wrinkle removal mode) is turned on, the mood light 17a may turned on, and light may be emitted softly through the through hole 101. The mood light 17a may be also controlled to change the illuminance or color of the mood light 17a according to the indoor temperature, indoor humidity, indoor pollution, or the degree of drying of clothes. The mood light 17a may be an LED module and a surface light emitting unit including a light guide plate for diffusing light emitted from the LED module. Further, a mood light may be mounted on the rear surface of the guard body 201 corresponding to the upper side of the sterilization module 100.

Figure 13:
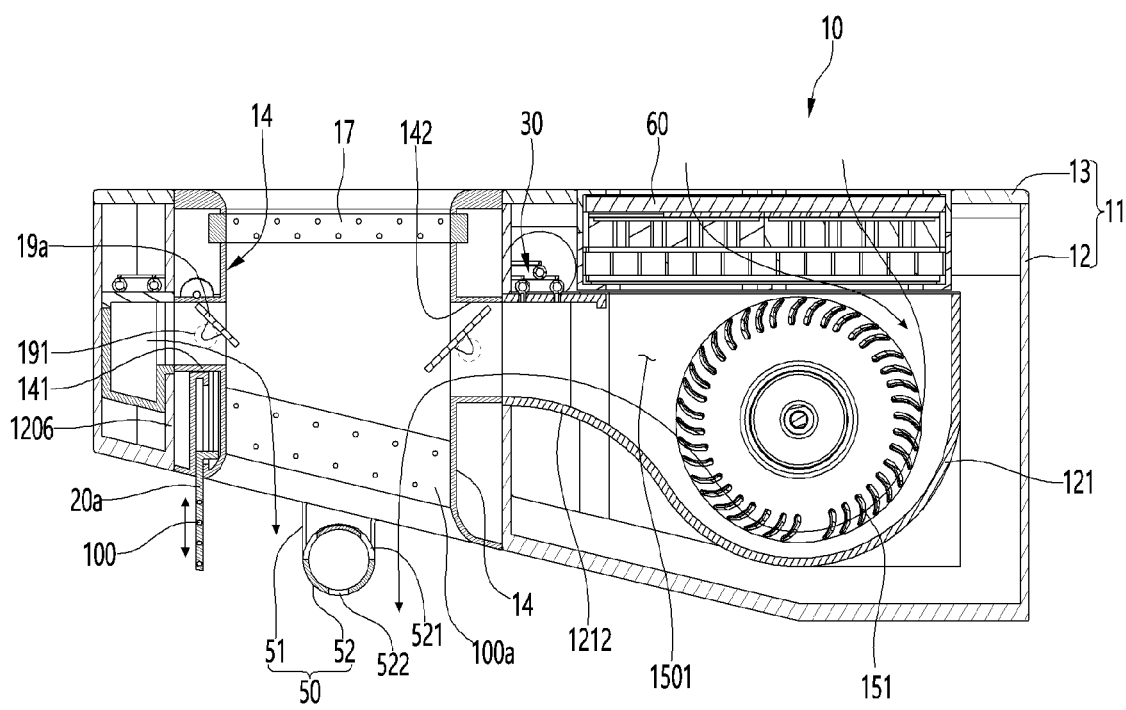
FIG. 13 is a longitudinal cross-sectional view of the hanger device taken along line 13-13 of FIG. 2.
Figure 14:
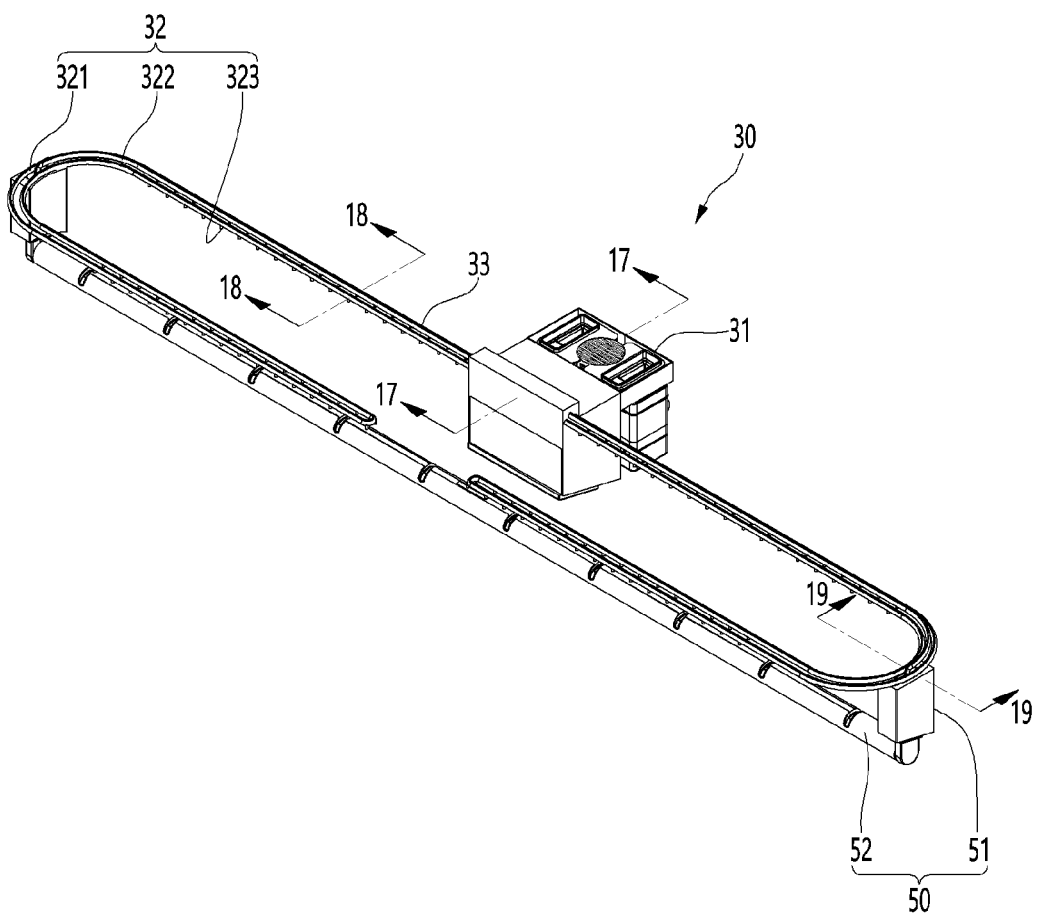
FIG. 14 is a perspective view illustrating a steam supply device of the hanger device according to an embodiment of the present disclosure.

As shown in FIG. 13, when the main fan module 15 and the sub-fan module 16 are turned on, indoor air passes through the filtering module 60, and filtered air discharged to the hanging unit 50 through the front discharge duct 141 and the rear discharge duct 142. The air discharge direction may be controlled by the rotation angle of the vane 19a in the vertical direction. Further, the wind guard 20a is lowered to be exposed to the outside for minimizing a phenomenon in which the air discharged from the discharge ducts 141 and 142 is diffused toward the front of the hanger device 10. The wind guard 20a allows air to be discharged toward the clothes or items hung on the hanger device 10, and at the same time, the air is sterilized by the sterilization module 100.

As shown in FIGS. 14 to 18, the steam supply device 30 according to the embodiment of the present disclosure includes a steam generator 31 for generating steam, a steam supply pipe 32 extending from the steam generator 31, and a heater 33 attached to the outer circumferential surface of the steam supply pipe 32 along the steam supply pipe 32. The steam generated by the steam generator 31 may flow along the steam supply pipe 32 by the pressure of the generated steam. In an operation mode in which the steam supply device 30 operates to supply steam, the fan modules 15 and 16 may maintain a stopped state to prevent conflict between the dehumidification function and the steam supply function.

The steam supply pipe 32 includes a main supply pipe 321 extending adjacent to an outer edge of the upper end of the discharge tube 14, a sub-supply pipe 322 extending downwards within a support 51 of the hanging unit 50, and a plurality of discharge nozzles 323 extend from a bottom surface of the main supply pipe 321. The plurality of discharge nozzles 323 align with the steam holes 1213 formed on an upper surface of the main discharge duct 1212 and the steam holes 1218 formed on the upper surface of the sub discharge duct 1216. See FIG. 5. The steam discharged through the discharge nozzles 232 is supplied to the main discharge duct 1212 and the sub discharge duct 1216.

The heater 33 is configured to be in close contact with the surface of the steam supply pipe 32 to prevent the steam flowing along the steam supply pipe 32 from being cooled and condensed. The heat generated by the heater 33 is transferred to the steam supply pipe 32 by heat conduction such that the steam flowing along the inside of the steam supply pipe 32 is prevented from being condensed due to heat loss.

The steam generating unit 31 may include a steam case 311 to house a pump 313, suction pipe 314, discharge pipe 315, induction heaters 316, 317 (or other types of heater, e.g a sheath heater or a planar heater), a heating tank 318, a steam chamber 319, and the steam generating chamber 3111. The heating tank 318 is coupled to the front upper side of the steam case 311, and the pump 313 is coupled to the rear upper side of the steam case 311. The liquid tank 312 is detachably coupled underneath the heating tank 318. A steam chamber 319 is provided on the left and right sides of the pump 313. A steam generating chamber 3111 is formed inside the steam case 311 corresponding to the lower side of the pump 313.

An induction heater 316 is mounted on the bottom of the steam generating chamber 3111 to heat the water supplied to the steam generating chamber 3111 to a vapor state. The liquid tank 312 is disposed in front of the steam generating chamber 3111, and the bottom of the liquid tank 312 is inclined downward toward the steam generating chamber 3111. The rear lower end edge of the liquid tank 312 may extend further to the rear to allow a residual water reservoir 3121 to be formed such that the residual water reservoir 3121 is configured to be located below the front lower end of the steam generating chamber 3111. the liquid tank 312 is accessible via liquid tank access opening 1209 to fill or re-fill the liquid tank.

Figure 17:
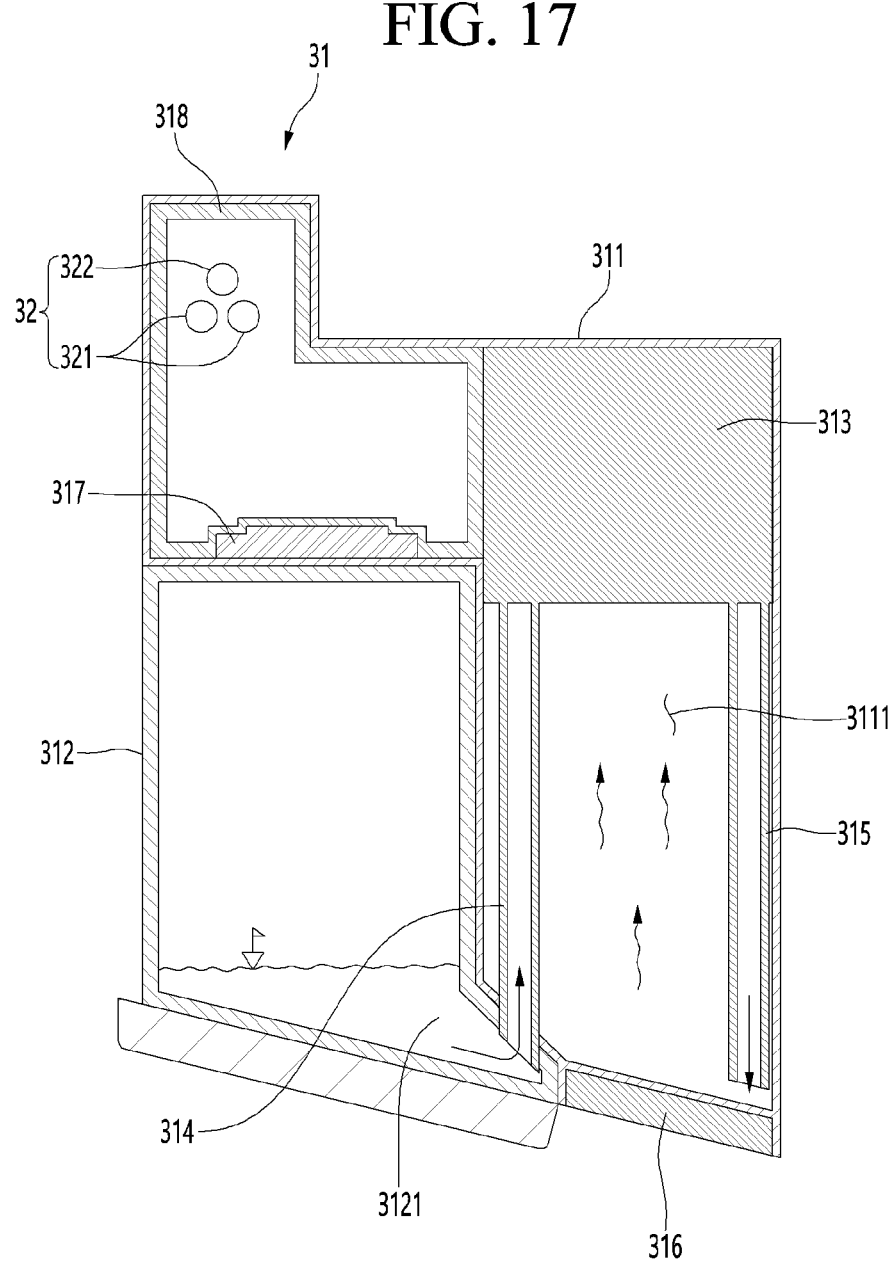
FIG. 17 is a side cross-sectional view of the steam generator along line 17-17 of FIG. 14.
Figure 18:
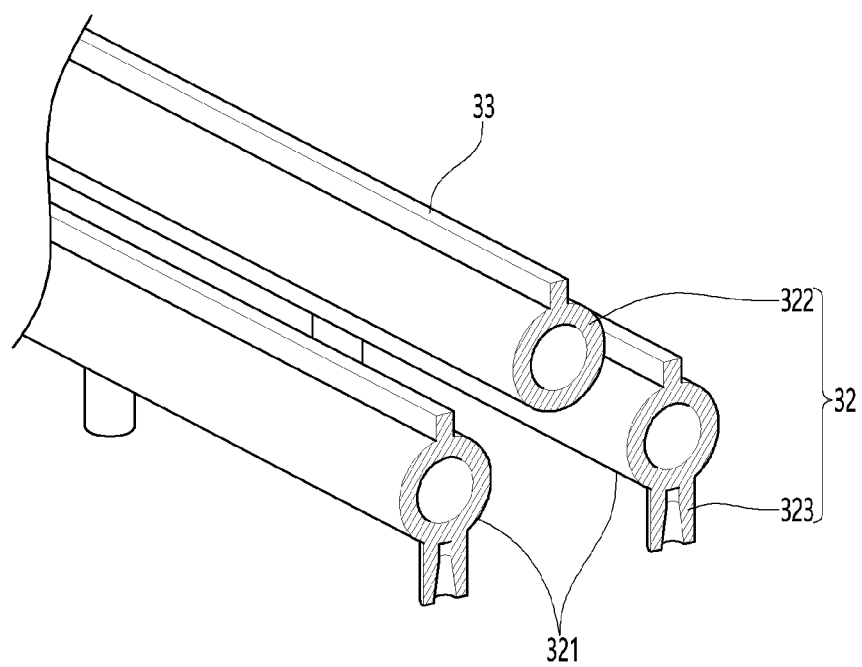
FIG. 18 is a longitudinal cross-sectional view of the steam supply pipe along line 18-18 of FIG. 14.

As shown in FIG. 17, the lower end of the steam case 311 defining the lower front end of the steam generating chamber 3111 is configured to be stacked above or overlapped over the residual water reservoir 3121. A suction pipe 314 and a discharge pipe 315 extend vertically from the bottom of the pump 313. The end of the suction pipe 314 passes through a bottom of the steam case 311 into the liquid tank 312 and is configured to end near a bottom of the the residual water reservoir 3121. With this structure, majority of liquid stored the liquid tank 312 may be suctioned by the pump 312 through the suction pipe 314, and discharged into the steam generation chamber 3111 by the discharge pipe 315 for vaporization by the induction heater 316. The discharge pipe 315 may extend vertically and spaced apart from the suction pipe 314 to the rear of the steam case 311.

The heating tank 318 may be disposed above the liquid tank 312, and the induction heater 317 may be mounted at the bottom of the heating tank 318. The steam chamber 319 communicates with the heating tank 318, and the steam generated in the steam generating chamber 3111 is supplied into the heating tank 318 through the steam chamber 319.

The steam supply pipe 32 and the heater 33 are connected to the left and right sides of the heating tank 318. The main supply pipe 321 and the sub supply pipe 322 are connected to the left side and the right side of the heating tank 318. One end of the sub supply pipe 322 is connected to the side of the heating tank 318 and the other end extends into the support 51. Both ends of the main supply pipe 321 are connected to the side surfaces of the heating tank 318 to form a loop such that majority of the steam is supplied to the front and rear discharge ducts 141 and 142, but a part of the steam flowing along the main supply pipe 321 may return to the heating tank 318.

As the heating tank 318 is heated by the induction heater 317, the steam flowing into the heating tank 318 through the steam chamber 319 is mixed with the steam returning to the heating tank 318, which further prevents liquid condensation. Because the steam pressure inside the heating tank 318 is maintained by the induction heater 317, the pressure drop inside the steam supply pipe 32 may be minimized such that a spray distance (or a discharge distance) of the steam discharged through the discharge nozzle 323 may be sufficiently maintained.

Figure 19:
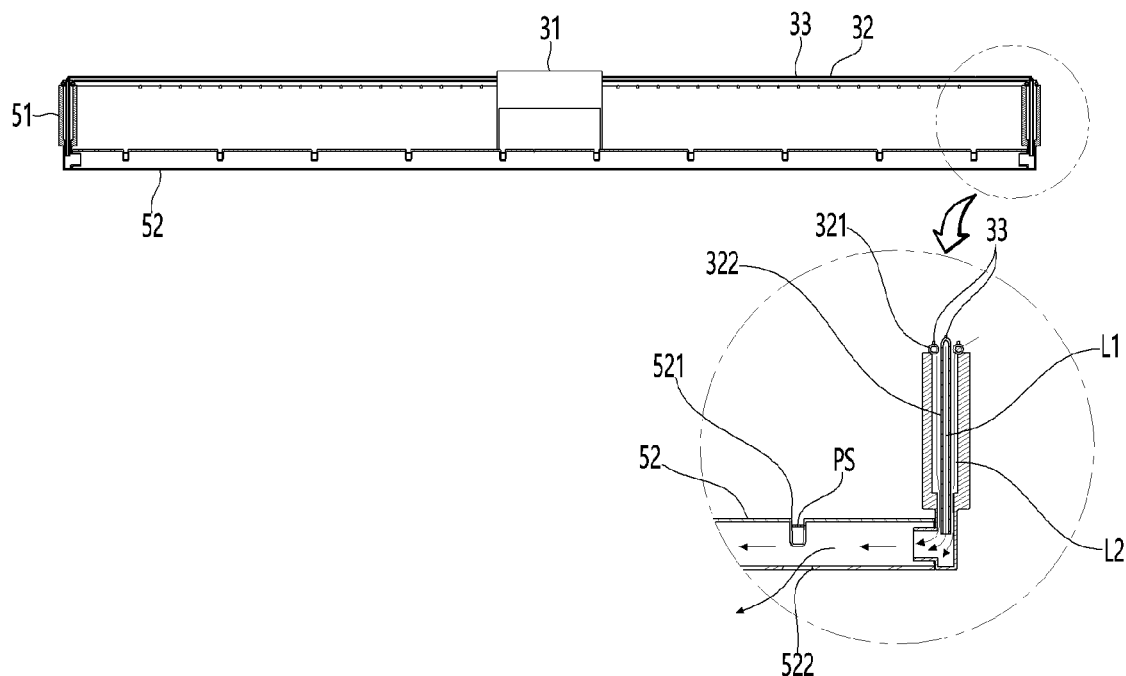
FIG. 19 is a longitudinal sectional view of the hanging unit taken along line 19-19 of FIG. 14.
Figure 20:
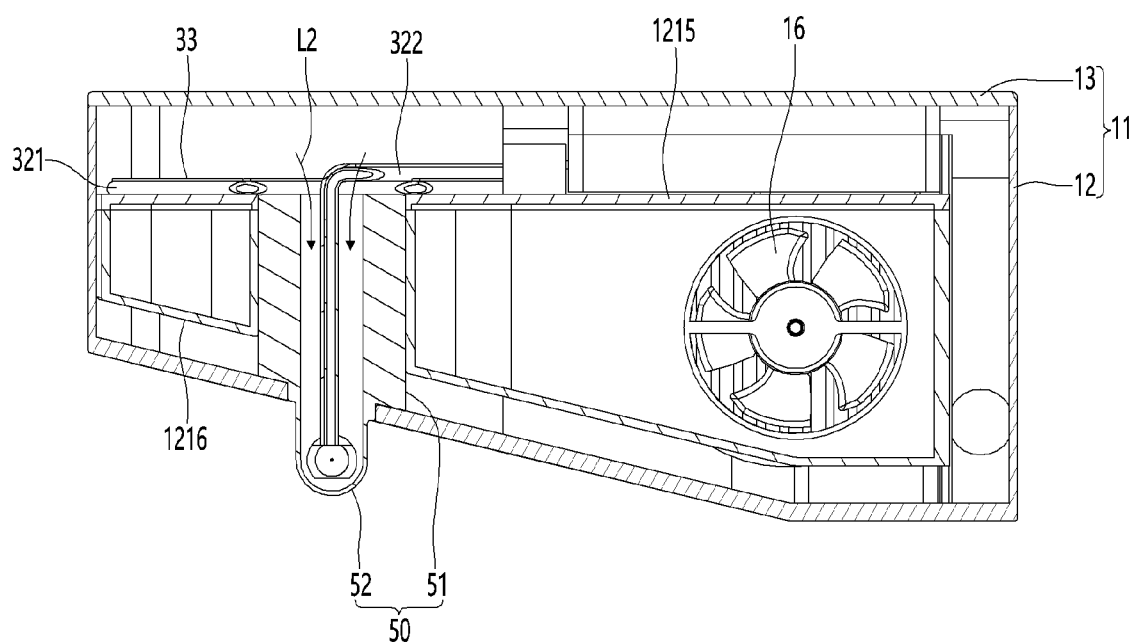
FIG. 20 is a side cross-sectional view of the hanger device taken along 20-20 of FIG. 2.

With reference to FIGS. 19 and 20, one end of the sub-supply pipe 322 of the steam supply pipe 32 extends into the support 51 such that a part of the steam supplied from the steam supply device 30 is directed into the hanging bar 52. One end of the sub-supply pipe 322 may extend to a point adjacent to the lower end of the support 51 to which the hanging bar 52 is connected. An internal flow path of the sub supply pipe 322 accommodated in the support 51 may be defined as a steam flow path L1.

Further, a part of the air introduced into the cabinet 12 by the sub-fan module 16 is supplied into the support 51 of the hanging unit 50. As the air flows into the filtering module 60, foreign substances may be filtered out, and the air may be heated to a temperature higher than ambient temperature prior to entering the support 51, which will be described hereinafter with reference to FIG. 26. Accordingly, a flow path including the inside of the support 51 and the inside of the hanging bar 52 may be defined as a dry air flow path L2.

As shown, the hanger bar 52 is hollow to allow communication with the steam flow path L1 and dry air flow path L2. A plurality of hanger grooves 521 may be formed to be spaced apart from each other at a predetermined distance on top of the hanging bar 52. The hanger groove 521 may be recessed a predetermined depth from the outer circumferential surface of the hanging bar 52, and may extend a predetermined length in the circumferential direction of the hanging bar 52. A plurality of outlets 522 may be formed on the bottom of the hanging bar 52. Accordingly, the dry air provided via dry air flow path L2 or the steam provided via steam flow path L2 may be discharged to the outside of the hanging bar 52 through the plurality of outlets 522.

A pressure sensor PS may be mounted on the bottom of the hanger groove 521. When a hook of a hanger is placed into the hanger groove 521, the pressure sensor PS detects the load of the cloth or item on the hanger. Based on the position information of the pressure sensor PS that detects the load on the clothes hanger and the load information of the clothes detected by the pressure sensor PS, the discharge of dry or steam may be selectively supplied to the location where the clothes or items are hung.

For example, when clothes are eccentrically hung on the left or right side of the hanging bar 52, i.e., the clothes are hung on the left and right sides of the cabinet 12, more dry air or steam may supplied to the side where the clothes are hung. When more items or heavier items are hung on the right side, the main fan module 15 and the sub-fan module 16 may be operated alone or at higher speed compared to the left side such that greater amount of dry air is provided to the front discharge duct 141, rear discharge duct 142 and the dry air flow path located on the right side of the cabinet 12. Similar operation of the steam supply device may be applied by providing left and right valves to main steam supply pipes 322 and sub supply pipes 323 coupled to the right and left side of the heating tank.

Figure 21:
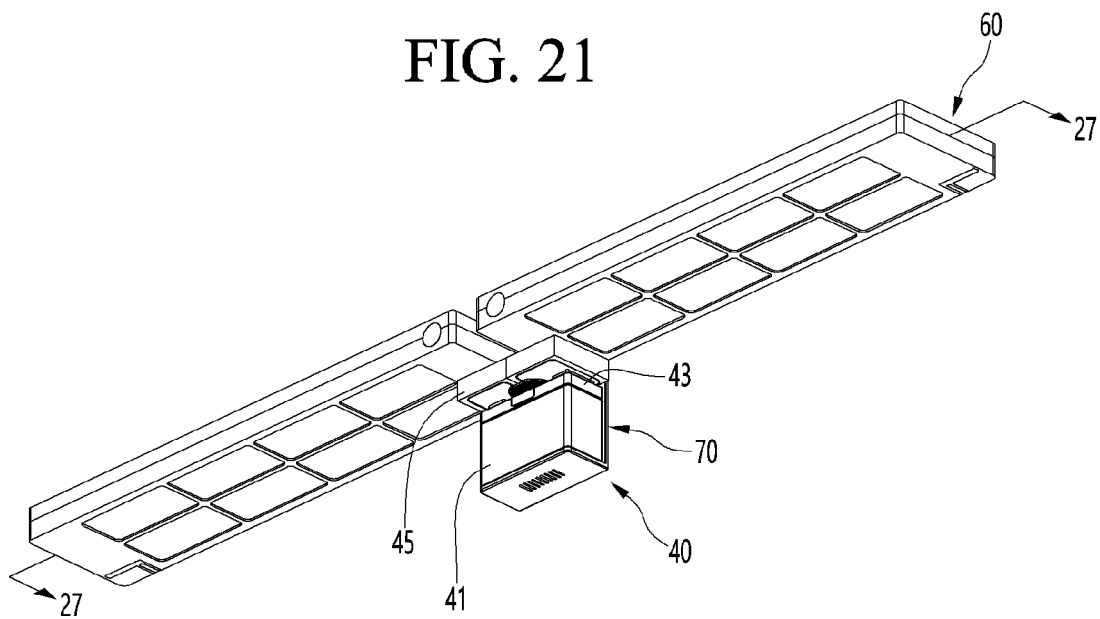
FIG. 21 is a front-bottom perspective view showing a coupling state of a filter cleaner and a filtering module according to an embodiment of the present disclosure.
Figure 22:
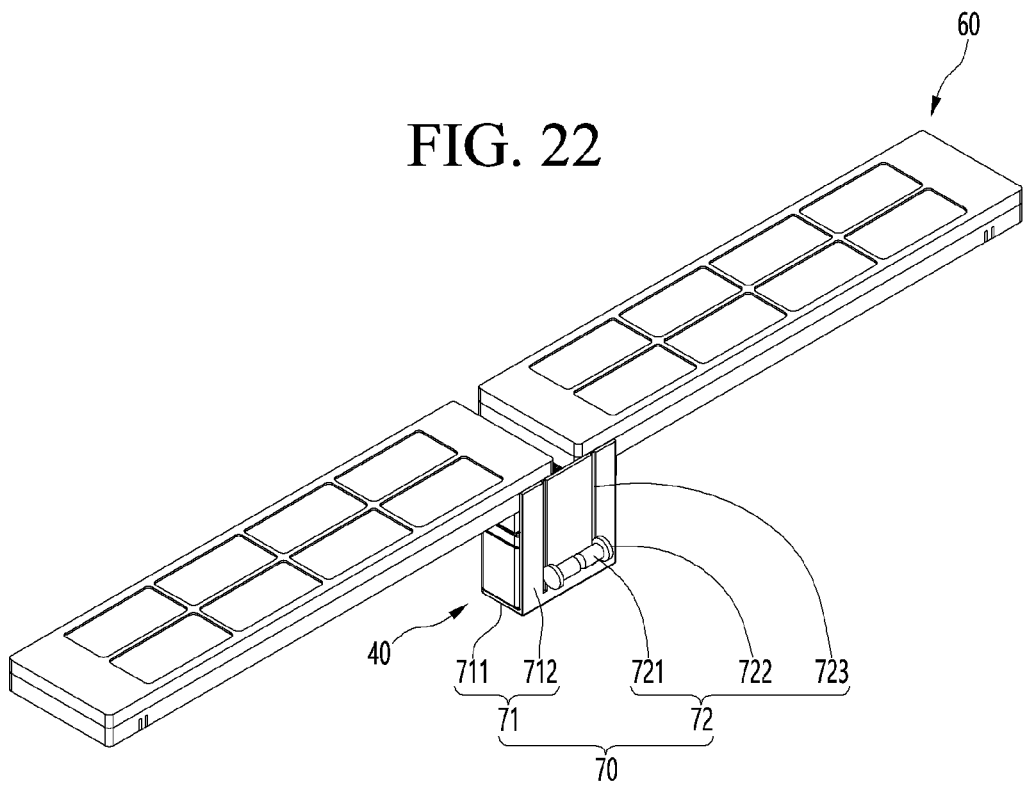
FIG. 22 is a rear-top perspective view illustrating a coupling state between the filter cleaner and the filtering module.

With reference to FIGS. 21 and 22, the hanger device 10 includes a filtering module 60 for filtering or removing foreign substances contained in indoor or ambient air, an filter cleaner 40 for further cleaning the foreign substances in the suctioned air, and a lift 70 for raising or lowering a dust container 41 of the filter cleaner 40. The filter cleaner may be used clean the filtering module 60 by removing dust (foreign substances) accumulated inside the filters of the filtering module 60. The filter cleaner 40 may include the dust container 41 for collecting foreign substances separated from suctioned air, a top cover 43 coupled to an open upper end of the dust container 41, and a dust connector 45 coupled to the upper surface of the top cover 43.

The lift 70 includes a lift plate 71 on which the dust container 41 is seated, and a lift driver 72 for vertically moving the lift plate 71. The lifting plate 71 includes a horizontal portion 711 on which the dust container 41 is placed, and a vertical portion extending upward from the rear end of the horizontal portion 711 to support the rear surface of the dust container 41. One or more lift racks 723 extend a predetermined length in the vertical direction on the rear surface of the vertical portion 712. The lift driver 72 includes a lift pinion 722 configured to engage with the lift rack 723, and a lift motor 721 for rotating the lift pinion 722.

When the dust container 41 is filled with dust or foreign substances, a user may turn on the lift driver 72 to lower the dust bin 41 to the outside of the hanger device 10 through the dust container access hole 1208. When the dust container 41 descends together with the lift plate 71 and is completely exposed from the main body 11 through the dust container access hole 1208, the user may separate the dust container 41 from the lift plate 71 to empty the dust or foreign substances from the dust container. After emptying, the dust container 41 is seated on the lift plate 71, and the lifting driver 72 is driven to raise the dust container 41 to sufficiently seal the dust container to the bottom surface of the dust connector 45.

In an alternative embodiment, when the lift plate 71 descends, the dust connector 45, the top cover 43, and the dust container 41 may be designed to be separated from the filtering module 60. Alternatively, when the lift plate 71 descends, the dust connector 45 and the dust collector 44 remain coupled to the filtering unit 60, and the top cover 43 and the dust container 41 may be designed to descend together with the lifting plate 71. Alternatively, when the lift plate 71 descends, only the dust container 41 may be designed to descend together with the lift plate 71.

The combination of the top cover 43 and the dust container 41 may be defined as a dust collecting device, and the combination of the dust collector 44 and the dust collecting filter 47 (FIG. 28) may be defined as a dust collecting device.

Figure 23:
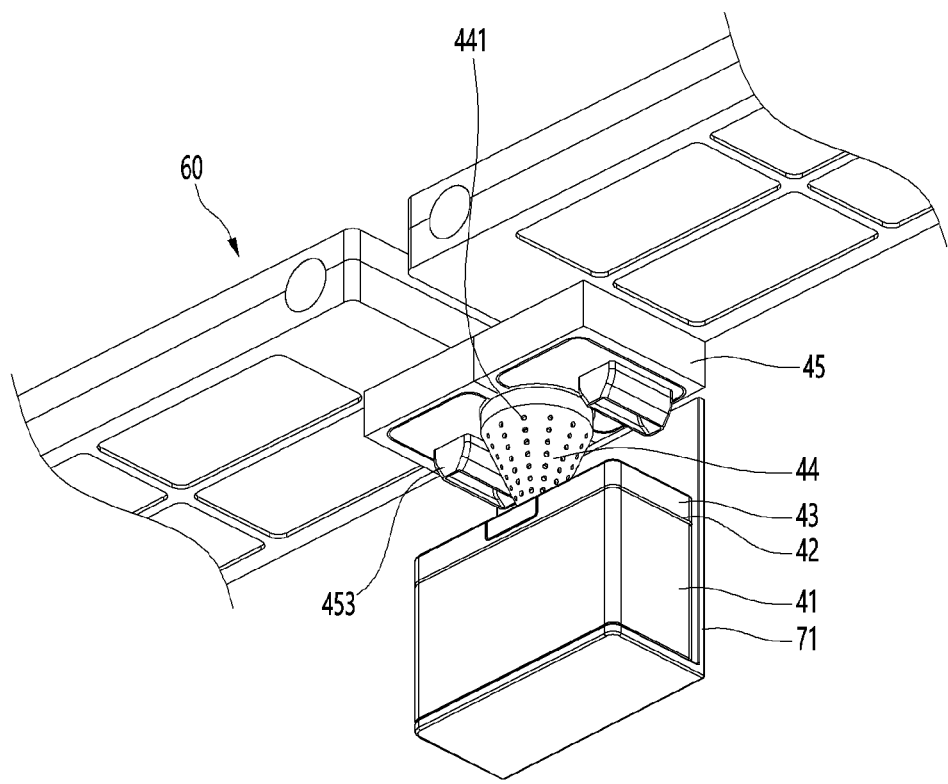
FIG. 23 is a view showing a state in which the dust bin is separated from the dust connector by the operation of the elevating driver.
Figure 24:
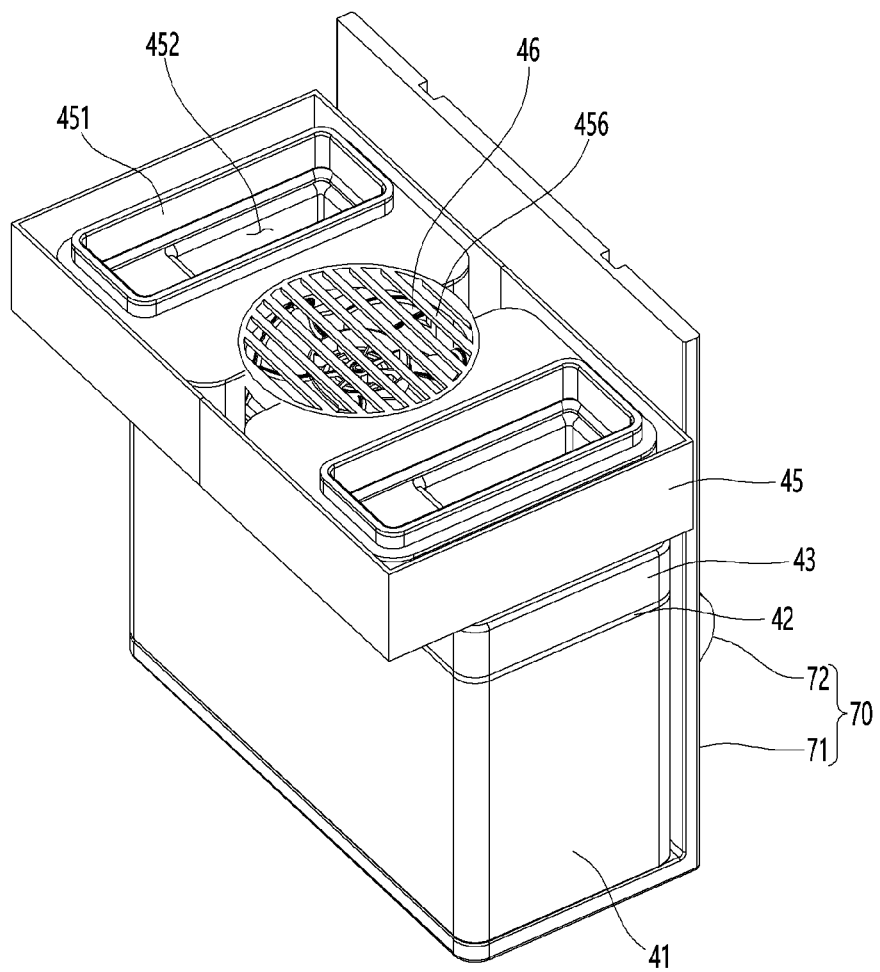
FIG. 24 is a view showing a coupling state of a dust connector and a dust container.
Figure 25:
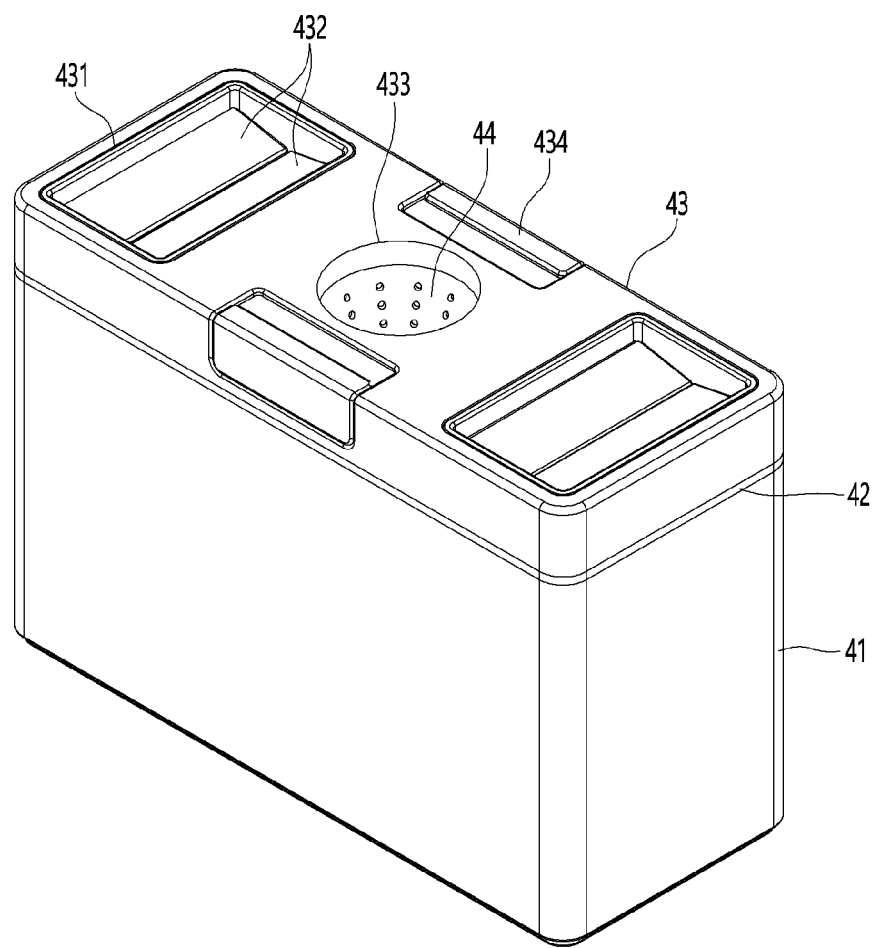
FIG. 25 is an external perspective view of the dust container.

With reference to FIGS. 23 to 25, a dust collector 44 is mounted on the bottom surface of the dust connector 45, and a suction fan module 46 is installed inside the dust connector 45 corresponding to the upper side of the dust collector 44, and a discharge grill 456 is formed on the upper surface of the dust connector 45 corresponding to the upper side of the suction fan module 46. The dust collector 44 is formed in the shape of a cone whose width becomes narrower toward the bottom, and a plurality of filtering holes 441 are formed. An operation of removing the dust will be described hereinafter with reference to FIGS. 27 and 28.

A dust inlet 452 is formed at the left and right edges of the dust connector 45. A mounting sleeve 451 is provided on the upper surface of the dust connector 45 corresponding to the edge of the dust inlet 452 to from a protrusion. The mounting sleeve 451 may have a rectangular cross-sectional shape, but the shape is not limited thereto. A dust outlet 613 (see e.g., FIG. 28) communicating with the mounting sleeve 451 is formed on the bottom surface of the filtering module 60 to which the dust connector 45 is coupled. A number of filtering modules 60 may be based on a number of the mounting sleeves 451. In this instance, a pair the mounting sleeves 451 are coupled to the pair of filtering modules 60. A suction duct 453 extends from the bottom surface of the dust connector 45, corresponding to the lower side of the pair of mounting sleeves 451.

The opened upper surface of the dust container 41 is shielded by the top cover 43 having a handle 434 at front and rear edges. A dust collector through hole 433 through which the dust collector 44 passes is formed in the center of the top cover 43. A duct insertion holes 431 may be formed on left and right edges of the top cover 43 and align with the left and right suction ducts 453. A pair of dampers 432 facing each other are provided inside the duct insertion hole 431 The pair of dampers 432 may be rotatably hinged and spring loaded in a closed position. When the dust container 41 is coupled to the dust connector 45, the suction duct 453 is inserted into the duct insertion hole 431 and push the pair of dampers 432 to rotate to an open position. When the dust container 41 is lowered to separate from the dust connector 45 by the lift 70, the suction duct 453 is pulled out from the duct insertion hole 431, and the pair of dampers 432 rotate to return to a closed position.

Figure 26:
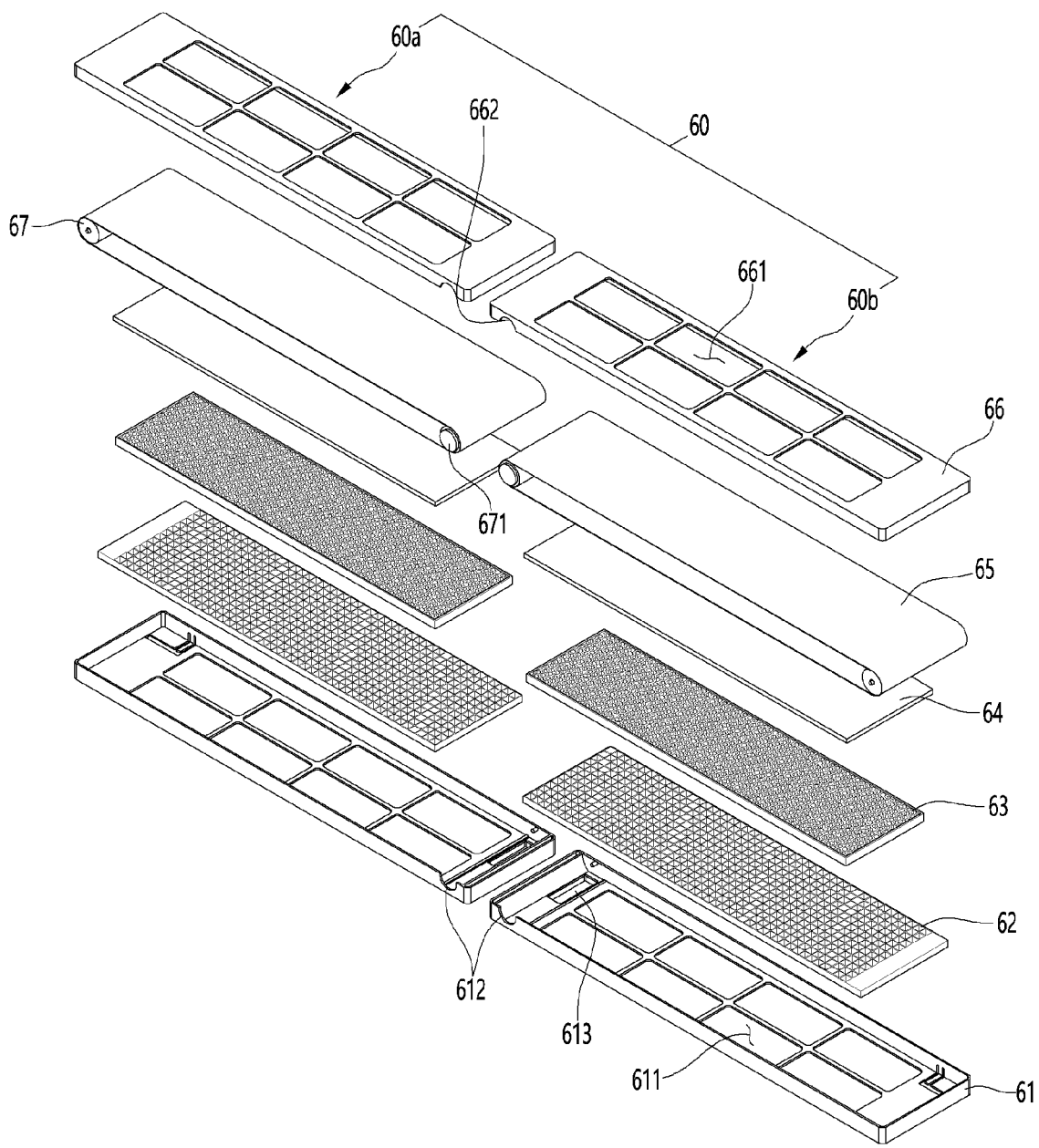
FIG. 26 is an exploded view of a filtering module according to an embodiment of the present disclosure.
Figure 27:
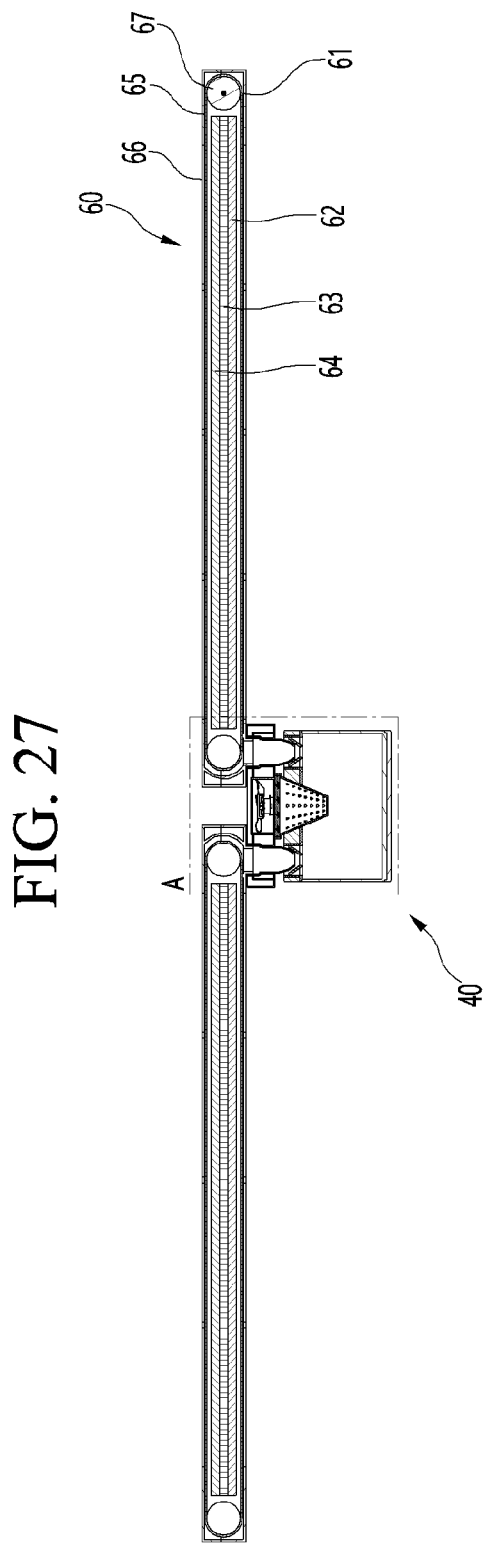
FIG. 27 is a longitudinal cross-sectional view of the filter cleaner and the filtering module along line 27-27 of FIG. 21.

Referring to FIGS. 26 and 27, the filtering module 60 according to an embodiment of the present disclosure includes a first filtering module 60a connected to a mounting sleeve 451 on the left side of the dust connector 45, and a second filtering module 60b connected to the mounting sleeve 451 on the right side of the dust connector 45. Each of the first and second filtering modules 60a, 60b has an outer shape defined by a lower case 61 and an upper case 66, where a lower end of the upper case 66 is coupled to an upper end of the lower case 61.

An inlet 661 is formed on the upper surface of the upper case 66, and an outlet 611 is formed on the bottom of the lower case 61. A dust outlet 613 is formed at one end of the lower case 61, and the dust outlet 613 is configured to communicate with a dust inlet 452 formed on the upper surface of the dust connector 45. A sleeve 614 may extend along an edge of the dust outlet 613 and formed on the bottom surface of the lower case. The sleeve 614 may be configured to be in close contact with an inner circumferential surface or an outer circumferential surface of the mounting sleeve 451, and leaking of dust between the dust outlet 613 and the dust inlet 452 may be prevented. See also FIG. 28.

Each of the first and second filtering module 60a, 60b further includes a pre-filter 65 provided on the lower side of the upper case 66. The pre-filter 65 is configured to form a conveyor belt around a pair of rollers 67 and one of the rollers being driven by a belt motor 671. The pre-filter 65 is rotated in a prescribed direction by turning on the belt motor 671. The belt motor 671 is seated between motor accommodation grooves 612 and 662, which are formed in the lower case 61 and the upper case 66, respectively.

The upper and lower surfaces of the pre-filter 65 are spaced apart by a distance corresponding to the diameter of the pair of rollers 67. A HEPA filter 64 for filtering fine dust and a dehumidifying filter 63 disposed below the HEPA filter 64 may be stacked into the space provided between the upper lower surfaces of the pre-filter. The dehumidifying filter 63 may contain zeolite as a main component. If desired, a deodorizing filter may be further provided between the HEPA filter 64 and the dehumidifying filter 63. In certain cases, the HEPA filter 64 and the deodorizing filter may be provided as a single unit.

A heater 62 may be placed below the dehumidification filter 63 such that the air passing through the filtering module 60 is dehumidified and heated to a prescribed temperature to create dry air. The heater 62 may a planar heater or a sheath heater, but other types of heaters are also applicable. Further, regeneration or recharging of the dehumidification filter 63 is necessary, the heater 62 is turned on while the fan modules 15 and 16 are stopped to evaporate the moisture absorbed by the dehumidification filter 63.

Figure 28:
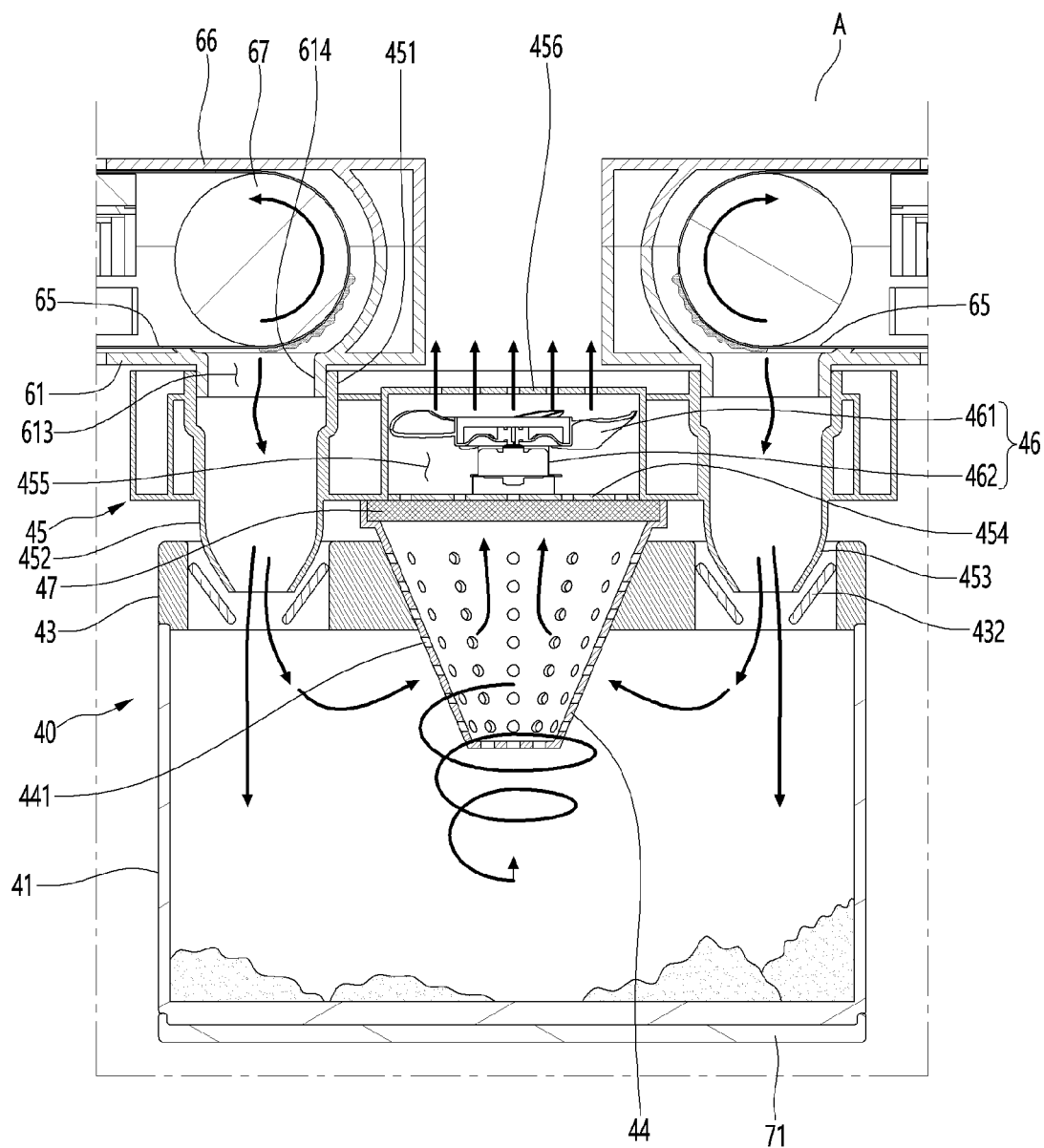
FIG. 28 is an enlarged view of section A of FIG. 27.

As shown in FIG. 28, the dust collecting filter 47 is mounted on the upper end of the dust collector 44, and the dust collector 44 is detachably coupled to the bottom surface of the dust connector 45. The dust collector 44 may be mounted or removed from the bottom surface of the dust connector 45 in a screw-in method. When removed, the dust collection filter 47 may be separated from the dust connector 45. The dust collecting filter 47 may be provided in the form of a flat circular filter corresponding to the shape of the upper surface of the dust collector 44.

A suction grill 454 is centrally formed on a bottom surface of the dust connector 45, to which the dust collector 44 is mounted. A fan mount housing space 455 is located in an inner center of the dust connector 45 and located above the upper side of the suction grill 454. The suction fan module 46 having a suction fan 461 and a fan motor 462 is accommodated in the fan mount housing space 455. The discharge grill 456 is formed in the center of the upper surface of the dust connector 45 above the upper side of the suction fan 461.

When the dust container 41 is raised toward the bottom of the dust connector 45 by the lift 70, the conical dust collector 44 is penetrates through the dust collector through hole 433 centrally formed in the top cover 43. The suction duct 453 rotates the damper 432 while being inserted into the duct insertion hole 431 of the top cover 43. When the dust container 41 is completely coupled to the dust connector 45, the bottom surface of the lifting plate 71 is planar with the bottom surface of the main body 11 to cover the dust container access hole 1208. Further, as the damper 432 rotates, the suction duct 453 and the inside of the dust container 41 communicate with each other.

When the mounting sleeve 451 extending along the edge of the dust inlet 452 and the sleeve 614 extending from the bottom of the lower case 61 come into contact with each other, the dust adhering to the outer surface the pre-filter 65 passes through the suction duct 453 to be collected into the dust container 41.

A process in which the dust collected on the pre-filter 65 is removed to the dust container 41 will be described. When the filter cleaning mode is turned on automatically based on pre-set cleaning cycle or manually by a user inputting a filter cleaning command and based on the conveyor belt configuration of the pre-filter 65, the driven roller 67 is rotated by the belt motor 671 and the pre-filter 65 moves along an outer circumferential surface of the belt motor 67. The suction fan module 46 is turned on to suction the air inside the dust container 41 through is suctioned through the filtering holes 441 formed in the dust collector 44. The suctioned air passes through the dust collection filter 47, and is discharged back into the room through the suction grill 454 and the discharge grill 456.

Because of the suction of air from inside the dust bin 41, a negative pressure is created inside the dust bin 41, and as a result, the air inside the suction duct 453 is sucked into the dust bin 41. At this time, the dust accumulated on the outer surface of the pre-filter 65 are separated by the pressure difference and are collected in the dust container 41.

Among the dust and foreign substances collected inside the dust container, dust and foreign substances which cannot fit through the filtering holes 441 of the dust collector 44 fall to the bottom of the dust container 41, and dust and foreign substances passing through the filtering holes 441 are filtered out by the dust collecting filter 47. Similar to a cyclone dust container applied to a vacuum cleaner, a cyclone phenomenon occurs inside the dust container 41 to separate dust and air based on the operation of the suction fan 461.

The dust cleaning mode may be programmed to be performed for a set time after the dust cleaning command is input, or may be programmed to be performed periodically at a predetermined time interval even if the user does not input the dust cleaning command. In addition, when it is determined that the dust collected in the dust bin 41 has reached a set amount, a message informing that the dust bin is empty may be output through the display unit and/or the speaker.

Figure 29:
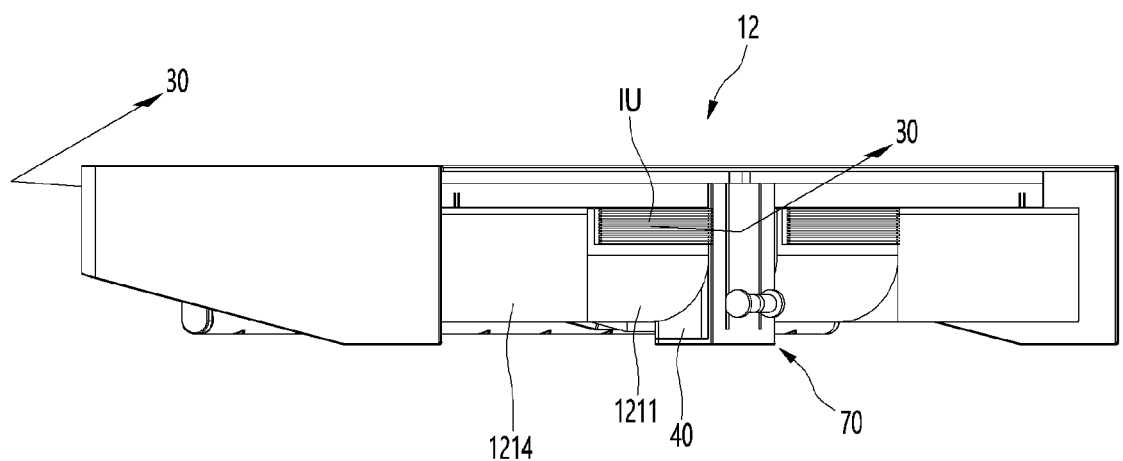
FIG. 29 is a rear-side perspective view of a hanger device according to an embodiment of the present disclosure.
Figure 30:
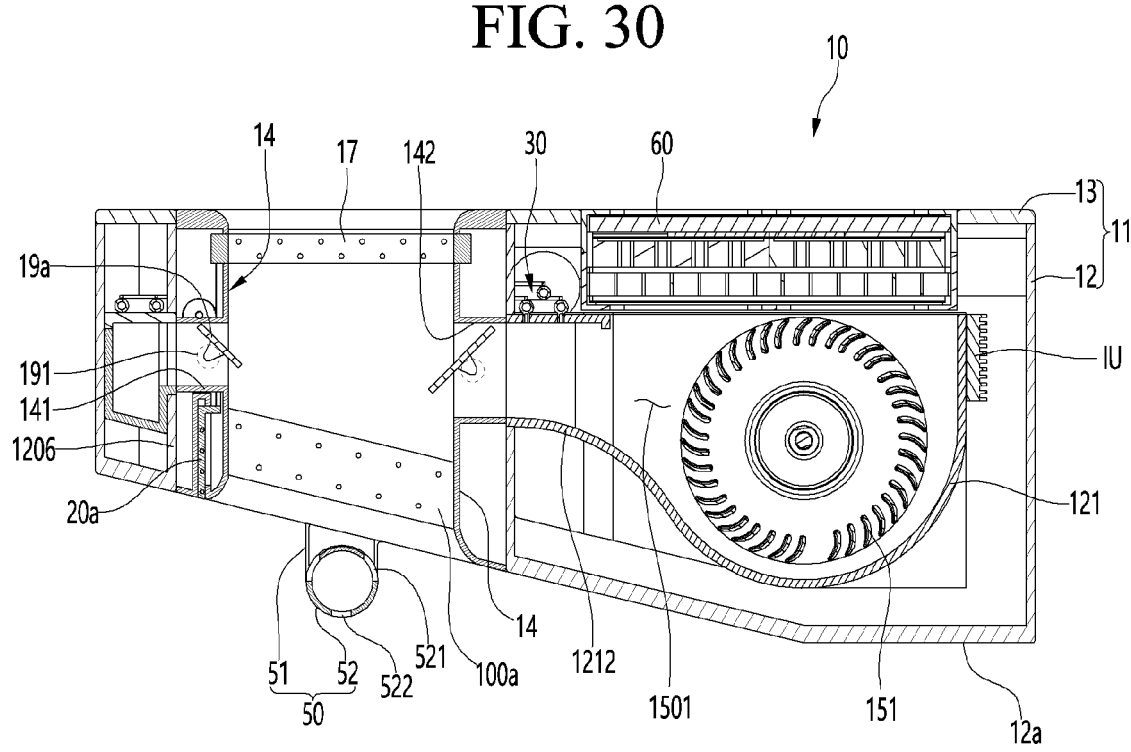
FIG. 30 is a side cross-sectional view of the hanger device along line 30-30 of FIG. 29.

With reference to FIGS. 29 and 30, an induction unit IU may be used to generate heated dry air. The induction unit IU may be used in addition or as an alternative to the heater 62, shown in FIG. 26, mounted on the lower side of the dehumidifying filter 63 to generate dry air. The induction unit IU may be mounted on a rear surface of the main fan housing 1211, functioning as a heater.

The induction unit IU may be an induction heater using an induced current as a heat source. When power is applied to the induction unit IU, the main fan housing 1211 is heated by the electromagnetic field to act as a heater. When the main fan 152 rotates in this state, the air sucked into the main fan housing 1211 by the main fan 152 is heated and then discharged to the main discharge duct 1212 through a discharge outlet 1501 of the main fan housing 1211.

Although the above drawing shows that the induction unit IU is mounted only on the rear surface of the main fan housing 1211, the induction unit IU may extend to the rear surface of the suction guide 1214 to discharge heated air to the sub discharge duct 1216. Alternatively, a separate induction unit IU may be mounted on the rear surface of the suction guide 1214.

By allowing at least a portion of the main fan housing 1211 and the suction guide 1214 to operate as a heater, there is an advantage in that it is possible to minimize the possibility of thermal damage to the filters constituting the filtering module 60. Further, additional source of heated dry air assist with drying of clothes or items on the hanging bar 52.

Figure 31:
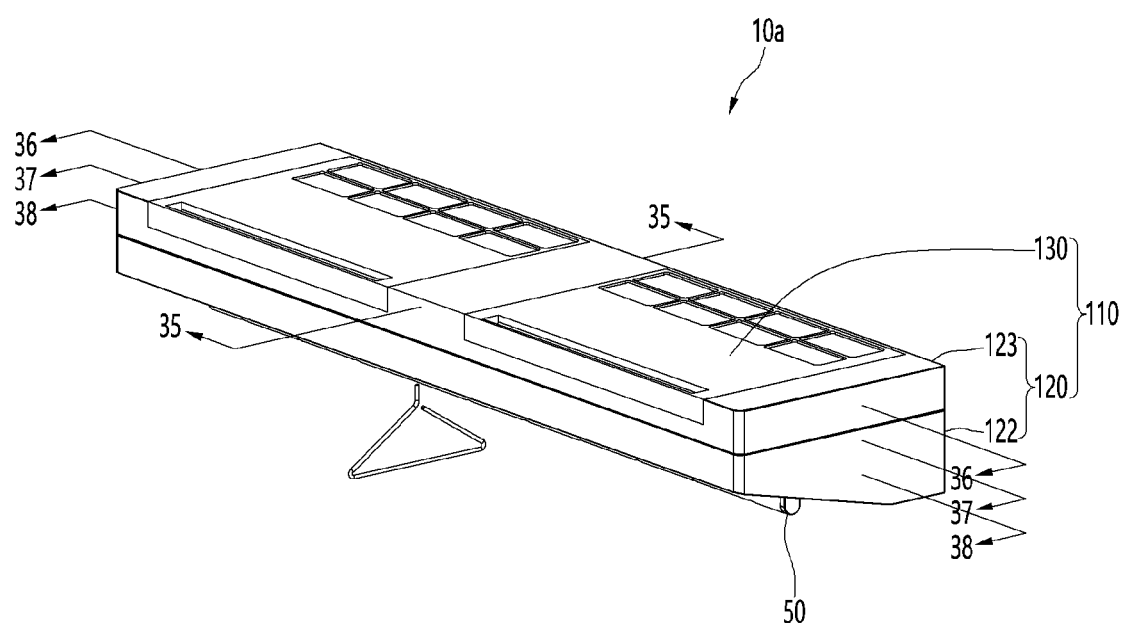
FIG. 31 is a perspective view showing front, side and top of a hanger device according to another embodiment of the present disclosure.
Figure 32:
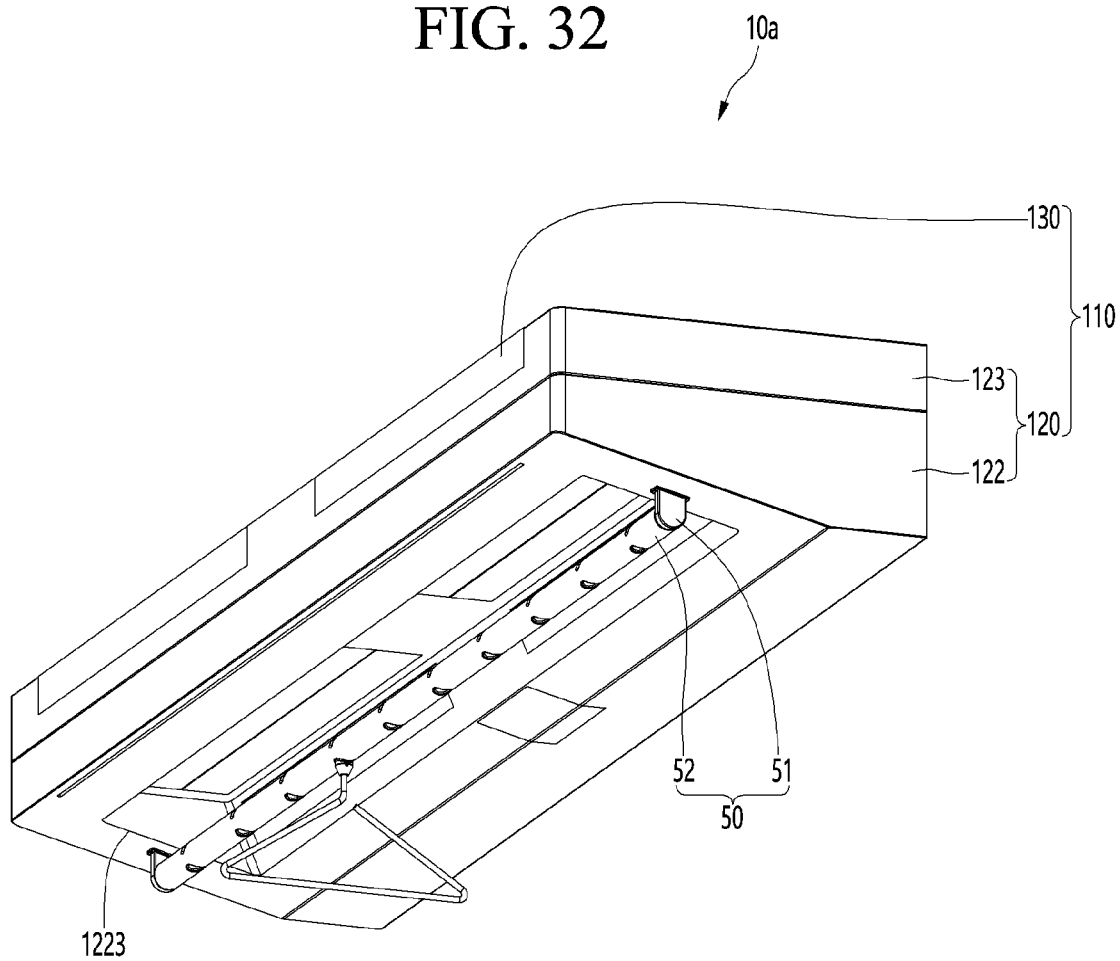
FIG. 32 is a bottom perspective view showing front, bottom and side of the hanger device according to another embodiment of the present disclosure.

FIG. 31 is a front perspective view of a hanger device 10*a* according to another embodiment of the present disclosure. FIG. 32 is a bottom perspective view of the hanger device 10*a*. In this embodiment of the clothes hanger device 10*a*, a through hole 101 is not formed in the center of the body. The air flow path and the structure thereof may be different compared to the previous embodiment. However, the filtering module provided inside the main body, the fan module, the steam supply device, and the filter cleaning device may be applied in the same or similar manner, and the same reference numerals are applied to the same components. Although the filter cleaning device is not shown or discussed below, the filter cleaning device 40 shown in FIGS. 21 to 28 may be installed in the hanger device 10*a* in a same or similar way.

The hanger device 10*a* includes a main body 110 forming an external shape, and a hanging unit 50 connected to the lower side of the main body 110. The hanging unit 50 may include a pair of supports 51 and a hanging bar 52. The main body 110 includes a cabinet 120 having a component mounting space formed therein and a cover 130 covering the opened upper surface of the cabinet. The cabinet 120 may include a lower cabinet 122 and an upper cabinet 123 covering an upper surface of the lower cabinet 122.

The bottom surface of the lower cabinet 122 may be formed to be inclined, and the air discharge part 1223 may be formed by being depressed upwardly on the inclined surface. The inclined surface may start from a predetermined distance from the rear end of the bottom surface of the lower cabinet 122 and extend to the front end of the bottom surface of the lower cabinet 122. Alternatively, the inclined surface may be inclined upwardly from the rear end to the front end of the lower cabinet 122.

Figure 33:
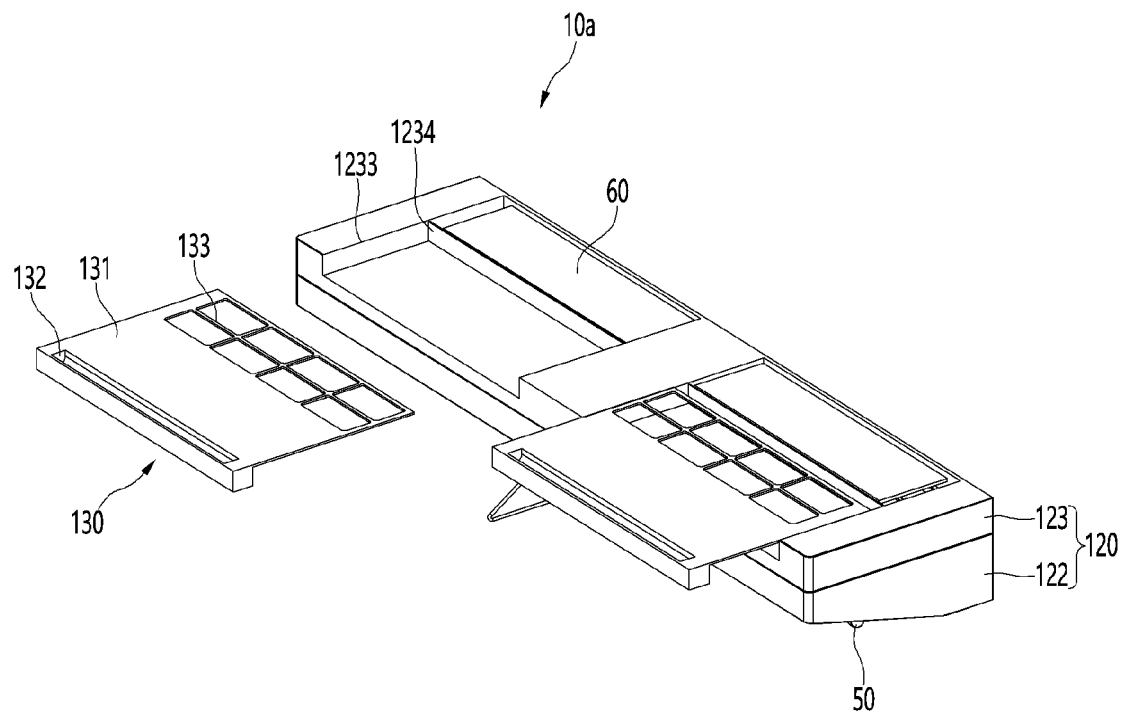
FIG. 33 is a perspective view of the hanger device showing a state in which the upper cover is separated from the cabinet.
Figure 34:
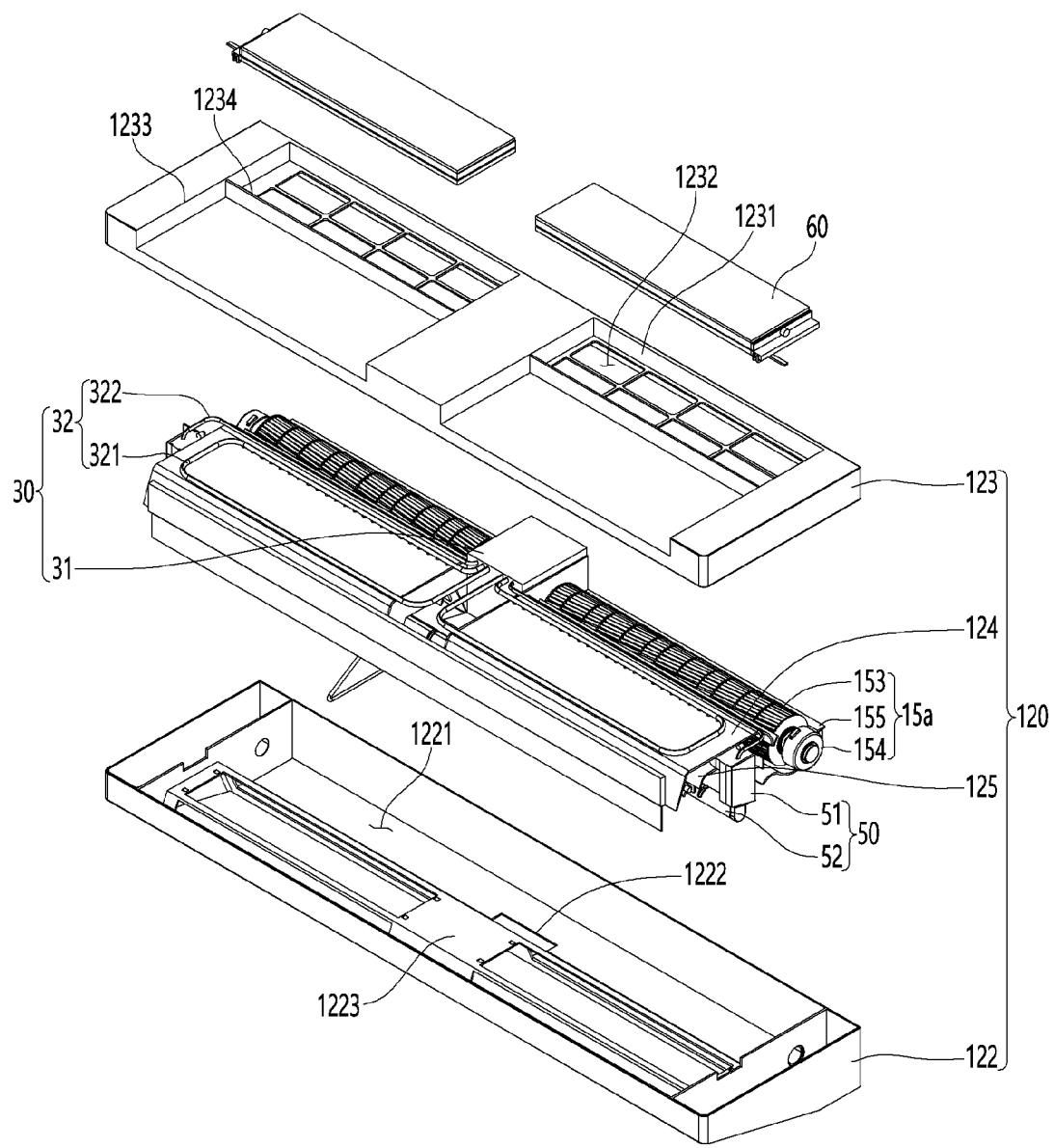
FIG. 34 is an exploded view of the hanger device shown in FIG. 31.
Figure 35:
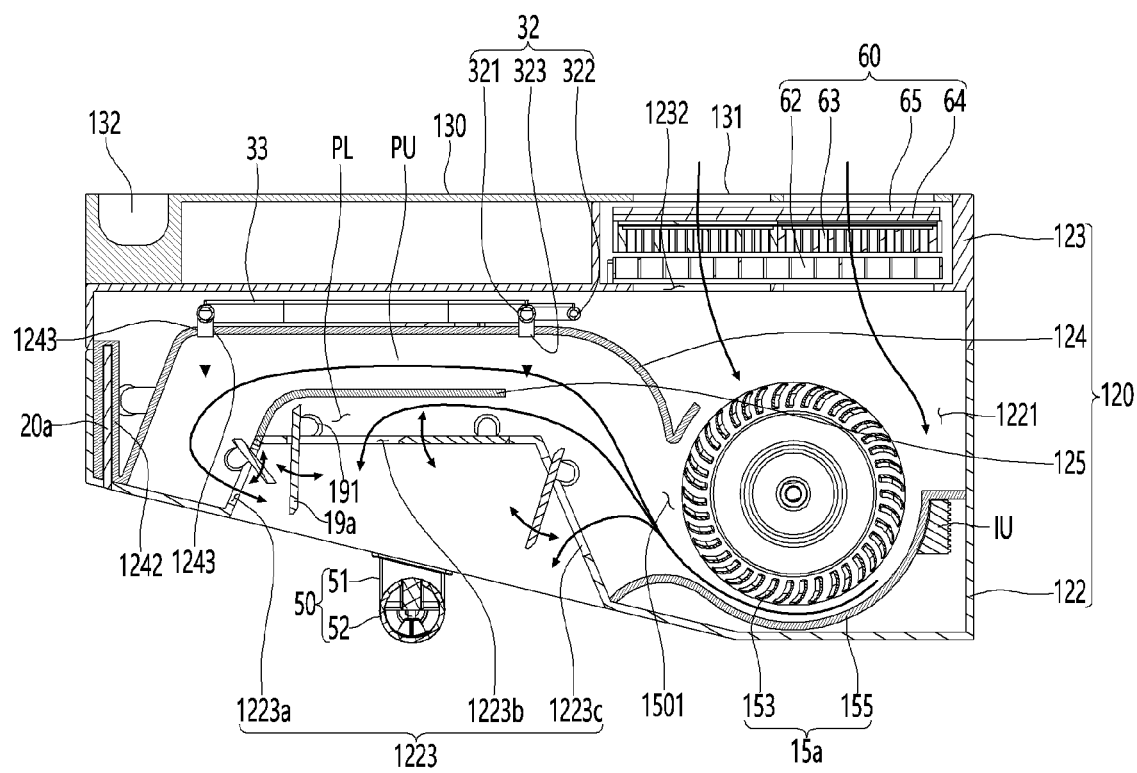
FIG. 35 is a side cross-sectional view of the hanger device taken along line 35-35 of FIG. 31.

With reference to FIGS. 33 to 35, a cover 130 may be slidably and detachably coupled to the upper cabinet 123. The cover 130 may include a cover body 131 and a recessed pull handle 132 formed at the front end of a cover body 131. A suction grill 133 formed in a grid pattern may be provided on the rear section of the cover body 131. The recess pull handle 132 may be provided as a recessed groove of a predetermined depth and width along a front end of the cover body 131.

One or more stepped recesses 1233 may be formed in the upper cabinet 123, and the stepped recesses 1233 are exposed or covered by the cover 130. In this example, two step recesses 1233 are provided on the left and right sides of the upper cabinet 123. A partition 1234 divides each of the stepped recesses 1233 into a first space (or front space) and a second space (or rear space). The filtering module 60 is seated into the second space, and the first space may serve as a storage space, for example, for storing replacement filters.

The second space serves a filter seat 1231, and a filter outlet 1232 in the form of a grill may be formed at the bottom of the filter seat 1231. As the outlet 1232 is formed in a grid-shaped grill shape, the air passes through the filtering module 60 to the cabinet 120 while stably supporting the filtering module 60 placed on the filter seat 1231. A steam generator 31 of the steam supply device 30 may be provided in an interior of the lower cabinet 122 and between the left and right filter seats 1231 of the upper cabinet 123. Although not shown, the filter cleaner 40 may be disposed on the rear side of the steam generator 31 by adjusting the width of the steam generator 31 in the front-rear direction.

A fan module 15a is placed under the filter seat 1231. The fan module 15a includes a fan 153, a fan motor 154 for driving the fan 153, and a fan housing 155 for receiving 153. The fan 153 may be a cross flow fan. As previously discussed, an induction unit IU may be mounted on the rear surface of the fan housing 155 such that the fan housing 155 functions as a heater to heat the suctioned air.

The cabinet 120 includes a middle cabinet 124 disposed between the upper cabinet 123 and the lower cabinet 122, and a plate 125 serving as a flow path partition disposed between the middle cabinet 124 and the lower cabinet 122.

The middle cabinet 124 and the flow path partition plate 125 are positioned below the front spaces of the upper cabinet 123. The middle cabinet 124 is placed downward a first predetermined distance from the upper cabinet 123, and the flow path partition plate 125 is placed downward a second predetermined distance from the middle cabinet 124.

A fan mounting space 1221 on which the fan module 15a is placed is formed inside the lower cabinet 122, and an air discharge part 1223 is formed in front of the fan mounting part 1221. A water tank access opening 1222 may be formed at the bottom of the fan mounting apace 1221. In the case of a model in which the filter cleaner 40 is mounted, a dust container access may be formed in the bottom of the lower cabinet 122 spaced apart from the water tank access opening 1222.

The air discharge part 1223 is a part formed by bending a bottom section of the lower cabinet 122 upward a plurality of times such that the bent sections form a front section, an upper section, and a rear section. The front section and the rear section may be inclined in a direction toward each other and toward the upper section.

A front discharge port 1223a, an upper discharge port 1223b, and a rear discharge port 1223c are formed on the front section, the upper section, and the rear section. Discharge vanes or dampers 19 are mounted on each of the discharge ports 1223a, 1223b, 1223c, and the discharge vanes 19a are tilted at a predetermined angle by the vane motors 191 to open the discharge ports 1223a, 1223b, 1223c and to control the air flow direction.

A pair of discharge vanes 19 may be mounted on the upper discharge port 1223b to selectively open and close some or all of the upper discharge outlet 1223b. For example, one of the pair of discharge vanes 19 is rotatably mounted to the front end of the upper discharge port 1223b, and the other is to be rotatably mounted to the rear end of the upper discharge port 1223b.

As in the previous embodiment, a wind guard housing 1242 is formed at the front side of the lower cabinet 122, and the wind guard 20a may be inserted into the wind guard housing 1242. The wind guard 20a may be provided to be slidably withdrawable downward from the wind guard housing 1242. The wind guard housing 124 may be a part of the middle cabinet 124 that further extends from the front end of the middle cabinet 124. Alternatively, a separate structure bent in an n-shape may be mounted on a back surface of the front end of the lower cabinet 122, and a through hole through which the wind guard 20a passes is formed in the lower cabinet 122.

The flow path partition plate 125 is provided between the air discharge part 1223 and the middle cabinet 124 and between the middle cabinet 124 and the lower cabinet 122 such that air flow is divided into an upper flow path PU and a lower flow path PL. The lower flow path PL is defined by a duct formed by the flow path partition plate 125 coupled to the upper section of the air discharge part 1223 and the upper surface of the air discharge part 1223. The upper flow path PU is defined by a duct from by the flow path partition plate 125 and the middle cabinet 124. The flow path partition plate 125 may be a separate member coupled to the upper end of the front section for the air discharge part 1223. Alternatively, the flow path partition plate may be injection-molded as a part of the lower cabinet 122.

The rear end of the middle cabinet 124 may be positioned adjacent to the fan 153, and the front end may be connected to the bottom of the lower cabinet 122. The middle cabinet 124, similar to the structure of the air discharge part 1223, includes a front section, an upper surface section, and a rear section. The air discharged from the fan 153 is discharged through the rear discharge port 1223c and directed through the upper flow path PU to discharge at the front discharge port 1223a.

The steam supply pipe 32 of the steam supply device 30 extends from the steam generator 31 and extends along the upper surface of the middle cabinet 124. The main supply pipe 321 of the steam supply pipe 32 extends along the upper edge of the middle cabinet 124. The discharge nozzles 323 protruding from the bottom surface of the main supply pipe 321 penetrate the middle cabinet 124 and are exposed in a space between the middle cabinet 124 and the flow path partition plate 125. The sub supply pipe 322 of the steam supply pipe 32 extends along a rear edge and a side end of the middle cabinet 124 to extend into the support 51 of the hanging unit 50.

The discharge nozzles 323 extending from the bottom surface of the main supply pipe 32 penetrate the top surface of the middle cabinet 124 and are exposed to the upper flow path PU. A portion of the steam supplied to the upper flow path PU is provided into the lower flow path PL to flow. By placing some of the discharge nozzles 323 close to the rear end of the middle cabinet 124, e.g., close to the discharge outlet 1501 of the fan module 15a, some steam supplied from the discharge nozzles 323 passes to the lower flow path PL.

Figure 36:
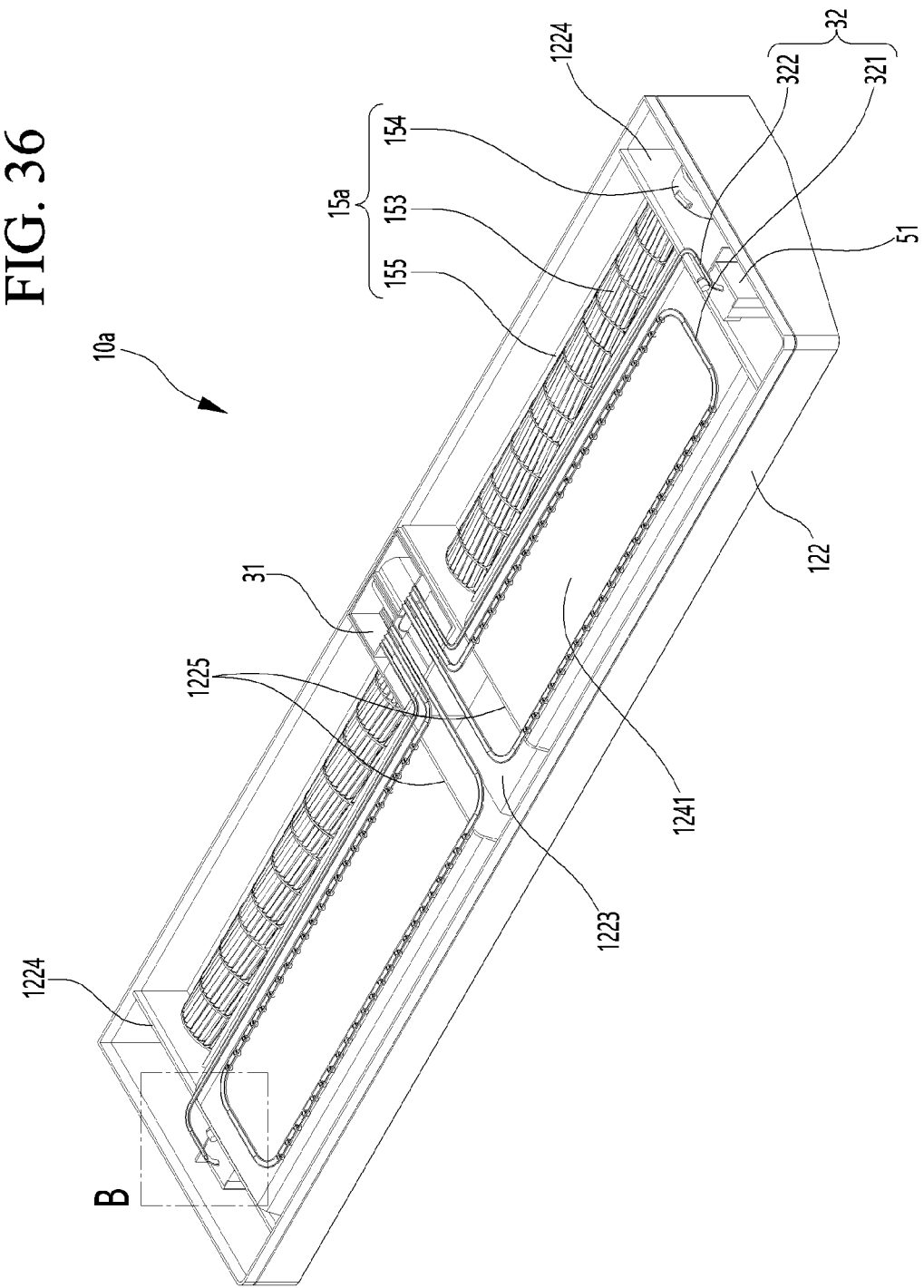
FIG. 36 is a cross-sectional cut-away perspective view of the hanger device taken along lines 36-36 of FIG. 31.

With reference to FIGS. 35 and 36, a space is formed between the upper cabinet 123 and the middle cabinet 124, and the steam supply pipe 32 is placed on the upper surface of the middle cabinet 124. When the fan module 15a operates, indoor air outside the hanger device 10a passes through the filtering module 60 and flow into the suction port of the fan module 15a. Further, any air present in the space between the upper cabinet 123 and the lower cabinet 122 flows into the suction port. The suction port of the fan module 15*a* may be understood as a space defined between the rear end of the middle cabinet 124 and the rear end of the fan housing 155.

Although omitted from the drawings, in order to prevent air flow from occurring in the space between the middle cabinet 124 and the upper cabinet 123 when the fan module 15*a* is driven, a rear end of the middle cabinet 124 may be connected to the edge of the filter outlet 1232 formed on the bottom of the upper cabinet 123. Hence, only the air passing through the filtering module 60 may be sucked into the fan module 15*a*. Further, by moving the fan module 15*a* toward the rear side of the lower cabinet 122 and reducing the front-rear width of the steam generator 31, a filter cleaner 40 may be placed between steam generator 31 and the rear surface of the lower cabinet 122.

An outer partition walls 1224 may be installed spaced apart from the left side of the lower cabinet 122 and spaced apart from the right side of the lower cabinet 122. The outer partition walls 1224 may be installed parallel to the side surface of the lower cabinet 122 and spaced apart by a predetermined distance. The fan motor 154 and the supports 51 of the hanging unit 50 may be disposed in a space defined by the side surfaces of the lower cabinet 122 and the outer partition walls 1224. Each of the outer partition walls 1224 also forms a side of the duct defining the upper flow path PU and the lower flow path PL.

Further, a pair of inner partition walls 1225 may be arranged side by side inside the lower cabinet 122 corresponding to both sides of the steam generator 31. The pair of inner partition walls 1225 form the other side surfaces of of the duct defining the upper flow path PU and the lower flow path PL. The steam generator 31 and/or the filter cleaner 40 may be disposed between the pair of inner partition walls 1225.

Figure 37:
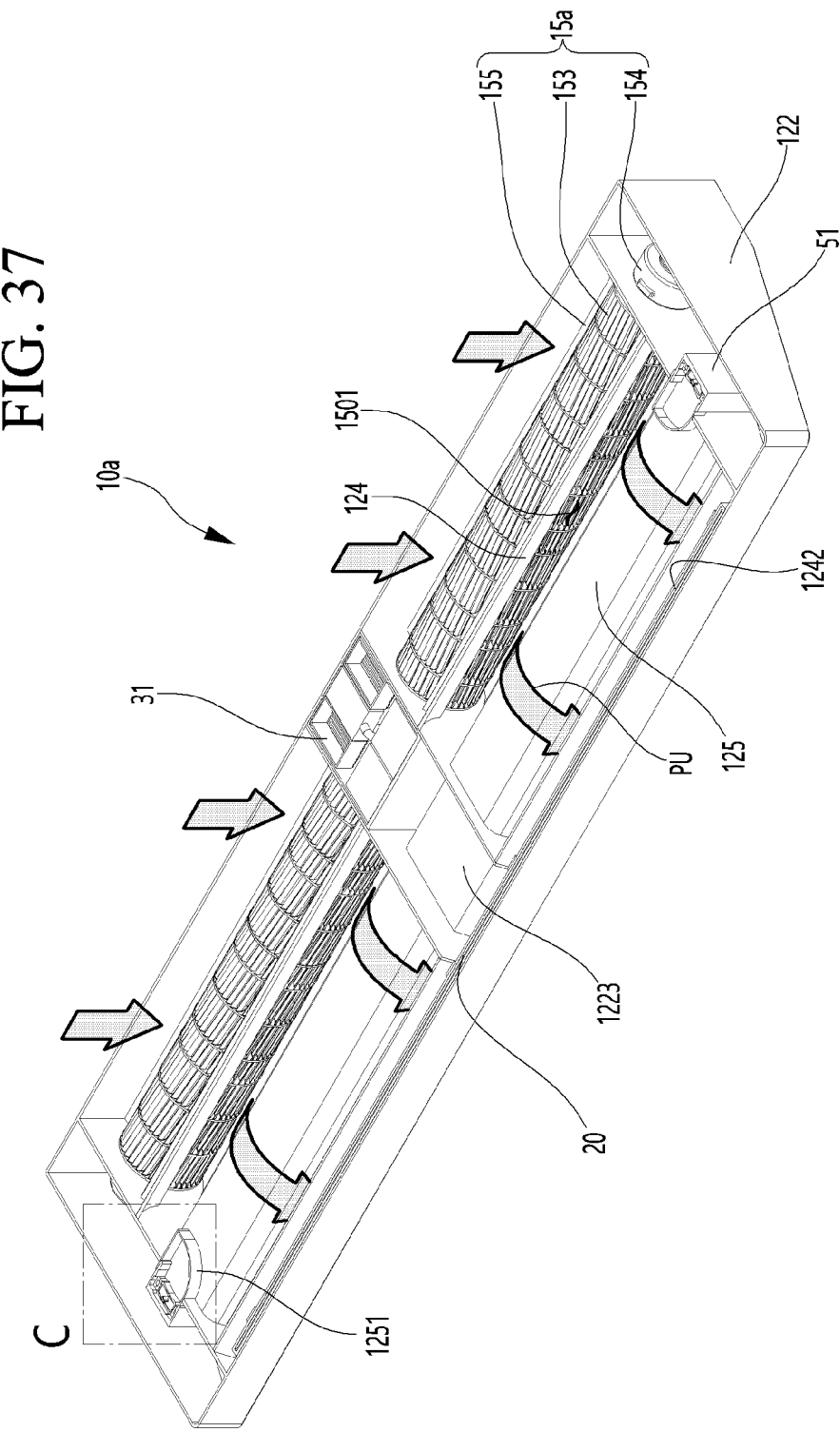
FIG. 37 is a cross-sectional cut-away perspective view taken along line 37-37 of FIG. 31.

As shown in FIGS. 35 and 37, a part of the air discharged from the discharge outlet 1501 of the fan module 15*a* flows along the upper flow path PU formed on the upper side of the flow path partition plate 125, and toward the front section of the flow path partition plate 125. The air is discharged toward the clothes or items hung on the hanging bar 52 through the front discharge port 1223*a*.

Figure 38:
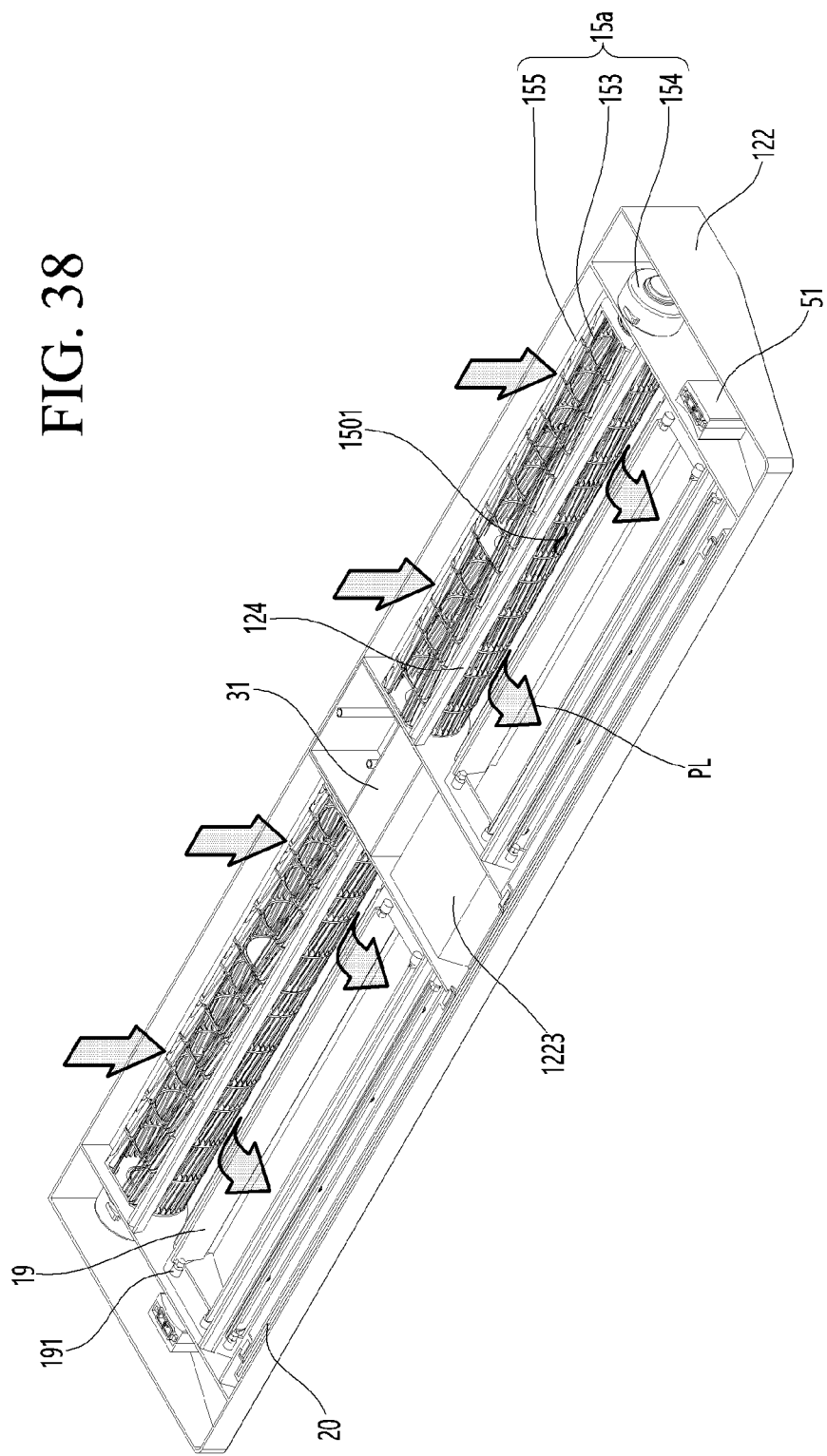
FIG. 38 is a cross-sectional cut-away perspective view taken along line 38-38 of FIG. 31.

As shown in FIGS. 35 and 38, a part of the air discharged from the discharge outlet 1501 of the fan module 15*a* is discharged toward the clothes or items hung on the hanging bar 52 through the rear outlet 1223*c*. Further, a portion of the air discharged from the discharge outlet 1501 of the fan module 15*a* flows along the lower flow path PL formed under the flow path partition plate 125 and passes through the upper discharge port 1223*b*. It is discharged toward the clothes hung on the hanging bar 52.

The amount of air discharged through the upper air outlet 1223*b* and the rear outlet 1223*c* may be controlled differently based on the tilting angle of the discharge vanes 19*a*. Hence, the degree of opening through which the air passes through upper discharge ports 1223*b* and rear discharge ports 122*c* may be independently controlled, and amount of air discharged can vary.

Figure 39:
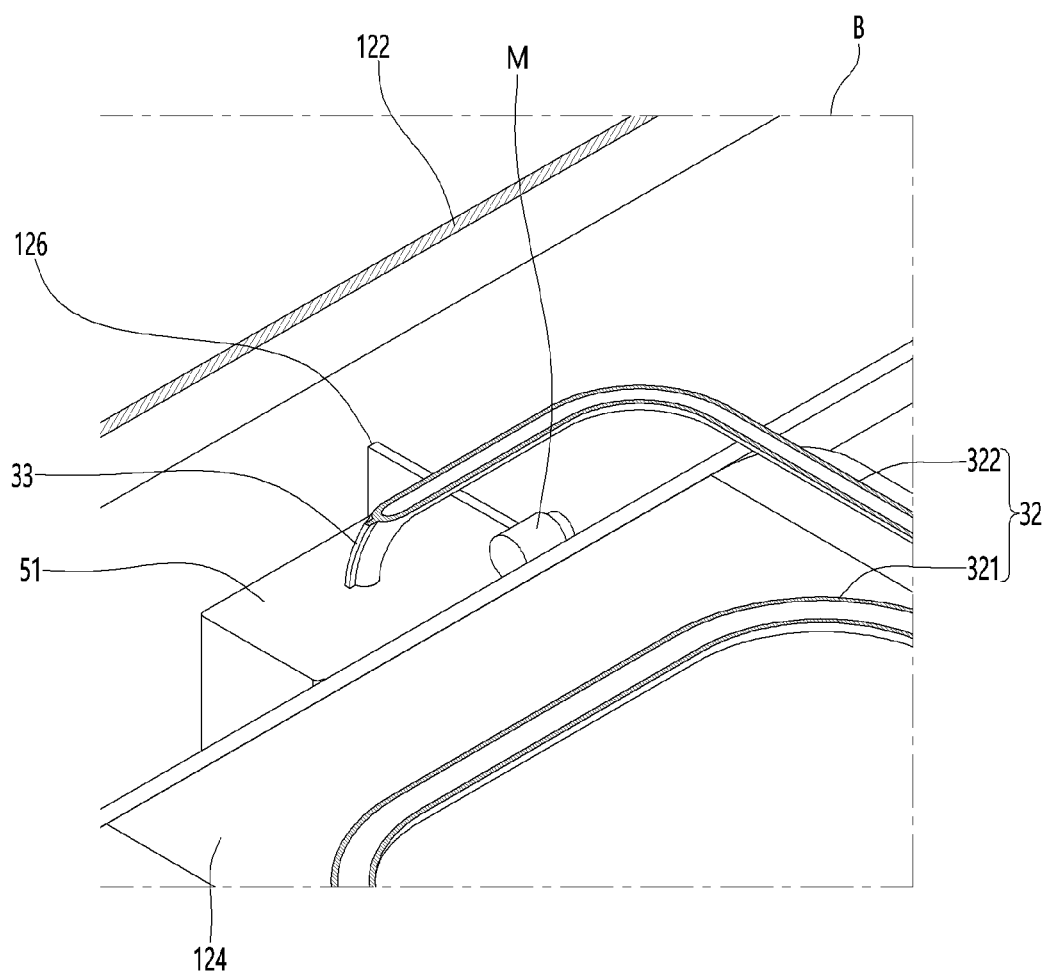
FIG. 39 is an enlarged view of section B of FIG. 36.
Figure 40:
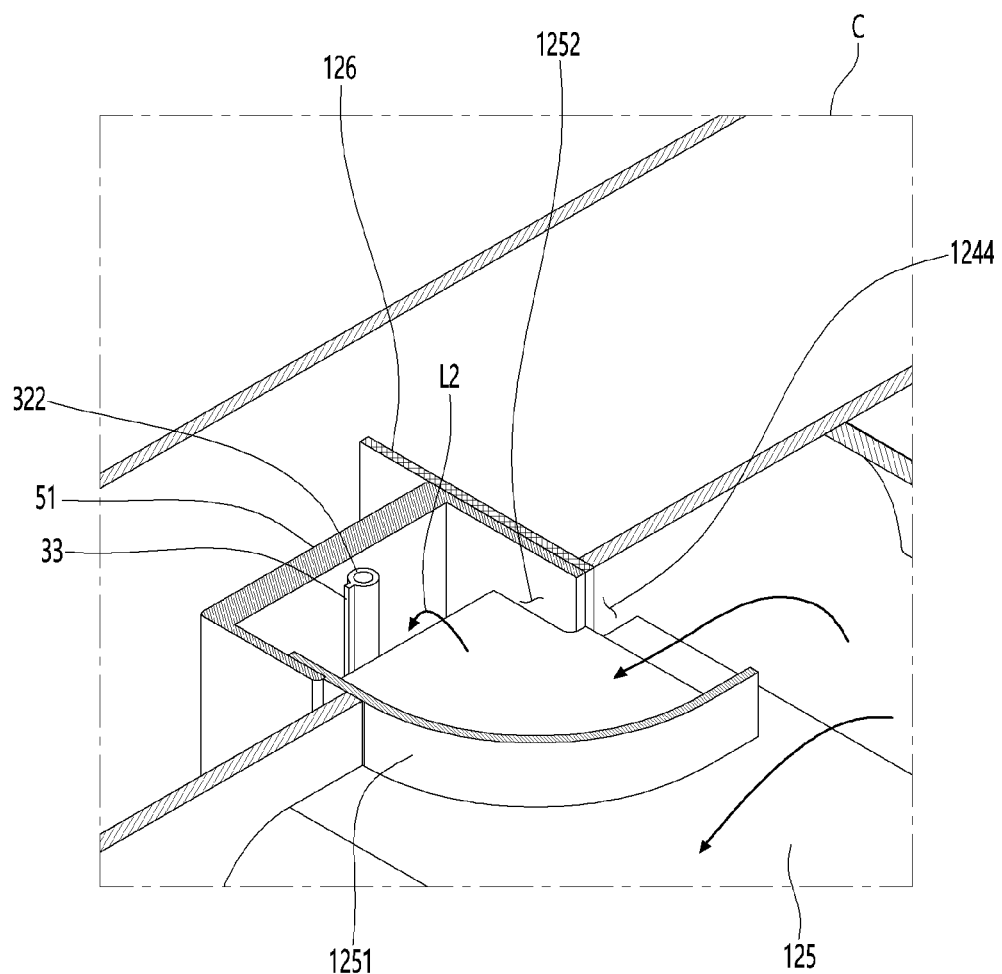
FIG. 40 is an enlarged view of section C of FIG. 37.
Figure 41:
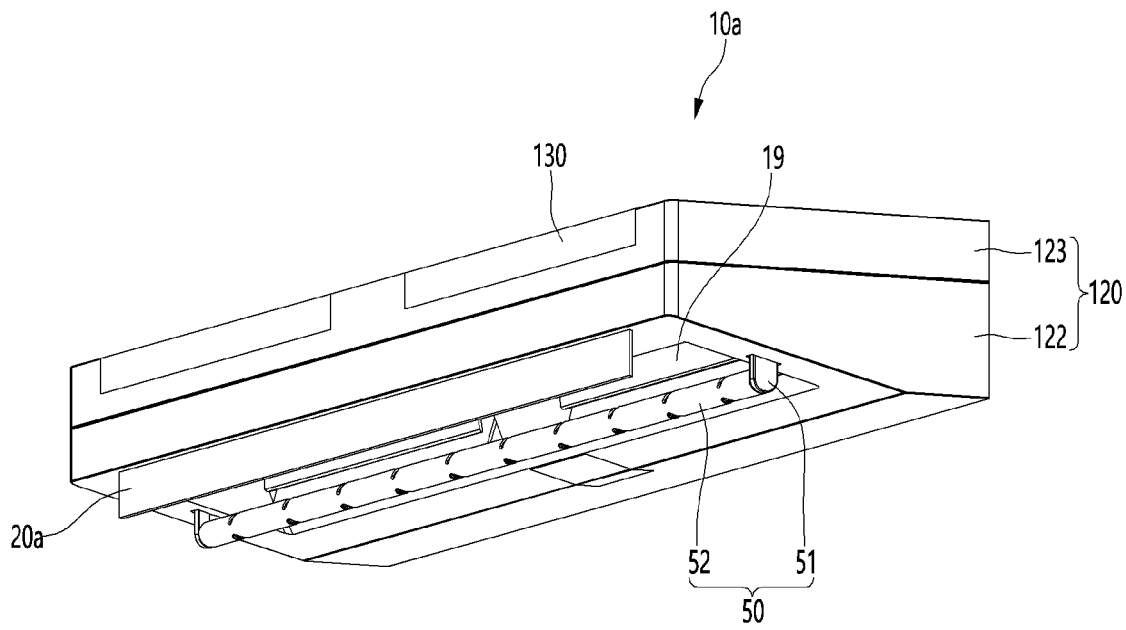
FIG. 41 is a bottom perspective view of a hanger device according to an embodiment of the present disclosure showing a state in which the wind guard is lowered.

With reference to FIGS. 39 and 40, the sub supply pipe 322 of the steam supply pipe 32 extends along the rear edge of the middle cabinet 124 and extends into the support 51. The upper surface of the support 51 may be shielded or covered, and the sub-supply pipe 322 may be introduced into the support 51 through the cover of the support 51. The upper surface of the cover for the support 51 may be located higher than the upper surface of the flow path partition plate 125.

The side connecting the upper surface of the support 51 and the flow path partition plate 125 is opened. Specifically, a flow guide 1251 protrudes from the upper surface of the flow path partition plate 125, and an upper side of the flow guide 1251 is connected to the lower surface of the middle cabinet 124. A front end of the flow guide 1251 is connected to the open side of the support 51. An inlet 1244 is formed between the rear end of the flow guide 1251 and the open side of the support 51. A side passage 1252 is formed between the inlet 1244 and the open side of the support 51 by the flow guide 1251.

The inlet 1244 is opened and closed by a gate 126, and the gate 126 moves in the left and right direction by the driving motor M placed on the upper surface of the support 51. The gate 126 is erected on the rear surface of the support 51 to be slidable in the left and right directions of the cabinet 12. A pinion may be mounted on a rotation shaft of the driving motor M, and a gear rack engaged with the pinion may be formed on the upper surface of the gate 126.

When the driving motor M rotates in one direction, the gate 126 moves in a direction closer to the side surface of the cabinet 12, and the inlet 1244 is opened. When the inlet 1244 is opened, a part of the air discharged from the discharge outlet 1501 of the fan module 15*a* is supplied to the side passage 1252 through the inlet 1244, and introduced into the support 51. The air passing through the support 51 is discharged through the outlets 522 formed on the bottom surface of the hanging bar 52, where clothes and items are hung.

The side flow path 1252 is selectively opened or closed by the gate 126 or the degree of opening may adjusted to supply more or less air either the left side or the right side of the hanging unit 50. For example, when the signals from the pressure sensor PS indicates more clothes or items are hung on the right side than on the left side of the hanging bar 52, the gate 126 on the right side may be opened more than the gate 126 on the left side such that more air may be supplied to the support 51 connected to the right edge of the hanging bar 52.

With reference to FIG. 40, similarly to the hanger device 10 according to the previous embodiment, the wind guard 20*a* may be installed in the hanger device 10*a* of this embodiment. The wind guard 20*a* descends a predetermined length downward from the bottom surface of the front end of the cabinet 12, and prevents dispersion of dry air, warm air, and/or steam discharged through the air discharge unit 1223. The dispersion may cause discomfort to users in front of the hanger device 10*a*, and reduces drying effect or wrinkle removal effect of drying air, warm air, and/or steam discharged to the clothes or items hung on the hanging bar 52. In order to minimize such problems, the wind guard 20*a* may be controlled to descend during a drying mode or the wrinkle removal mode of the hanger device 10*a*. As previously discussed, a mood light or a sterilization module may be also installed on the rear surface of the wind guard 20*a* to additionally perform a lighting function or a sterilization function.

Figure 42:
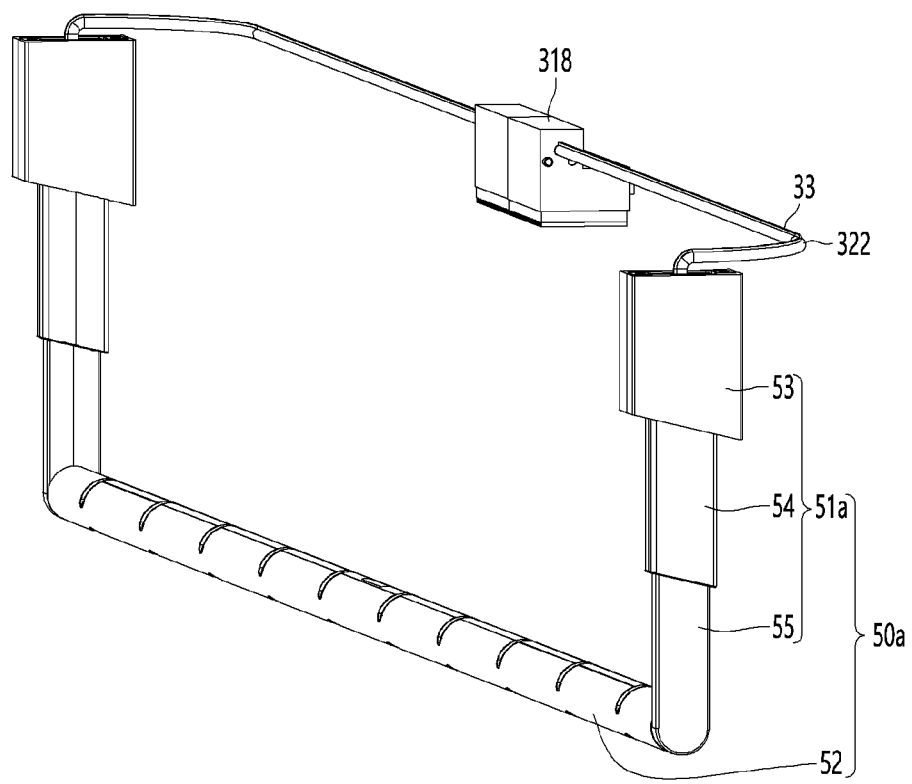
FIG. 42 is a perspective view of a hanging unit according to another embodiment of the present disclosure.

Referring to FIG. 42, the hanging unit 50*a* according to another embodiment may include a pair of length-adjustable supports 51*a* and a hanging bar 52 connecting the pair of supports 51*a*. As can be appreciated, the hanging unit 50*a* may be incorporated into the previous embodiments to replace the hanging unit 50 previously discussed. The length of the support 51*a* can be adjusted through a multi-stage extension, and the number of extension stages can be changed according to design conditions. In this example, the multi-stage extension of the support 51*a* may include a stationary arm 53, an intermediate arm 54, and a movable arm 55.

The stationary arm 53 may be fixed to the main body 11, 110 of the previous embodiments, and communicates with a flow path of suctioned air into the main body 11. A part of the suctioned air which has passed through the filtering modules 60 and 60*a* is introduced into the stationary arm 53 and discharged to the outside through the outlet 522 of the hanging bar 52. Further, a combination of the sub-supply pipe 322 and the heater 33 of the steam supply device 30 extends into the support 51*a*.

Figure 43:
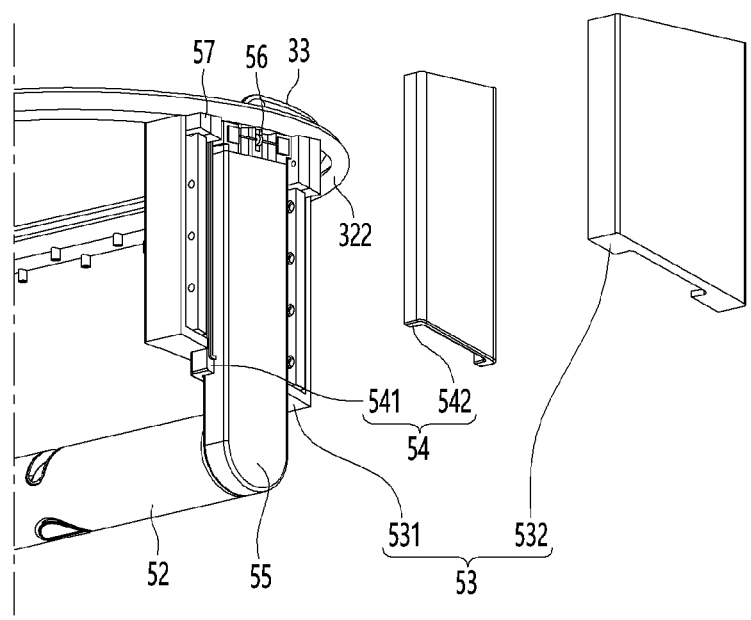
FIGS. 43 and 44 are exploded views of a hanging unit shown in FIG. 42.
Figure 44:
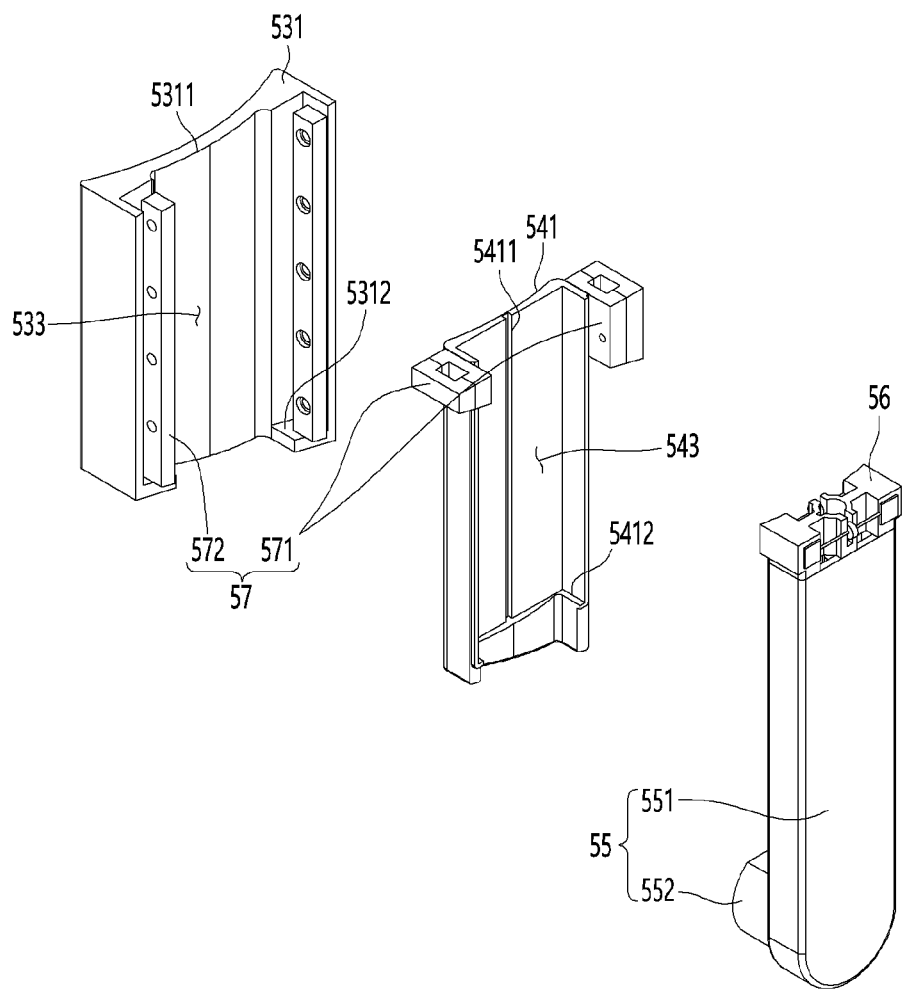

With reference to FIGS. 43 and 44, the stationary arm 53 includes an inner cover 531 having an open side and an outer cover 532 covering the open side of the inner cover 531. A first accommodating space or a first channel (533) is formed inside the stationary arm 53 by the coupling of the inner cover 531 and the outer cover 532, and the intermediate arm 54 is vertically movable in the channel.

The intermediate arm 54 includes a middle inner cover 541 having one side open, and a middle outer cover 542 covering the open side of the middle inner cover 541. A second accommodating space or a second channel (543) is formed inside the middle arm 54 by the coupling of the middle inner cover 541 and the middle outer cover 542, and the movable arm 55 is accommodated in the channel to be raised up and down in the vertical direction. Based on design considerations, a plurality of the intermediate arms 54 may be provided, where multiple second channels are by the intermediate arms, and intermediate arms from widest to narrowest width are sequentially provided in corresponding channels having widest to narrowest width.

The movable arm 55 includes a vertical arm 551 ascending and descending inside the second channel of the intermediate arm 54, and a horizontal arm 552 extending from a lower end of the vertical arm 551. The vertical arm 551 also includes a third channel 553 for passage of air, hot/warm dry air, or steam, and the horizontal arm 552 includes an opening 554 in communication with the third channel to allow air, hot/warm dry air or steam to be forced into the hanger bar 52. An end of the hanging bar 52 is coupled to the horizontal arm 552. The horizontal arm 552 is inserted into the hanging bar 52 so that an end of the hanging bar 52 is connected to the movable arm 55.

A first lift unit 56 is coupled to the upper end of the movable arm 55. A gear rack 5411 is formed on the inner surfaces of the middle inner cover 541 and the middle outer cover 542 such that a pair of gear racks face each other. The gear rack 5411 may be recessed to a predetermined depth at the center of the middle inner cover 541 and the middle outer cover 542 and are configured to engage a pair of first pinions (5622 of FIG. 45) of the first lift unit 56. A stopping protrusion 5412 is formed at a predetermined height above a lower end of the intermediate arm 54 and are formed on the inner surfaces of the middle inner cover 541 and the middle outer cover 542. The stopping protrusion 5412 limits the descent of the movable arm 55 and prevents movable arm 54 from sliding off the intermediate arm 54.

A second lift unit 57 may be provided at an outer surface of the intermediate arm 54. The second unit 57 may be provided on each of the side surfaces of the intermediate arm 54 facing each other. The second lifting unit 57 includes a mover 571 coupled to the outer surface at the upper end of the intermediate arm 55 and a stator 572 configured to penetrate the mover 571. The pair of stators 572 may be coupled to the inner side surface of the stationary arm 53.

When the intermediate arm 55 moves up and down, the mover 571 moves up and down along the stator 572. The second lift unit 57 including the mover 571 and the stator 572 may comprise a linear actuator. Alternatively, a motorized lead screw actuator, a rotating screw configuration or a rotating nut configuration may be used as a second lift unit 57. Other means may be used to vertically move the intermediate arm 54 within the fixed arm 53 when power is supplied, including but not limited to, a rack and a pinion and a motor for driving the pinion.

Guide grooves 5311 for guiding vertical movement of the intermediate arm 54 are formed on inner surfaces of the inner cover 531 and the outer cover 532 of the stationary arm 53. A limiting protrusion 5312 is provided at the lower ends of the inner cover 531 and the outer cover 532. The limiting protrusion 5312 limit the descent of the intermediate arm 54 and prevent the intermediate arm 54 from sliding out of the stationary arm 53. The pair of stators 572 for the second lift unit 57 may be vertically erected to face each other inside the fixed arm 53, and may be placed on the locking protrusion 5312.

Figure 45:
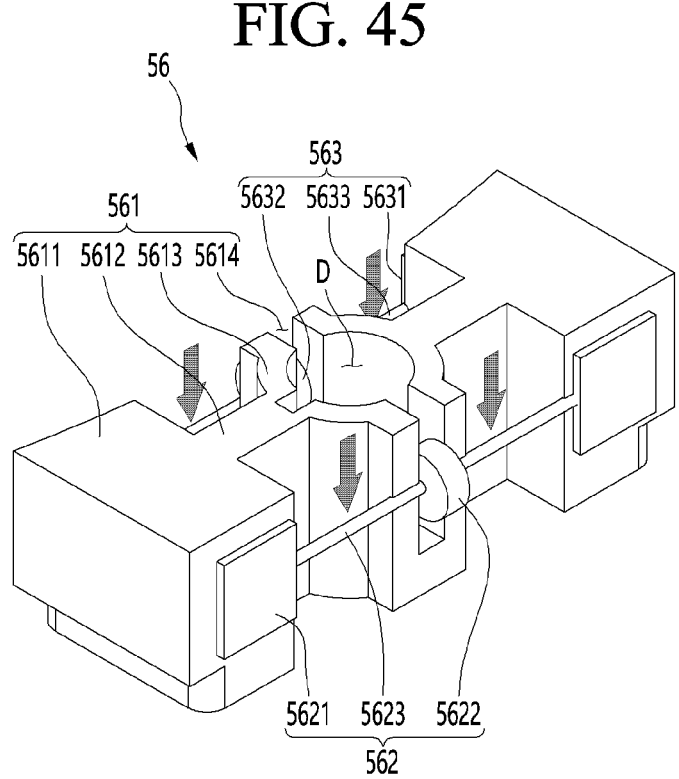
FIG. 45 is a perspective view of a moving arm lifting unit.

Referring to FIG. 45, the first lift unit 56 includes a support cover 561 and a pair of first and second lifts 562, 563 mounted on the support cover 561. The support cover 561 is configured to have a structure that allows the air that has passed through the filtering module 60 to flow into the support 51*a* while being coupled to the upper end of the movable arm 55. The first lift 562 includes a first motor 5621, a first pinion 5622, and a first pinion shaft 5623 rotated by the first motor and connected to the first pinion 5622. The second lift 563 includes a second motor 5631, a second pinion 5632, and a second pinion shaft 5633 rotated by the second motor 5631 and connected to the second pinion 5632. The first and second pinion shafts 5623, 5633 extends from one end to the other end of the support cover 561 and are parallel to face each other.

The support cover 561 includes a pair of motor mounts 5611, a steam supply pipe support 5613, and a pair of bridges 5612 coupling the pair of motor mounts 5611 to the steam supply pipe support 5613. The pair of motor mounts 5611 comprises a first motor mount and a second motor mount placed in parallel with each other. The first motor 5621 may be accommodated on the first motor mount, and the other end of the first pinion shaft 5623 may be connected to, e.g., a slave motor or a roller bearing mounted to the second motor mount. The second motor 5631 may be accommodated on the second motor mount, and the other end of the second pinion shaft 5633 may be connected to, e.g., a slave motor or a roller bearing mounted to the first motor mount.

Each of the first pinion 5622 and the second pinion 5632 are respectively engaged with the gear rack 5411 extending lengthwise on the inner surfaces of the middle inner cover 541 and the middle outer cover 542. When the first motor 5621 and the second motor 5631 rotate in any one direction, the support cover 561 and the movable arm 55 rise or descends as a single body. Other means for raising or lowering the movable arm 55 are possible other than the combination of the motor and rack and pinion structure including but not limited to linear motor actuator described above, a motorized lead screw, a rotating screw configuration or a rotating nut.

A guide hole 5614 through which the sub-supply pipe 322 passes is formed in the steam supply pipe support 5613. The steam supply pipe support 5613 has a cylindrical shape of a prescribed diameter D and extend a predetermined length in a vertical direction to stably support the sub supply pipe 322. Since an air flow path is formed between a pair of motor mounts 5611 facing each other, even when the support cover 561 is coupled to the upper end of the movable arm 55, the air that has passed through the filtering module 60 may be supplied into the moving arm 55.

Figure 46:
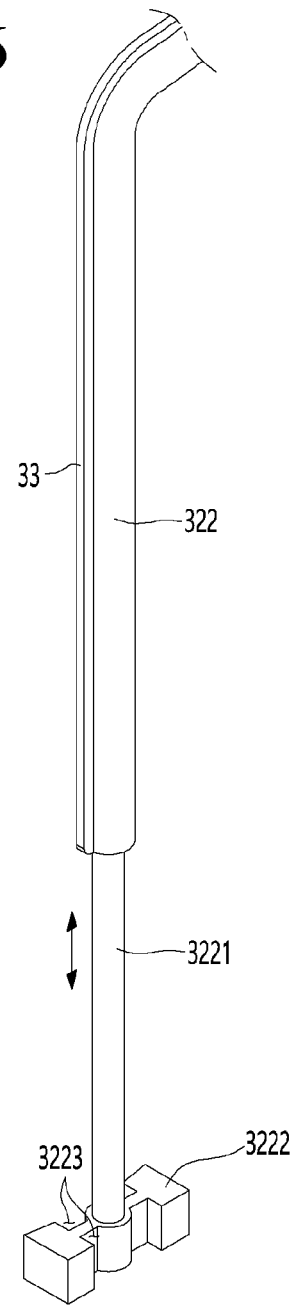
FIG. 46 is an enlarged view showing the structure of a sub-supply pipe.

As shown in FIG. 46, an extension pipe 3221 may be slidable within the sub-supply pipe 322. A lower opened end of the extension pipe 3221 penetrates through a coupler 3222 and may be fixed to the coupler 3222. The coupler 3222 may have the same or similar shape as the support cover 561 such that the air flowing into the movable arm 55 passes through the coupler 3222 and flows to the hanging bar 52.

Figure 47:
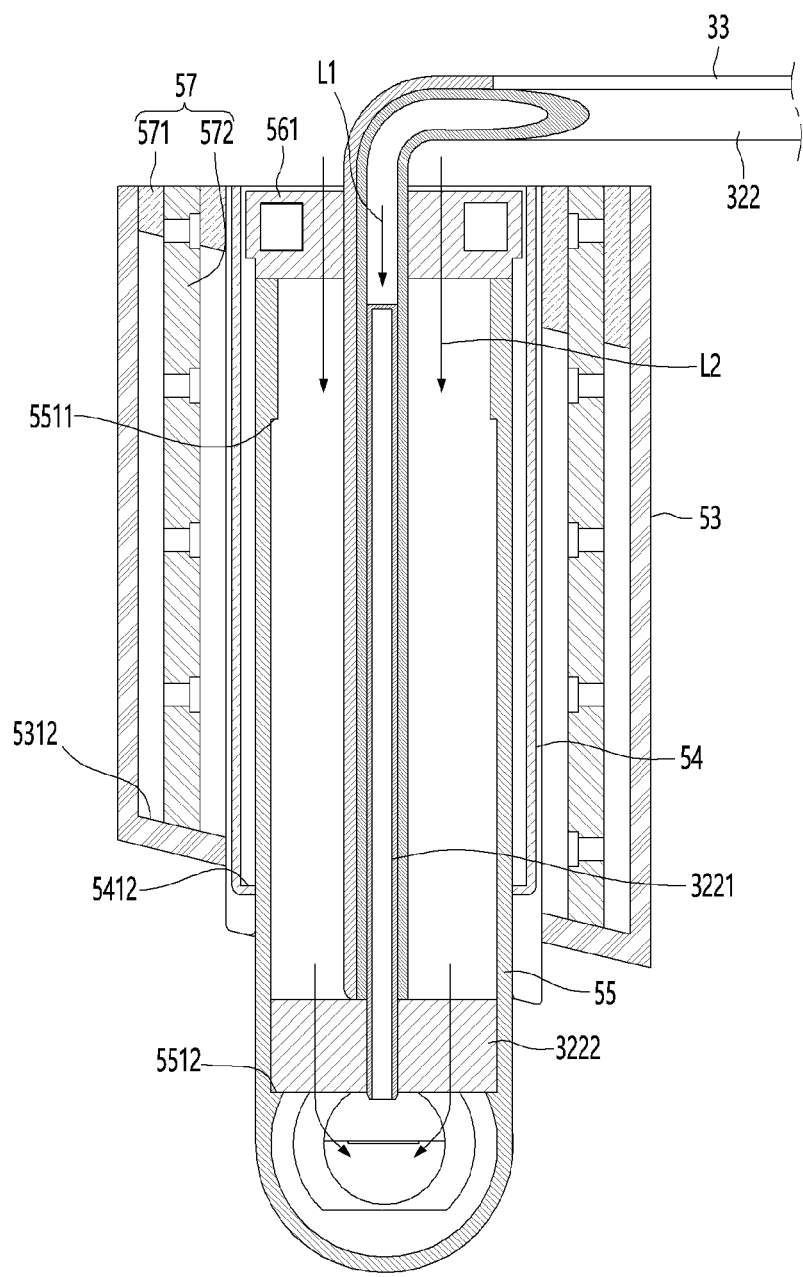
FIG. 47 is a longitudinal cross-sectional view of the support showing the state before the movable arm is withdrawn.

Referring to FIG. 47, in a state in which the length of the support 51 or 51a is at a minimum, i.e., in a state where the intermediate arm 54 and the movable arm 55 are fully inserted into the stationary arm 53, the support cover 561 is located on the upper end of the support 51 or 51a. Further, the coupler 3222 is positioned at the inner lower end of the movable arm 55.

An upper step or stop 5511 may be formed on the inner upper side of the movable arm 55. The upper step 5511 is a portion on which the upper end of the coupler 3222 is caught or stopped. Accordingly, from the moment when the upper end of the coupler 3222 is caught on the upper stepped 5511 while the moving arm 55 descends, the moving arm 55 and the extension pipe 3221 descend as one body.

A lower step or stop 5512 may be formed at an inner lower side of the movable arm 55. The lower step 5512 is a portion on which the lower end of the coupler 3222 is caught or stopped. Accordingly, from the moment when the lower end of the coupler 322 is caught on the lower stepped 5512 while the moving arm 55 rises, the moving arm 55 and the extension pipe 3221 rise as one body.

Figure 48:
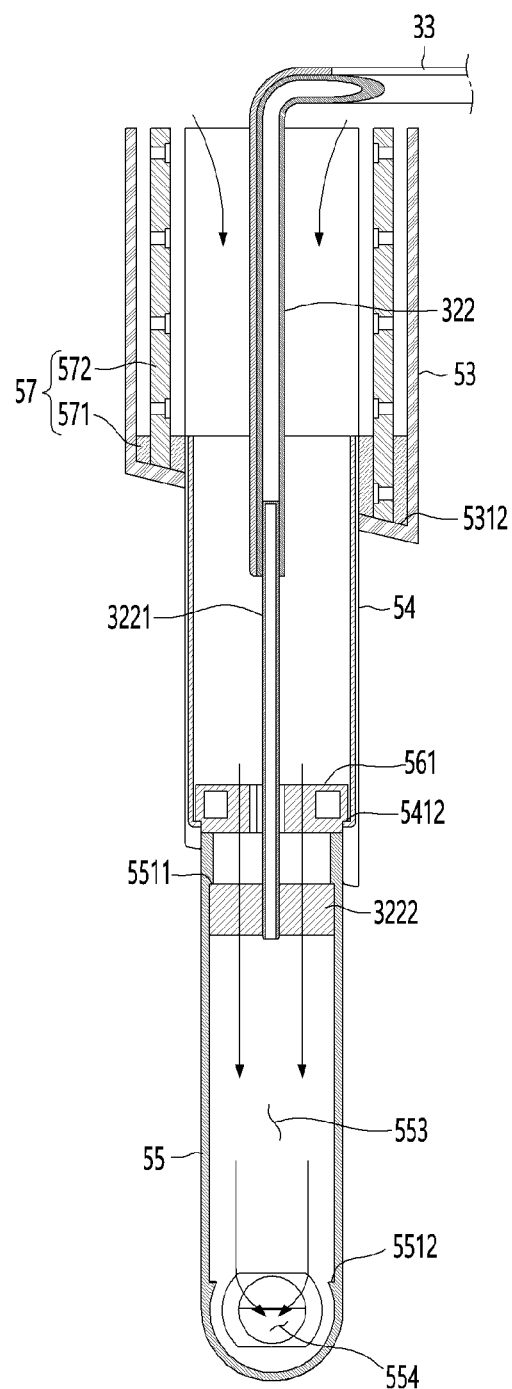
FIG. 48 is a longitudinal cross-sectional view of the support showing the maximum withdrawal of the movable arm and the intermediate arm.
Figure 49:
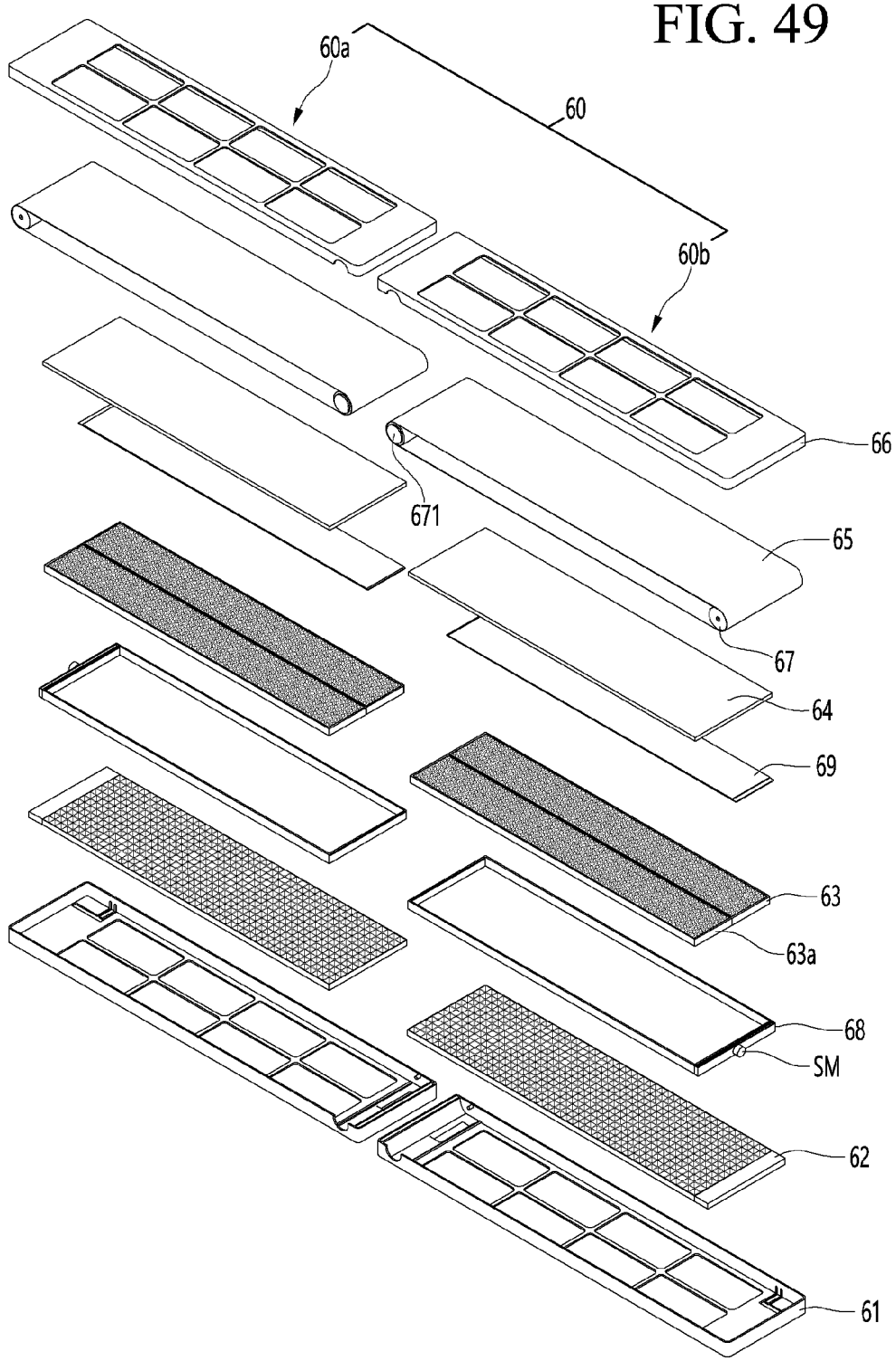
FIG. 49 is an exploded perspective view of a filtering module according to another embodiment for allowing a selective dehumidification function.
Figure 50:
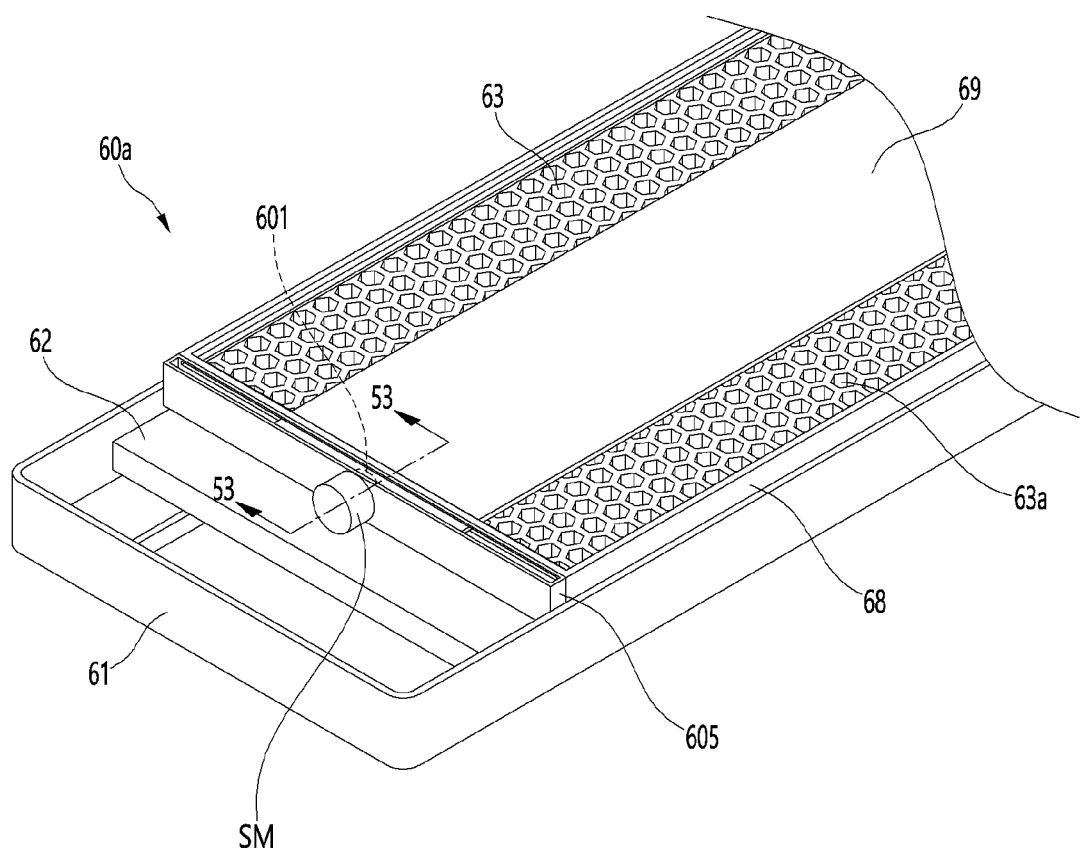
FIG. 50 is an enlarged view showing an internal configuration of a filtering module shown in FIG. 49.
Figure 51:
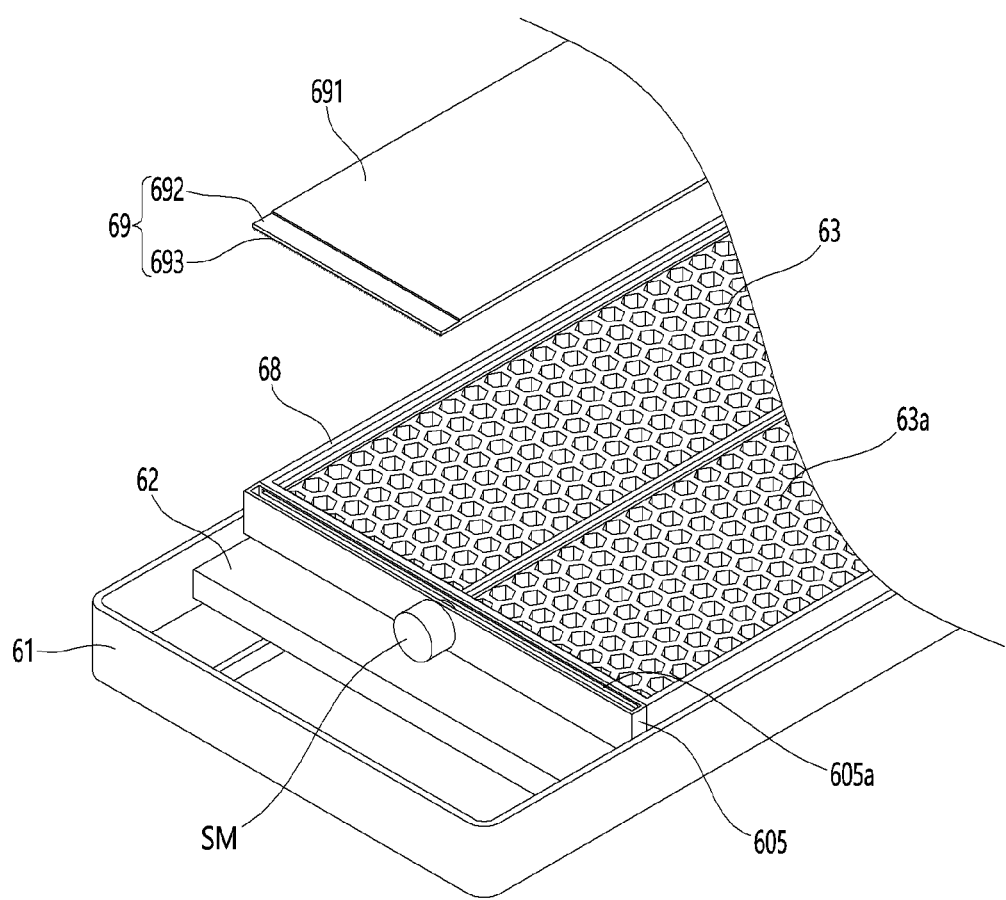
FIGS. 51 and 52 are enlarged perspective views of the filtering module shown with a shielding plate separated from a shield frame.
Figure 52:
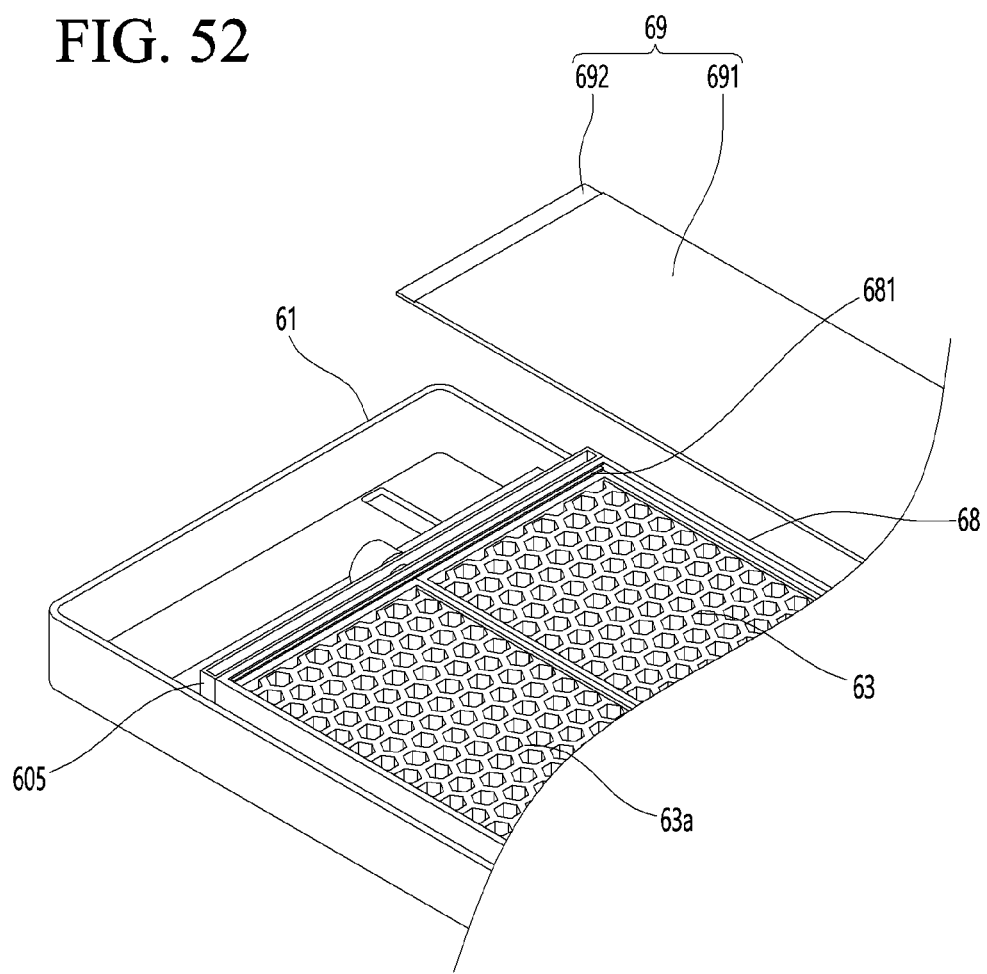
Figure 53:
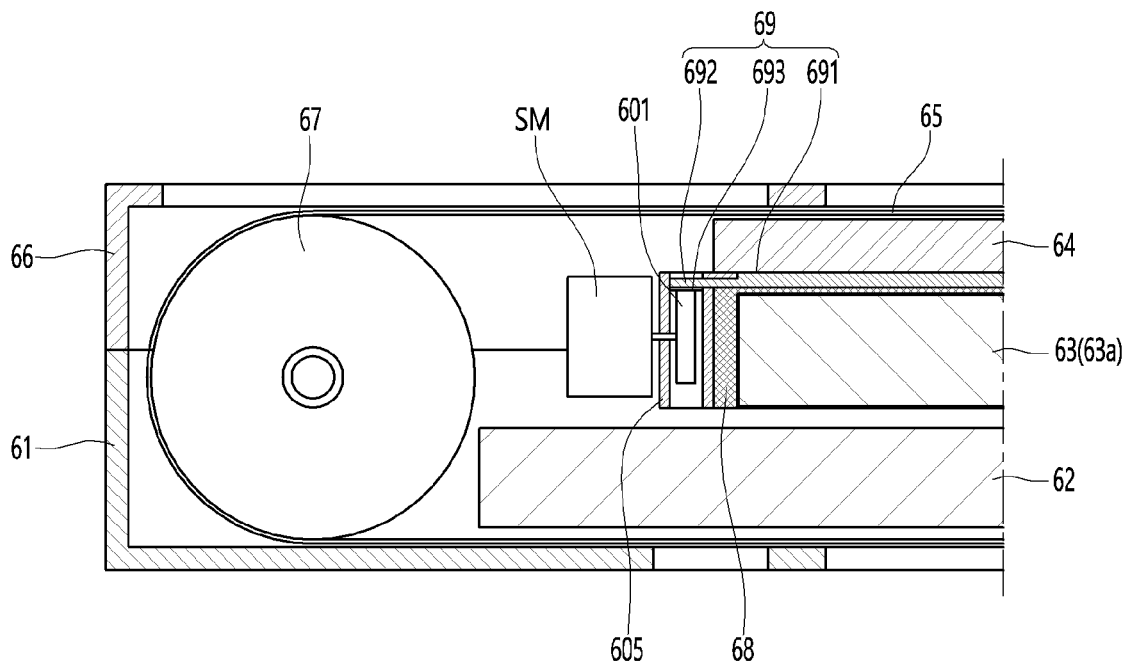
FIG. 53 is a longitudinal cross-sectional view taken along line 53-53 of FIG. 50.

Referring to FIG. 48, a portion of the air that has passed through the filtering module 60 passes through the support 51 or 51a to the hanging bar 52 irrespective of the extended or contracted state. In a state in which the movable arm 55 is maximally descended, the upper end of the extension pipe 3221 is maintained in a state inserted into the sub-supply pipe 322. The intermediate arm 54 may descend until the stator 571 is caught by the limiting protrusion 5312 of the stationary arm 53. The support cover 561 of the movable arm 55 descends in the intermediate arm 54 until the support cover 561 is caught by the stopping protrusion 5412 of the intermediate arm 54.

In a first method to extend the length of the support 51 or 51a, the intermediate arm 54 may be withdrawn first from the stationary arm 53, and thereafter, the movable arm 55 may be withdrawn from the intermediate arm 54. The intermediate or movable arms may or may not be withdrawn to a maximum. The order in which the support 51 or 51a is contracted or raised may be performed in the reverse order of the order in which it is extended, but may not be limited thereto.

In a second method to extend the length of the support 51 or 51a, movable arm may be withdrawn first from the intermediate arm 54, and thereafter, the intermediate arm 54 is withdrawn from the fixed arm. The intermediate or movable arms may or may not be withdrawn to a maximum. The order in which the support 51a is contracted or raised may be performed in the reverse order of the order in which it is extended, but may not be limited thereto.

Referring to FIG. 49-53, the filtering module 60 according to another embodiment may have substantially the same configuration as the filtering module 60 of the previous embodiments, but there are some differences. The filtering module 60 may further include a shield frame 68, a dehumidifying filter 63 and/or deodorizing filter provided in the shield frame 68, and a shield plate 69 configured to cover at least one of the dehumidifying filter 63 or the deodorizing filter 63a. A sliding motor SM mounted on a motor support 605 may be powered to slide the shielding plate 69 in a direction between the front and rear of the shield frame 68.

The shield frame 68 is provided between the HEPA filter 64 and the heater 62, and the shield plate 69 is provided between the HEPA filter 64 and the dehumidifying and/or deodorizing filter 63, 63a. the deodorizing filter 63a may disposed in front of the dehumidifying filter. The dehumidifying filter 63 and the deodorizing filter 63a may have the same left-right length but may have same or different front-rear width. If either of the filters 63, 63a is larger than the other, the shielding plate 69 may have a size corresponding to the larger filter 63 or 63a. In this described embodiment, each of the dehumidifying filter 63 and the deodorizing filter 63a may be sized to halve the shield frame 68 in the front and rear directions. The shielding plate 69 may have a size corresponding to the size of the dehumidifying filter 63 or the deodorizing filter 63a.

The front-rear width of the shield frame 68 may have a size corresponding to the front-rear width of the lower case 61. The left-right length of the shield frame 68 may have the same length of the HEPA filter 64. Accordingly, all or most of the air passing through the HEPA filter 64 is guided to an inner space of the shield frame 68 and passes through one or both of the filters 63, 63a. Slits 681 are formed on the left and right sides of the shield frame 68, and are configured to receive the left and right edges of the shielding plate 69.

The shielding plate 69 includes a main plate 691 and a pair of extension ends 692 (first and second extension ends) extending from left and right ends of the main plate 691. The main plate 691 covers and shields at least one of the dehumidification filter 63 or the deodorization filter 63a. Each of the extension ends 692 is stepped downward from the top surface of the main plate 691 to have a thickness thinner than that of the main plate 691 such that after inserting the extension ends into the slits 681, the upper surface of the main plate 691 and the upper surface of the shield frame 68 are same or substantially planar. The first extension end and the second extension end may have the same or different left-right lengths. A gear rack 693 is formed on a bottom surface of one of the first and second extension ends 692.

A moving member for moving the shielding plate 69 in the front-rear direction is configured to be coupled with the gear rack 693. The moving member includes a pinion 601 configured to engage with the gear rack 693, and a sliding motor SM for rotating the pinion 601. A motor support 605 may be provided on a side surface of the shield frame 68. The motor support 605 has a shape of rectangular pole having a predetermined left-right width with an opening on the upper and lower surfaces and has the same front and rear width of the shield frame 68. The motor support 605 is provided with a slit 605a facing the slit 681 of the shield frame 68 and contacts the shield frame 68. When the first extended end 692 of the shield plate 69 having the gear rack 693 is inserted into the slits 681, 651a, the pinion 601 engages with gear rack 693. As can be appreciated, another type of structure for stably supporting the sliding motor SM may be used, or a structure in which the sliding motor SM is fixed to the edge of the upper surface of the heater 62 may be used.

When the pinion 601 rotates in a first direction to move the shielding plate 69 and to contact with the front end of the shield frame 68, the shielding plate 69 completely covers the deodorizing filter 63a. In this instance, all of the air sucked into the filtering module 60 passes through the dehumidifying filter 63 such that only the dehumidifying function is performed.

When the pinion 601 rotates in a second direction opposite the first direction to move the shielding plate 69 and to contact with the rear end of the shield frame 68, the shielding plate 69 completely shields the dehumidifying filter 63. In this instance, all of the air sucked into the filtering module 60 passes through the deodorization filter 63a such that only the deodorization function is performed.

When the shield plate 69 is positioned at the center of the shield frame 68, a part of the air sucked into the filtering module 60 passes through the deodorization filter 63a and the remaining air passes through the dehumidifying filter 63 such that the dehumidifying and deodorizing functions are simultaneously performed. As can be appreciated, the area covering the dehumidification filter 63 and the area covering the deodorization filter 63a may be set differently according to the position of the shielding plate 69 in the front-rear direction.

As can be appreciated, both the dehumidifying filter and the deodorizing filter 63a need not be placed inside the shield frame 68. For example, when the dehumidifying filter 63 is placed in an inner half of the shield frame 68 and the other half may be left as an empty space, the deodorizing function will not be performed, and only the dehumidifying function will be selectively performed. Similarly, when only the deodorizing filter 63a is provide, the dehumidifying function may not be performed and only the deodorizing function may be selectively performed. In an alternative embodiment, the inner half of the shield frame 68 may be filled by the dehumidifying filter 63, and the other half is left as an empty space, and the deodorizing filter 63a is placed on the upper side of the shielding plate 69. In this alternative, the deodorization filter 63a may be provided having the same size as the size of the shield frame 68 such that the deodorization function is always performed, and only the dehumidification function may be selectively performed by the shield plate 69.

Figure 54:
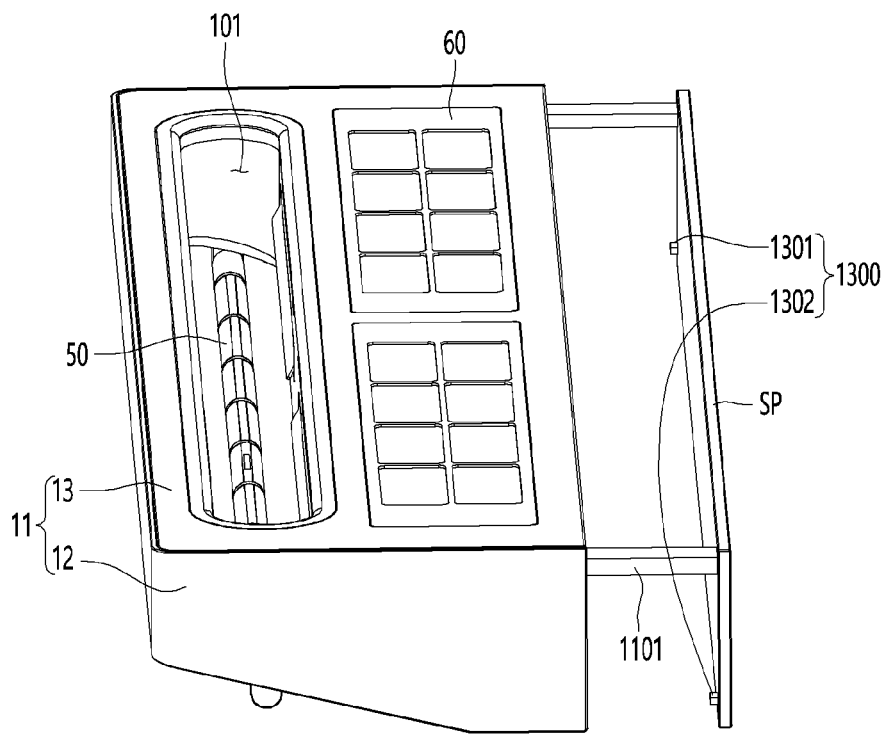
FIG. 54 is a top perspective view of the hanger device according to another embodiment where the hanger device is movable from the installation wall.
Figure 55:
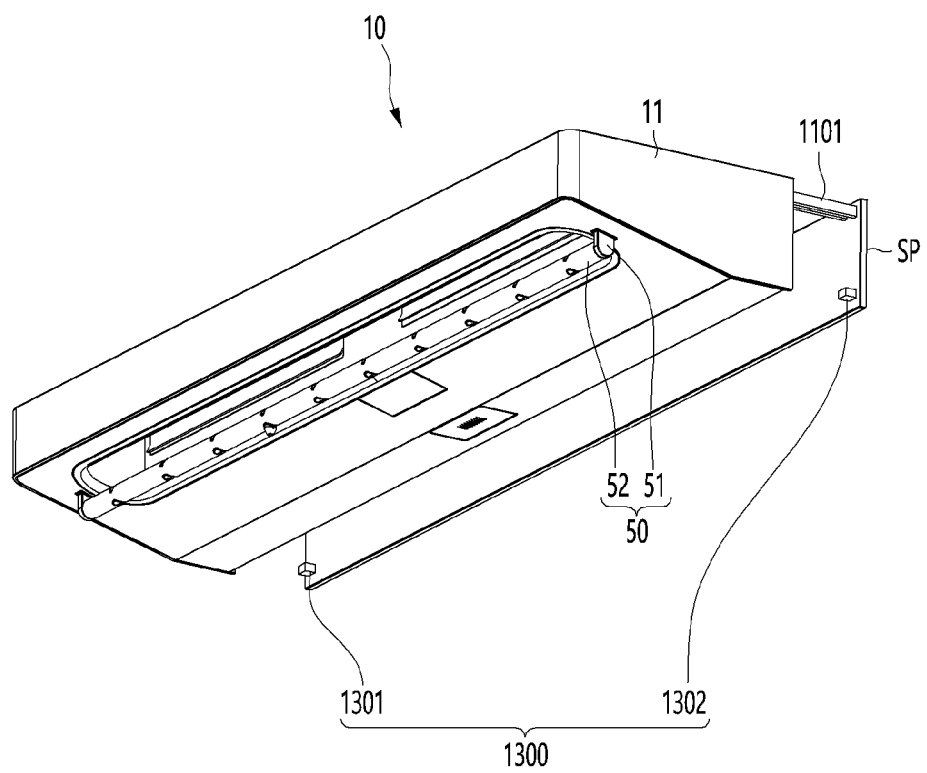
FIG. 55 is a bottom perspective view of the hanger device shown in FIG. 54.

With reference to FIGS. 54 and 55, the hanger device 10 according to another embodiment may further include a moving device for horizontally moving the main body 11 in the front-rear direction from the installation wall surface. The moving device may includes a support plate (SP) and a pair of support rails (1101) extending from the front surface of the support plate (SP). The pair of support rails 1101 extend into the main body 11 through the rear surface of the main body 11. The support plate SP is fixed to the installation wall and may have a rectangular plate shape. The support rail 1101 may extend from a front left edge and a front right edge of the support plate SP.

A sensing device for detecting the width of clothes hung on a hanger may be mounted on the front surface of the support plate SP. The sensing device may be provided in various forms, for example, an infrared sensor 1300. The infrared sensor 1300 includes a light emitter 1301 mounted on one side of the front lower end of the support plate SP, and a light receiver 1302 mounted on the other side of the front lower end of the support plate SP and facing the light emitter 1301. When the light irradiated from the light emitter 1301 is sensed by the light receiver 1302, the control unit of the hanger device 10 determines that the clothes or items hung on the hanger do not touch the wall. On the other hand, if the light irradiated from the light emitter 1301 is not detected by the light receiver 1302, the control unit determines that the clothes or items on the hanger are in contact with the wall, and the main body 11 horizontally moves away from the installation wall in the front-rear direction.

Figure 56:
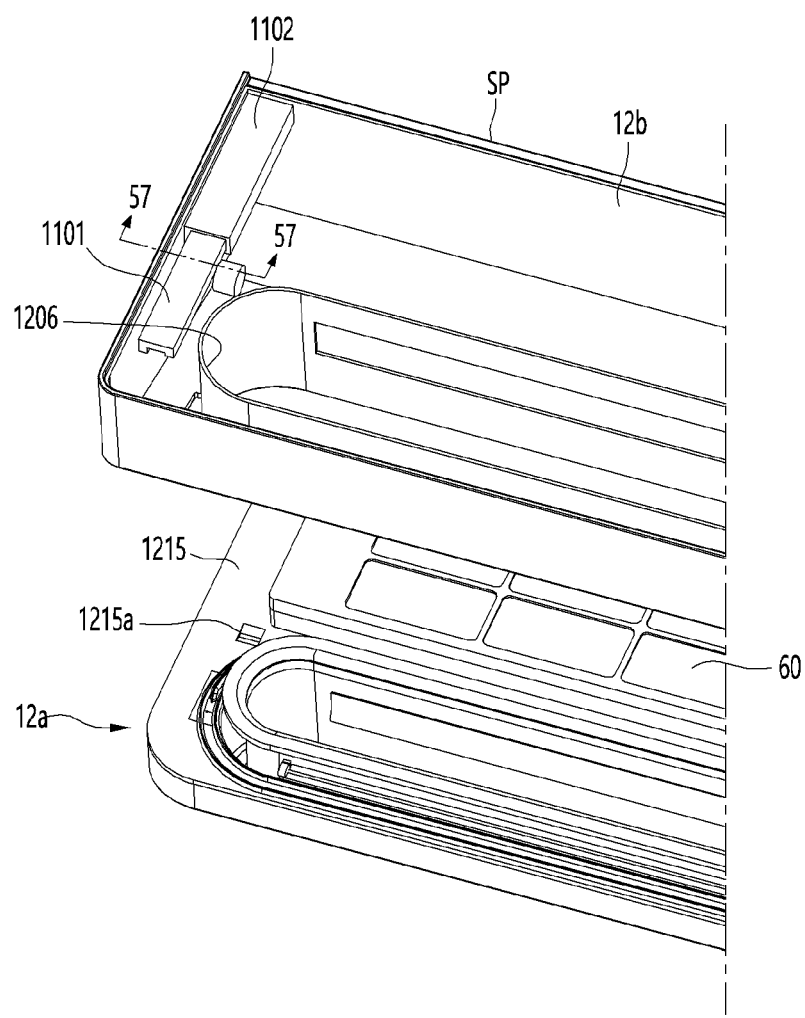
FIG. 56 is an exploded perspective inside view of the main body showing details to allow movement from and away from the installation wall.
Figure 57:
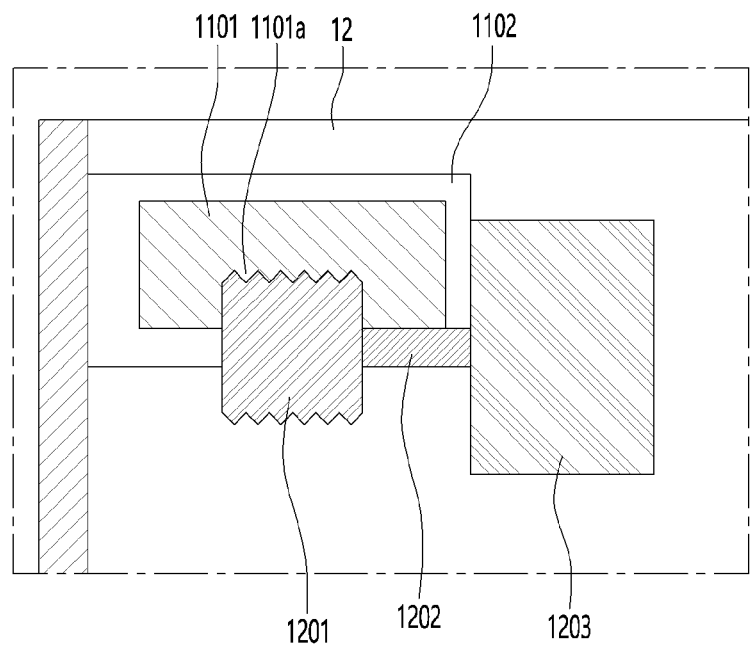
FIG. 57 is a longitudinal cross-sectional view taken along lines 57-57 of FIG. 56.

Referring to FIG. 56 (for explanation purposes only, the position of the upper and lower cabinets is reversed in FIG. 56), the moving device further includes a guide rail 1102 and a power generating member coupled to the support rail 1101. The guide rail 1102 is coupled to the inner edge of the main body 11, specifically, the cabinet 12, and moves as one body with the main body 11. The support rail 1101 is coupled to the guide rail 1102 to pass through the guide rail 1102. A gear rack 1101a is formed on the bottom surface of the support rail 1101.

The power generating member includes a motor 1203 and a pinion 1201 coupled to a rotation shaft 1202 of the motor 1203. The motor 1203 may be fixed to an upper surface of the discharge guide 1215 accommodated in the body 11. A motor seat 1215a on which the motor 1203 is seated may be formed on the upper surface of the discharge guide 1215, and the motor seat 1215a is in the form of a depression accommodating a portion of the motor 1203. The pinion 1201 is engaged with the gear rack 1101a of the support rail 1101.

When power is applied to the motor 1203 and the pinion 1201 rotates in one direction based on the sensor detection, the guide rail 1102 moves forward along the support rail 1101. Since the guide rail 1102 is formed as one body with the main body 11 and as the guide rail 1102 moves forward along the support rail 1101, the main body 11 moves away from installation wall surface. Conversely, when the pinion 1201 rotates in the other direction, the guide rail 1102 and the main body 11 moves toward a direction closer to the installation wall surface.

As can be appreciated, a moving device for moving the main body 11 in the front-rear direction, a rail structure is presented, but is not limited thereto, and various forms including a motorized lead screw, a linear motor, or an electric cylinder actuator capable of multi-stage withdrawal may be used. In such a case, a moving unit such as the lead screw or a linear motor connects the support plate SP and the main body 11 so that the main body 11 moves away from the support plate SP or is close to the support plate SP.

Figure 58:
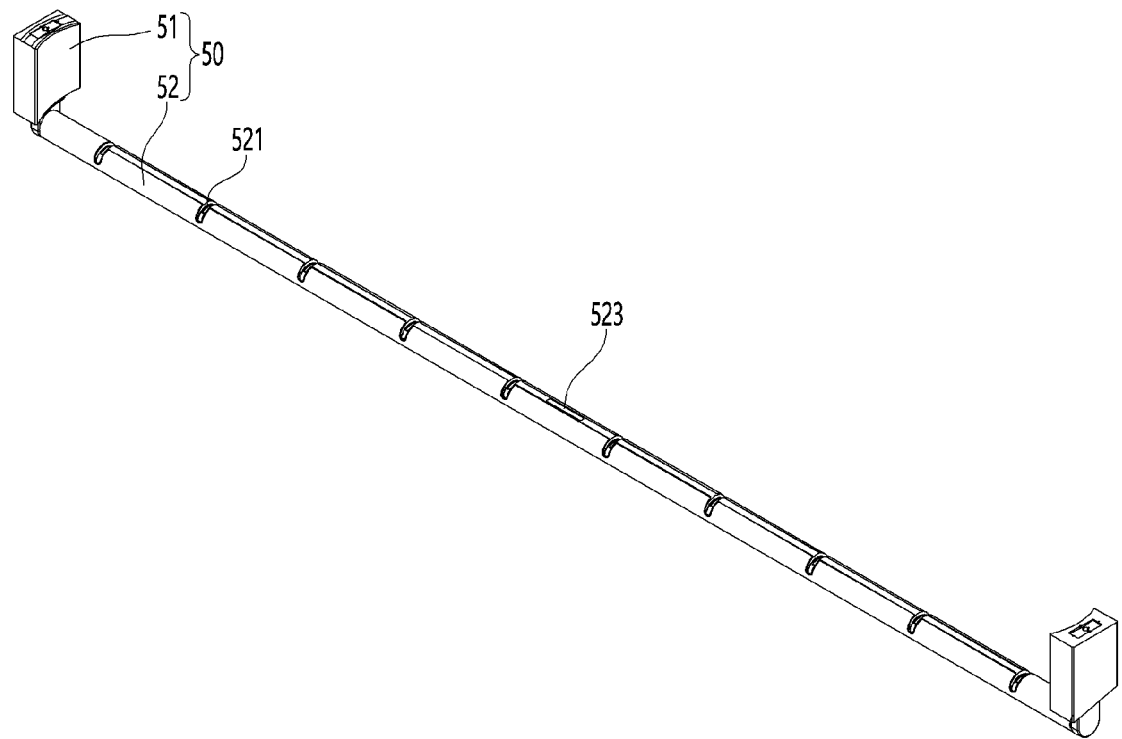
FIG. 58 is a perspective view of a hanging unit having an eccentricity detection function.

Referring to FIG. 58, the eccentricity applied to the hanging bar 52 may be extracted using pressure values transmitted from the pressure sensors PS attached to the hanger groove 521 as described for the previous embodiments. See, e.g., FIG. 1, FIG. 31, FIG. 42, or FIG. 54 embodiments. In addition to or separate from the pressure sensors PS, a gyro sensor 523 may be installed on the hanger bar 52. The gyro sensor 523 may be mounted on the center of the top surface or the center of the bottom surface of the hanging bar 52. Alternatively, an accelerometer may be used.

When clothes or items are hung on either one of the left and right sides of the hanging bar 52, an inclination of the hanging bar 52 may be detected by the gyro sensor 523. According to the eccentricity value sensed by the gyro sensor 523, more air, warm dry air, or steam may be supplied to the side of the hanger having larger incline detected by the gyro sensor 523. For example, in the FIG. 1 embodiment, the rotational speed of the main fan module 15 and the sub-fan module 16 corresponding to the side on which more clothes are items are hung is adjusted or increased. In another example for FIG. 31 embodiment, the opening of inlet 1244 may be adjusted by the gate 126 described in FIGS. 39 and 40.

The pair of supports 51 may include an elastic material in order for the gyro sensor 523 to detect the inclination of the hanging bar 52. For example, a portion or a part of each of the pair of supports 51 may be formed to include a corrugated pipe such that the length of the support 51 may be changed by the force applied to the hanging bar 52. In addition to this method, the support 51 and the hanging bar 52 may be connected by an elastic body such that when different magnitudes of force are applied to both ends of the hanging bar 52, the hanging bar 52 is inclined.

When more clothes or items are hung on one side of the hanging bar 52, a notification message is output through a display unit provided on the front of the main body 10 or a speaker provided on the main body 10. For example, when clothes are hung on the left side of the bar 52, a notification message requesting to hang clothes by evenly distributing the clothes to the other side can be output in the form of text, image, video, or voice.

Figure 59:
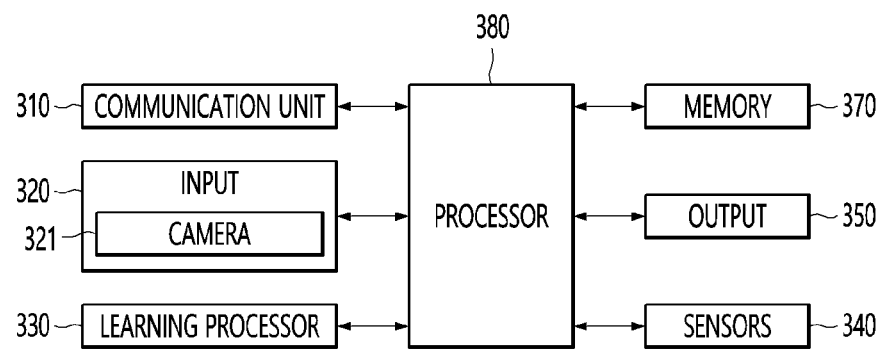
FIG. 59 shows a schematic of the electronics components or module for the various described embodiments.

FIG. 59 shows a schematic of the electronic components or module for the various described embodiments. The electronic components may include a communication unit 310, an input unit 320, a learning processor 330, a sensing unit 340, an output unit 350, a memory 370, and a processor 380 (also referred to as a control unit).

The communication unit 310 may transmit/receive data to and from external devices such as another hanger device or an external server using wired/wireless communication technology. For example, the communication unit 310 may transmit and receive sensor information, a user input, a learning model, a control signal, and the like, from external devices. Presently, the communication technology used by the communication unit 310 may include GSM (Global System for Mobile communication), CDMA (Code Division Multi Access), LTE (Long Term Evolution), 5G, WLAN (Wireless LAN), Wi-Fi (Wireless-Fidelity)), Bluetooth™, RFID (Radio Frequency Identification), Infrared Data Association (IrDA), ZigBee, NFC (Near Field Communication), etc.

The input unit 320 may acquire or receive various types of data. The input unit 320 may include a camera 3210 (FIG. 60) for inputting an image signal, a microphone for receiving an audio signal, a user buttons or touch panel for receiving information from a user. The various data or signal provided by the input unit may be referred to as sensing data or sensor information.

The learning processor 330 may train a model composed of an artificial neural network by using training data. The learned artificial neural network may be referred to as a learning model. The learning model may be used to infer a result value with respect to new input data other than the training data, and the inferred value may be used as a basis for a decision to perform a certain operation. The learning processor 330 may include a memory integrated or implemented in the hanger device. Alternatively, the running processor 330 may use the memory 370, an external memory directly coupled to the hanger, or a memory maintained in an external device.

The sensing unit 340 may acquire at least one of internal information of the clothes hanger devices 10 and 10a, surrounding environment information of the clothes hanger devices 10 and 10a, and user information by using various sensors. The sensors may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, a light sensor, a microphone, Lidar, Radar, etc.

The output unit 350 may generate an output related to sight, hearing, or touch. The output unit 350 may include a display unit that outputs visual information, a speaker that outputs auditory information, a haptic module that outputs tactile information, and the like.

A memory 370 may store data to support various functions of the hanger device. The memory 370 may store input data obtained from the input unit 320, learning data, a learning model, a learning history, and the like. The memory may comprise one or more of RAM, SRAM, ROM, solid state hard drive, etc.

The processor 380 may determine at least one executable operation of the hanger device based on information determined or generated using a data analysis algorithm or a machine learning algorithm. In addition, the processor 380 may control the components of the hanger devices to perform various operation. The processor 380 may request, search, receive, or utilize the data of the learning processor 330 or the memory 370, and perform a predicted operation or an operation determined to be desirable among the at least one executable operation.

The processor 380 may also control various component to operate a prescribe function of the hanger device based on data received through the communication unit 310. When the connection of the external device is required to perform an operation, the processor 380 may generate a control signal for controlling the corresponding external device and transmit the generated control signal to the corresponding external device.

The processor 380 may obtain information with respect to a user input, and determine a user's requirement based on the obtained information. The processor 380 may use at least one of a speech to text (STT) engine for converting a voice input into a character string or a natural language processing (NLP) engine for obtaining intention information of a natural language. At least one of the STT engine or the NLP engine may be configured as an artificial neural network, where at least a part of which is learned according to a machine learning algorithm. At least one of the STT engine and the NLP engine may be learned by the learning processor 330.

The processor 380 may collect history information including user feedback on the operation contents or operation of the hanger device, and store the information in the memory 370 or the learning processor 330, or transmit the information to an external device. The collected historical information may be used to update the learning model. The processor 380 may also control at least some of the components of the clothes hanger device in order to drive an application program stored in the memory 370. The processor 380 may operate by combining two or more of the components included in the hanger devices to drive the application program.

Figure 60:
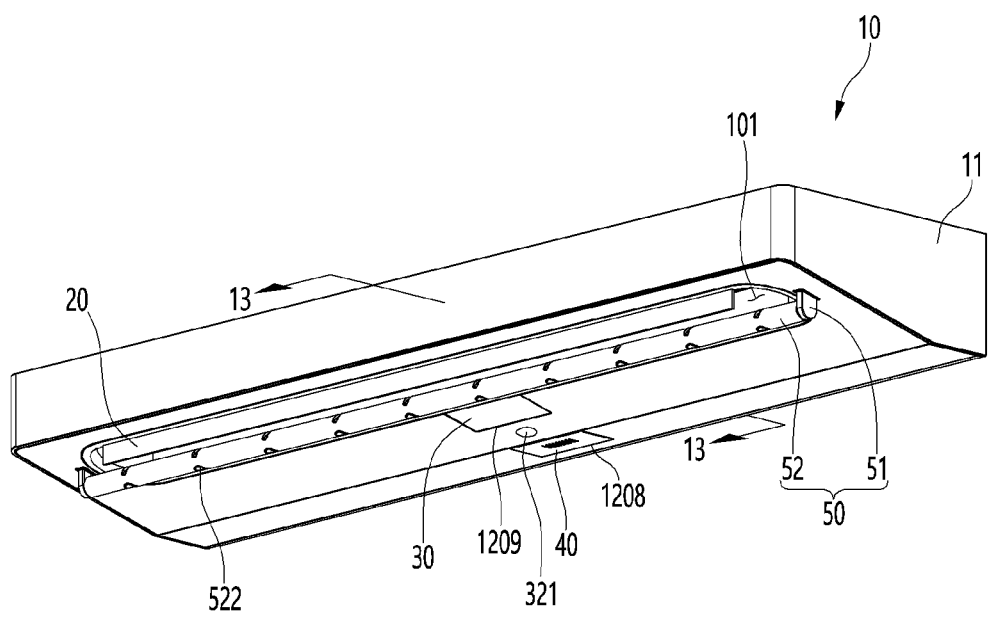
FIGS. 60 and 61 illustrate a camera arrangement position on the hanger device of FIG. 1 and FIG. 31 embodiments, respectively.
Figure 61:
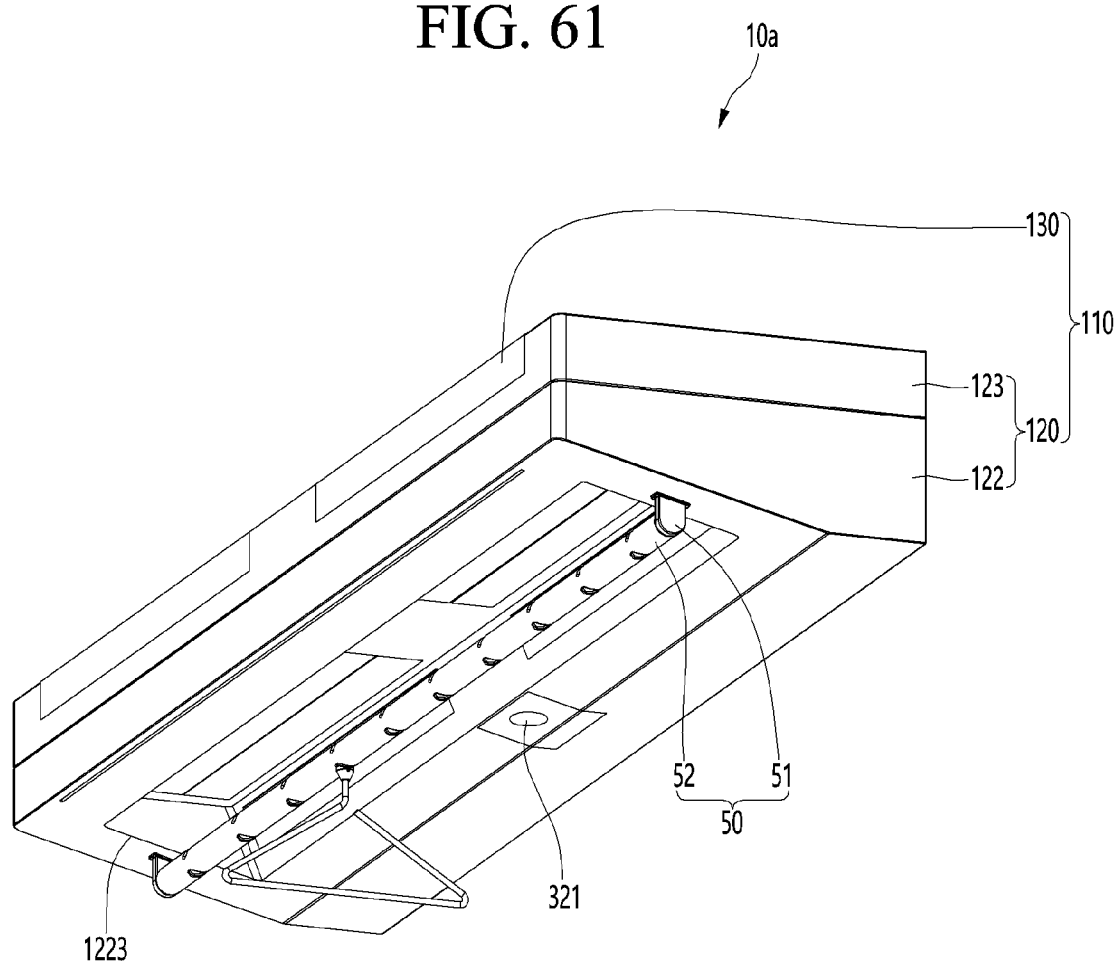

As shown in FIG. 60, a camera 3210 may be disposed under the body 11 in a direction toward the hanging unit 50 of the FIG. 1 embodiment. As shown in FIG. 61, the camera 3210 may be disposed on the lower surface of the lower cabinet 122 in a direction toward the hanging unit 50.

Figure 62:
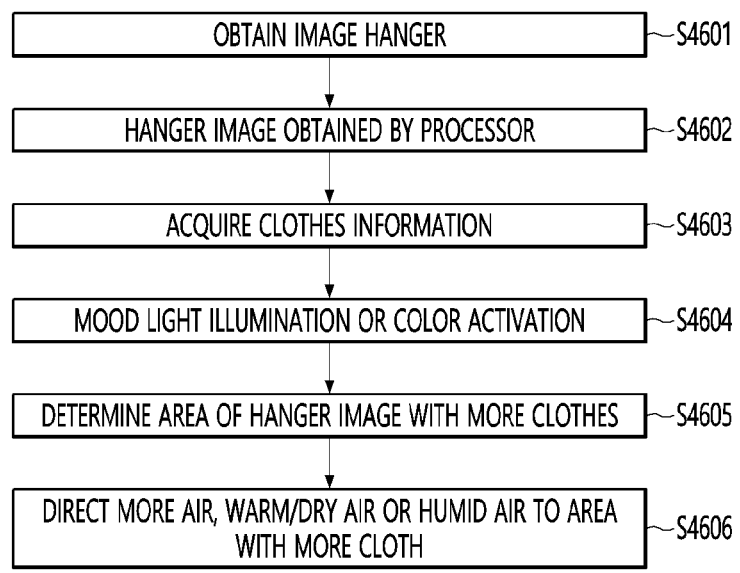
FIG. 62 is a flow diagram for a method of operating a hanger device shown in FIGS. 60 and 61.
Figure 63:
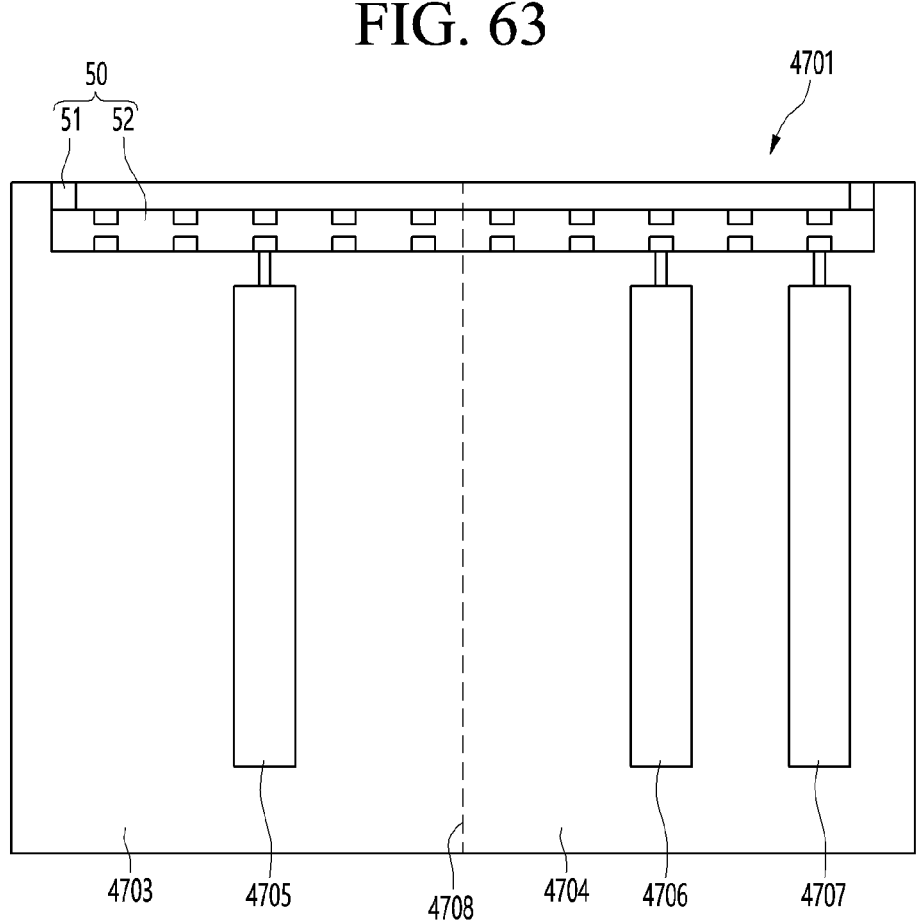
FIG. 63 is an exemplary view an image captured by a camera.
Figure 64:
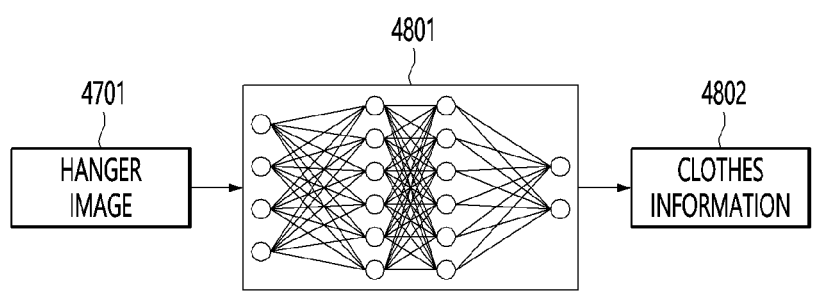
FIG. 64 is a diagram for describing an image recognition model.

With reference to FIG. 62-64, the camera 3210 may photograph the hanger area including the hanging unit 50 (step S4601). The camera 3210 may generate an image by photographing a hanger area including the hanging unit 50. The processor 380 may acquire the image captured by the camera 3210 (step S4602). FIG. 63 is an exemplary view of the image 4701, the image being a photographed image of the hanger area including the hanging unit 50.

Based on the image 4701, the processor 380 may acquire clothes information regarding at least one clothes hung on the hanging unit 50 (step S4603). The clothes information may include at least one of information on the number of clothes hung on the hanging unit 50, or area information of each of at least one clothes and location information. The location information may correspond to coordinate values of clothes recognized in the image 4701.

The processor 380 may input the hanger image 4701 to the image recognition model 4801 to obtain clothes information 4802 output from the image recognition model 4802. The image recognition model 4801 may be an artificial neural network (ANN) trained to recognize clothes included in an image file corresponding to the input data, and output clothes information including the total number of recognized clothes, and/or the area and location information of each recognized clothes. An artificial neural network (ANN) is a model used in machine learning, and may refer to an overall model having problem-solving ability, which is composed of artificial neurons (nodes) that form a network by combining synapses. The image recognition model may be a model stored in the memory 370.

As shown in FIG. 64, the processor 380 may input the hanger image 4701 for the image recognition model 4801. The processor 380 may obtain the clothes information 4802 output from the image recognition model 4801. The output clothes information 4802 may include a total number of recognized clothes, an area information of each recognized clothes, and a location information. For example, the output clothes information 4802 may include a total number '3' for the clothes 4705, 4706, and 47007 recognized in the hanger image 4701, an area information of each of the recognized clothes 4705, 4706 and 47007, and a location information. The area information may refer to information about at least one area of the hanger area in which clothes are recognized. The location information may correspond to a coordinate value in an image of an area where clothes are recognized.

The processor 380 may determine whether clothes are hung on the hanging unit 50 based on the clothes information (step S4604). For example, the processor 380 may determine whether clothes are hung on the hanging unit 50 based on information on the total number of recognized clothes included in the clothes information.

When clothes are hung on the hanging unit 50, the processor 380 may change the illuminance or color of the mood light (step S4604). For example, when it is determined that clothes are hung on the hanging unit 50, the processor 380 may turn on the mood light 17 and allow light to be gently emitted through the through hole 101 to notify the user that clothes are hung on the hanger devices, e.g., 10 and 10*a*. Further, power is applied to the hanger devices, e.g., 10 and 10*a*, in preparation for hot/dry air supply mode (or drying mode) or steam supply mode (the humidification mode or the wrinkle removal mode).

The processor 380 may determine an area with more clothes from among a plurality of divided areas of the hanger area based on area information and location information of each piece of clothing included in the clothes information (step 4605). For example, referring to FIG. 63, the clothes hanger image 4701 may be divided into a first area 4703 and a second area 4704 on the left and right based on a central dividing line 4708 in the entire area. The processor 380 may determine which of the first and second areas the recognized clothes 4705, 4706, and 4707 belong to based on location information of the recognized clothes information. For example, the processor 380 may determine that the first clothes 4705 belong to the first area 4703 and the second clothes 4706 and the third clothes 4707 belong to the second area 4704 based on the location information of the clothes.

Based on the result of step S4605, the processor 380 may supply more air, warm air, or steam to an area where more clothes are hung (step S4606). For example, in the case of the hanger device 10 according to the FIG. 1 embodiment, the processor 380 may change the rotation speed of the main fan module 15 and the sub fan module 16 corresponding to the area or region where more clothes are hung. The rotation speed of the main fan module 15 and the sub-fan module 16 of the region can be controlled to be higher than that of the other region with less clothes. In the case of the hanger device 10*a* of FIG. 311 embodiment, the processor 380 adjusts the amount of movement of the gate 126 described in FIGS. 39 and 40 such that the inlet 1244 is more open on the side of the lower cabinet 122 where more clothes are hung.

Figure 65:
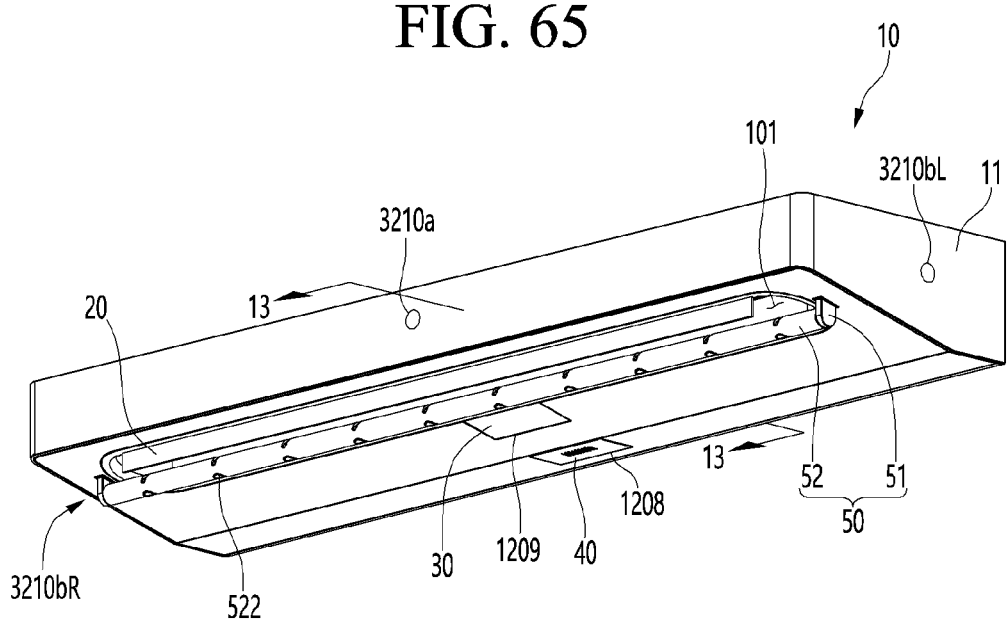
FIGS. 65 and 66 illustrate camera arrangement position according to another embodiment.
Figure 66:
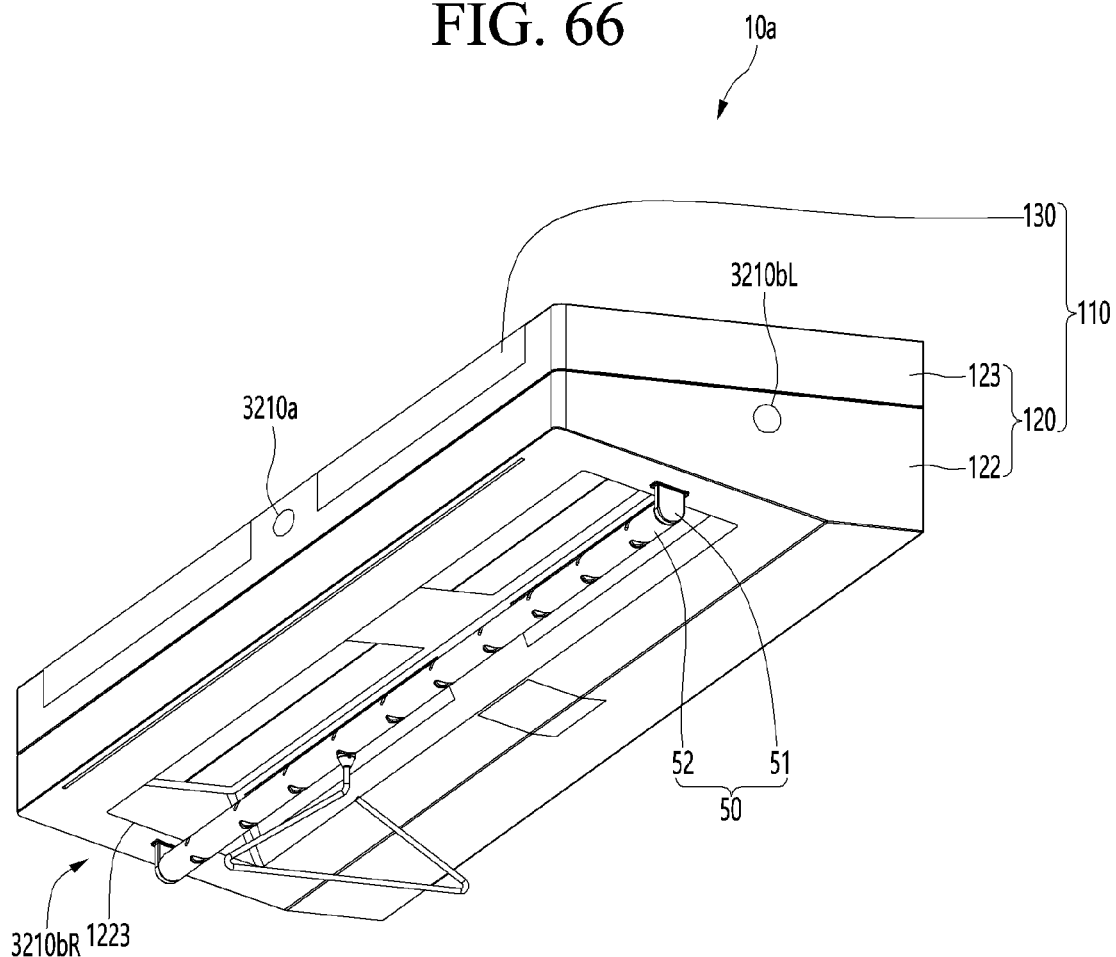
Figure 67:
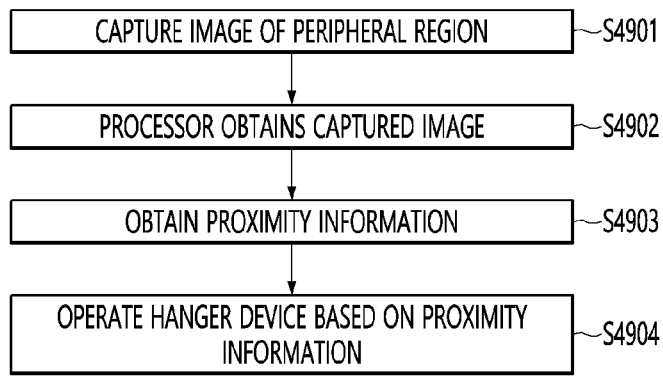
FIG. 67 is a flow diagram of a method of operating a hanger device based on at least one image captured by the camera arrangement positions of FIG. 65 or 66.
Figure 68:
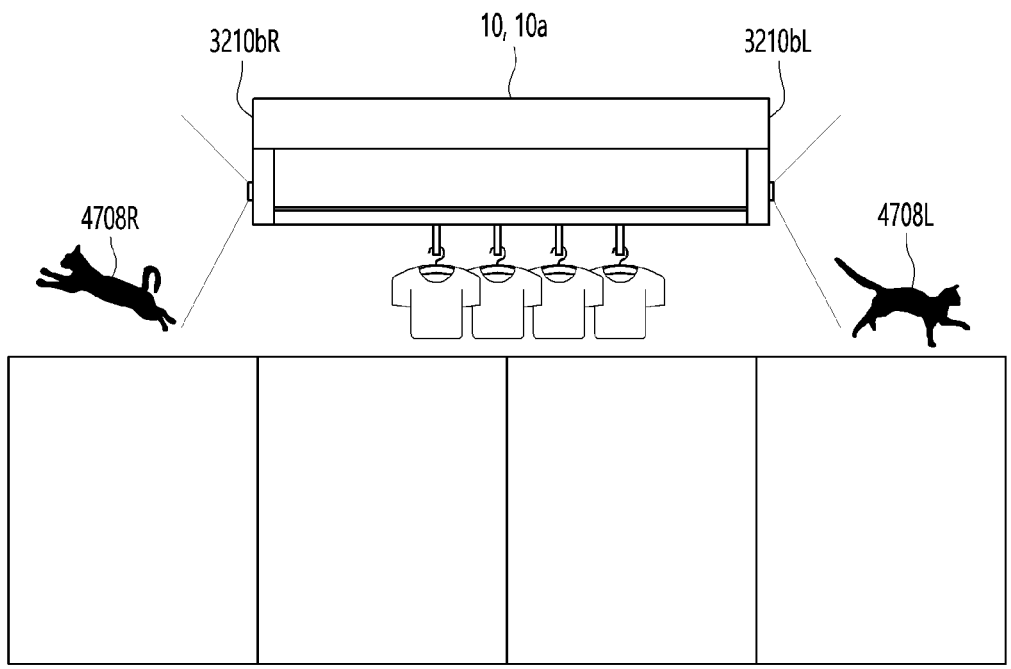
FIG. 68 is an exemplary diagram schematically illustrating a situation of a hanger device to describe an image of a side peripheral region captured by at least one camera of FIG. 65 or 66.
Figure 69:
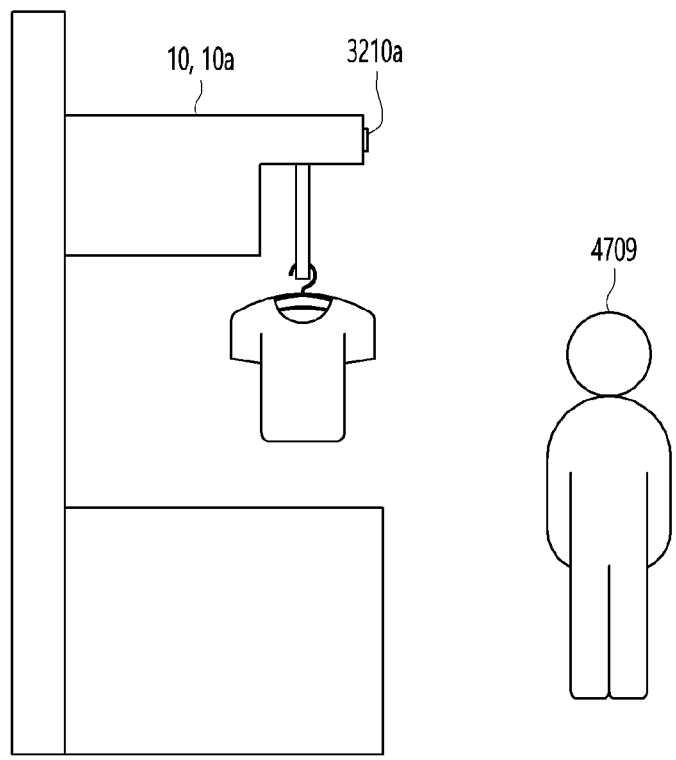
FIG. 69 is an exemplary diagram schematically illustrating a situation of a hanger device to describe an image of a front peripheral region captured by at least one camera of FIG. 65 or 66.

Referring to FIG. 65, the hanger device 10 of the FIG. 1 embodiment may include at least one camera, which may comprise a front camera 3210*a* on the front surface of the main body 11, a left camera 3210*b*L a left side surface of the main body 11, and/or a right camera 3210*b*R on a right side surface of the main body 11. The cameras may be arranged in a direction in which the surrounding area of the hanger device 10 may be photographed. As shown in FIG. 66, the cameras 3210*a*, 3210*b*L and/or 3210*b*R are similarly arranged for the hanger device 10*a* of the FIG. 31 embodiment.

With reference to FIGS. 67 to 70, at least one of a front, left or right camera 3210*a*, 3210*b*L, 3210*b*R captures at least one image of the peripheral/surrounding region (step S4901). The processor 380 acquire an image of the peripheral/surrounding region captured by at least one camera (step S4602). The peripheral region image may include at least one of a front area image captured by the front camera 3210*a*, a left area image captured by the left camera 3210*b*L, and a right area image captured by the right camera 3210*b*R.

For example, the processor 380 may acquire a right region image including the first object 4708R from the right side by the right camera 3210*b*R. The processor 380 may acquire a left area image including the second object 4708L approached from the left by the left camera 3210*b*L. See FIG. 68. The processor 380 may acquire a front area image including a third object 4709 approached from the front by the front camera 3210*a*.

The processor 380 may acquire proximity information regarding an object approaching or present around the hanger devices 10 and 10*a* based on at least one image of the peripheral region (S4603). The proximity information may include at least one of object information about an object approaching, present around or retreating from the hanger devices 10 and 10*a*, proximate area information, and proximate distance information about a distance from the hanger devices 10 and 10*a*. The object information may include information on whether an object is a human, an animal, or an object. The proximate area information may be information regarding whether to approach from the front, left, or right area.

Figure 70:
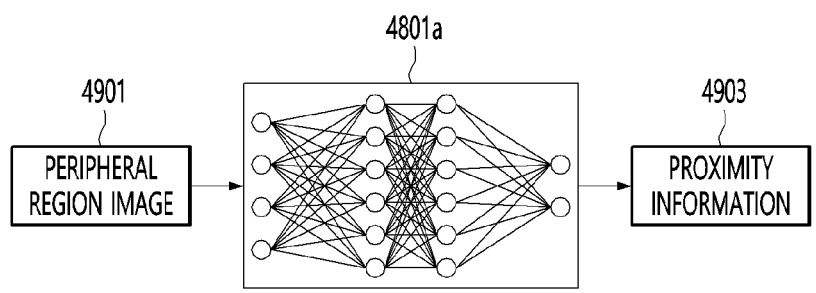
FIG. 70 is a view for explaining an image recognition model based on the at least image captured by at least one camera of FIG. 65 or FIG. 66.

As shown in FIG. 70, the processor 380 may obtain proximity information 4903 output from the image recognition model 4801*a* by inputting at least one image 4901 of the peripheral region to the image recognition model. The image recognition model may be an artificial neural network (ANN) trained to output proximity information including object information and approach distance information by recognizing an object included in an image file with respect to an image file that is input data. An artificial neural network (ANN) is a model used in machine learning, and may refer to an overall model having problem-solving ability, which is composed of artificial neurons (nodes) that form a network by combining synapses. The image recognition model may be a model stored in the memory 370.

The processor 380 may control the operation of the hanger device based on the obtained proximity information (step S4604). The processor 380 may determine whether a person is approaching the hanger devices 10 and 10*a* based on the object information and the proximate distance information included in the proximity information.

For example, when the power of the hanger devices 10 and 10*a* is not turned on or when it is determined that a person is approaching the hanger device based on the proximity information in the standby mode, the processor 380 supplies power to the hanger devices 10 and 10*a* or the hot air mode (or drying mode) or steam supply mode (humidification mode or wrinkle removal mode) is turned on to prepare the hanger devices 10 and 10*a* for operation. Further, the mood light 17 may be turned on and illuminance or color of light may be adjusted for emission through the through hole 101. The mood light may inform the user that the hanger devices 10 and 10*a* have recognized the approach of a person.

The processor 380 may also determine a region or an area to which the object is present based on the proximity information. For example, the processor 380 may determine whether the object is approaching from the front, left, or right area/region based on the proximate area information included in the proximity information. Based on the proximity information, the processor 380 may reduce or change the supply of air, warm/hot air, or steam in an area of the hanger device corresponding to the proximate area information when the hanger device (10, 10*a*) is operating in the hot air supply mode (or drying mode) or steam supply mode (humidification mode or wrinkle removal mode).

For the hanger device 10 of FIG. 1 embodiment, the processor 380 may determine the rotational speed of the main fan module 15 and the sub-fan module 16 corresponding to the area to which the object is approaching based on the proximity information. For example, the processor 380 may reduce the rotational speeds of the left main fan module 15 and the left sub-fan module 16 corresponding to the left area/region to which the object is approaching. When the object approaches from the front, the processor 380 may change the rotational speed of both left and right main fan modules 15 and the sub-fan modules 16 to be lower than the existing rotation speed.

In the case of the hanger device 10*a* according to FIG. 31 embodiment, the processor 380 may adjust the movement of the gate 126 described in FIGS. 39 and 40 to decrease or increase the opening of the inlet 1244. For example, the processor 380 may control the movement of the gate 126 on the left side to reduce the supply of air, warm/hot air, or steam if the object is approaching from the left side of the hanger device 10*a*.

A hanger device of present disclosure includes a main body (11) including a at least one cabinet (12) and a cover (3) to cover the at least one cabinet, the cover having at least one opening and the cabinet having at least one discharge port (1207). A fan module (15, 16) is provided in the cabinet and is configured to suction air through the opening of the cover and force the air to the discharge port. A filtering module (60) is disposed over the fan module to filter air as the air is suctioned through the opening of the cover. A discharge tube (14) extends through upper and lower surfaces of the main body and has at least one discharge duct (141, 142) which communicate with the at least one discharge port of the cabinet. A hanging unit (50) extends from the bottom surface of the main body.

A hanger device of the present disclosure may include a body (11, 110) having at least opening (openings of cover 13, 1232) to allow air to be suctioned into the body and at least one discharge port (1207, 1223*a*, 1223*b*, or 1223*c*) to allow suctioned air to be forced out of the body. A fan module (15, 15*a*) is provided inside the body and is configured to suction air through the opening and force the suction air to the at least one discharge port. A filtering module (60) removes foreign substances contained in the suctioned air. A hanging unit (50*a*) is coupled to the main body, wherein the hanging unit includes: a pair of supports (51*a*) extending from a bottom of the main body and having at least one lift unit (56, 57) to change a length of the supports in a vertical direction; a hanging bar (52) connecting the ends of the pair of supports; and an air flow path (L2) provided in the pair of supports to allow portion of the suctioned air to pass through the pair of supports.

A hanger device according to the present disclosure may comprise a body (11, 110) having at least opening (openings of cover 13, 1232) to allow air to be suctioned into the body and at least one discharge port (1207, 1223*a*, 1223*b*, or 1223*c*) to allow suctioned air to be forced out of the body. A fan module (15, 15*a*) is provided inside the body and is configured to suction air through the opening and force the suction air to the at least one discharge port. A filtering module (60) removes foreign substances contained in the suctioned air. A steam supply device (30) is provided inside the body to generate steam and supply the generated steam to the discharge port. A hanging unit (50, 50*a*) is configured to extend from a bottom surface of the body.

A hanger device according to the present disclosure may comprise a body (11, 110) having at least opening (openings of cover 13, 1232) to allow air to be suctioned into the body and at least one discharge port (1207, 1223*a*, 1223*b*, or 1223*c*) to allow suctioned air to be forced out of the body. A fan module (15, 15*a*) may be provided inside the body and may be configured to suction air through the opening and force the suction air to the at least one discharge port. A dust removal filter (64, 65) is configured to remove dust contained in the air suctioned in by the fan module. A dehumidifying filter (63) may absorb moisture contained in the air that has passed through the dust removing filter. A heater (62, IU) may be configured to heat the air that has passed through the dehumidifying filter. A hanging unit (50, 50*a*) is configured to extend from the bottom surface of the body and configured to allow passage of a portion of suctioned air being forced out of the body.

A hanger device according to the present disclosure may comprise a body (11, 110) having at least one opening (openings of cover 13, 1232) to allow air to be suctioned into the body and at least one discharge port (1207, 1223*b*, or 1223*c*) to allow suctioned air to be forced out of the body. A fan module (15, 15*a*) may be provided inside the body. A filter (60) may be configured to remove foreign substances contained in the suctioned air. A hanging unit (50, 50*a*) extends from the bottom surface of the main body. At least one wind guard (20*a*) may be provided in front of the hanging unit, and configured to move in a vertical direction, and a driving unit (18*a*) may slide the wind guard in a vertical direction.

A hanger device of the present disclosure may comprise a body (11, 110) having at least one opening (openings of cover 13, 1232) to allow air to be pulled into the body and at least one discharge port (1207, 1223*b*, or 1223*c*) to allow pulled air to be pushed out of the body. A fan module (15, 15*a*) provided inside the body, and a filtering module (60) is disposed over the fan module. A hanging unit (50, 50*a*)

extends from a bottom surface of the body. The filtering module may include a dehumidifying filter (63) for absorbing moisture contained in the air drawn in by the fan module; and a shielding plate (69) configured to move in a horizontal direction over an upper surface of the dehumidifying filter to shield at least part of the dehumidifying filter.

A hanger device according to the present disclosure may include a body (11, 110) having at least one opening (openings of cover 13, 1232) to allow air to be pulled into the body and at least one discharge port (1207, 1223b, or 1223c) to allow pulled air to be pushed out of the body. A fan module (15, 15a) is configured to pull air into the body and push air toward the discharge port, and a filter (63, 63a, 64 or 65) is provided over the fan module to filter air drawn in by the fan module. A hanging unit (50, 50a) extends from a bottom surface of the body. A filter cleaner (40) is provided inside the body to clean to the filter, and the filter cleaner may be positioned between the filter and the hanging unit.

A hanger device according to the present disclosure may include a body (11, 110) having at least one opening (openings of cover 13, 1232) to allow air to be drawn into the body and at least one discharge port (1207, 1223b, or 1223c) to allow drawn air to be pushed out of the body. A fan module (15, 15a) is provided inside the body, and a filter (60) is configured to remove foreign substances contained in the air being drawn in by the fan module. A hanging unit (50, 50a) may extend from the bottom surface of the body. At least one wind guard (20a) may be provided in front of the hanging unit and configured to move in a vertical direction. A driving unit (18a) may slide the wind guard in the vertical direction, and a sterilization module (100) may be provided on a rear surface of the wind guard.

A hanger device according to the present disclosure may include a body (11, 110) having at least one opening (openings of cover 13, 1232) to allow air to be pulled into the body and at least one discharge port (1207, 1223b, or 1223c) to allow pulled air to be pushed out of the body. The body is configured to move away or toward a wall surface. A fan module (15, 15a) is provided inside the body, and a filtering module (60) disposed over the fan module. A hanging unit (50, 50a) extends from a bottom surface of the body.

A hanger device according to the present disclosure may include a body (11, 110) having at least one opening (openings of cover 13, 1232) to allow air to be pulled into the body and at least one discharge port (1207, 1223b, or 1223c) to allow pulled air to be pushed out of the body. A fan module (15, 15a) is provided inside the body, and a filtering module (60) is disposed over the fan module. At least one air passage (MAP1, MAP2, SAP1, SAP2 or PL, PU) is formed between an outlet (1501) of the fan module and the discharge port. A hanging unit (50, 50a) includes a hanging bar (52) extending horizontally in the width direction of the body and is provided under the discharge port, and a pair of supports (51) extends from a lower surface of the main body to support both ends of the hanging bar. A camera disposed under the body to face toward the hanging unit to photograph a hanger region including the hanging unit.

A hanger device according to the present disclosure may include a body (11, 110) having at least one opening (openings of cover 13, 1232) to allow air to be pulled into the body and at least one discharge port (1207, 1223b, or 1223c) to allow pulled air to be pushed out of the body. A fan module (15, 15a) is provided inside the body, and a filtering module (60) is disposed over the fan module. At least one air passage (MAP1, MAP2, SAP1, SAP2 or PL, PU) is formed between an outlet (1501) of the fan module and the discharge port. A hanging unit (50, 50a) includes a hanging bar (52) extending horizontally in the width direction of the body and provided under the discharge port, and a pair of supports (51) extends from a lower surface of the body to support both ends of the hanging bar. At least one camera is disposed on the body in a direction to photograph the surrounding region of the body.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A hanger device comprising:
   a body having at least one opening to allow air to be suctioned into the body and at least one discharge port to allow suctioned air to be forced out of the body;
   a fan module provided inside the body;
   a filter configured to remove foreign substances contained in the suctioned air;
   a hanging rack extending from the bottom surface of the body;
   at least one wind guard provided at a front of the at least one discharge port, and configured to move in a vertical direction along the front of the at least one discharge port; and
   a driving motor that provides a force to move the wind guard in a vertical direction.

2. The hanger device of claim 1, wherein the body includes a cabinet; and
   a cover covering an upper surface of the cabinet, wherein the wind guard is stationed inside the cabinet, and is configured to move in and out of the cabinet when driven by the driving motor.

3. The hanger device of claim 2, wherein at least one of a wind guard cover or the housing is provided inside the housing between a front side of the cabinet and the hanging rack.

4. The hanger device of claim 3, wherein the wind guard has a plate-shaped body and a pair of guard racks extending from upper left and upper right of the plate-shaped body.

5. The hanger device of claim 4, further comprising:
   wind guard shaft; and
   a pair of pinions engaged with the pair of guard racks,
   wherein the driving motor is configured to rotate the wind guard shaft.

6. The hanger device of claim 4, further comprising a mood light mounted on a rear surface of the plate-shaped body.

7. The hanger device of claim 1, wherein the at least one wind guard comprise a pair of wind guards provided symmetrically with respect to a center of the body.

8. The hanger device of claim 1, wherein a display screen provided on the wind guard.

9. The hanger device of claim 8, wherein when the wind guard descends from the body and is exposed to the outside, the display screen is configured to be activated.

10. The hanger device of claim 9, the display screen is configured to display at least one of an operation mode, an indoor temperature, an indoor humidity, or degree of ambient pollution.

11. The hanger device of claim 1, further comprising a heater configured to heat the air that has passed through the filter.

12. The hanger device of claim 11, wherein the heater is at least one of a planar heater, a sheath heater or an induction heater.

13. The hanger device of claim 1, wherein the filter includes at least one of a pre-filter, a HEPA filter, or a deodorizing filter.

14. The hanger device of claim 1, further comprising a dehumidifying filter configured to absorb moisture contained in the suctioned air.

15. The hanger device of claim 1, further comprising a steam supply device configured to supply steam to the discharge port and the hanging rack.

16. A hanger device comprising:
   a body having at least one opening to allow air to be suctioned into the body and at least one discharge port to allow suctioned air to be forced out of the body;
   a fan module provided inside the body;
   a filter configured to remove foreign substances contained in the suctioned air;
   a hanging rack extending from the bottom surface of the body;
   at least one wind guard provided in front of the hanging rack, and configured to move in a vertical direction; and
   a motor that moves the wind guard in a vertical direction;
   wherein a display screen provided on the wind guard, and
   wherein, when the wind guard descends from the body and is exposed to the outside, the display screen is configured to be activated.

17. The hanger device of claim 16, the display screen is configured to display at least one of an operation mode, an indoor temperature, an indoor humidity, or a degree of ambient pollution.

* * * * *